(12) United States Patent
Kauffman et al.

(10) Patent No.: US 7,707,091 B1
(45) Date of Patent: Apr. 27, 2010

(54) SYSTEM AND METHOD FOR THE ANALYSIS AND PREDICTION OF ECONOMIC MARKETS

(75) Inventors: Stuart A. Kauffman, Santa Fe, NM (US); William G. Macready, Santa Fe, NM (US); Richard G. Palmer, Durham, NC (US); Jack D. Cowan, Chicago, IL (US); Daniel Teiltelbaum, Arlington, VA (US); Alexander Outkin, Santa Fe, MN (US); Bruce K. Sawhill, Santa Fe, NM (US); Vladimir G. Makhankov, Santa Fe, NM (US); Vince M. Darley, Santa Fe, NM (US)

(73) Assignee: NuTech Solutions, Inc., Marlborough, MA (US)

( * ) Notice: Subject to any disclaimer, the term of this patent is extended or adjusted under 35 U.S.C. 154(b) by 0 days.

(21) Appl. No.: 09/868,981

(22) PCT Filed: Dec. 22, 1999

(86) PCT No.: PCT/US99/30640

§ 371 (c)(1),
(2), (4) Date: Jun. 25, 2002

(87) PCT Pub. No.: WO00/38094

PCT Pub. Date: Jun. 29, 2000

(51) Int. Cl.
*G06Q 40/00* (2006.01)
(52) U.S. Cl. .................. 705/36; 705/36 R
(58) Field of Classification Search ............ 705/36 R
See application file for complete search history.

(56) References Cited

U.S. PATENT DOCUMENTS

| | | | | | |
|---|---|---|---|---|---|
| 5,630,127 | A | * | 5/1997 | Moore et al. | 707/103 R |
| 5,765,143 | A | * | 6/1998 | Sheldon et al. | 705/28 |
| 5,799,287 | A | * | 8/1998 | Dembo | 705/36 R |
| 6,049,783 | A | * | 4/2000 | Segal et al. | 705/37 |
| 6,061,662 | A | * | 5/2000 | Makivic | 705/36 R |
| 6,757,667 | B1 | * | 6/2004 | Patel | 706/19 |

* cited by examiner

*Primary Examiner*—James Kramer
*Assistant Examiner*—Lindsay M. Maguire
(74) *Attorney, Agent, or Firm*—Henry B. Ward, III; Moore & Van Allen

(57) ABSTRACT

A system and method are provided which dynamically adapts to a changing economic environment by selecting or synthesizing an economic model from a set of economic models based on the selected model's ability to make accurate predictions about an actual economic market. The method and system each forms a space of different economic models, forms a behavioral landscape by extracting observables from executions of the economic models, and performs model selection and composite model synthesis through optimization over the behavioral landscape.

7 Claims, 33 Drawing Sheets

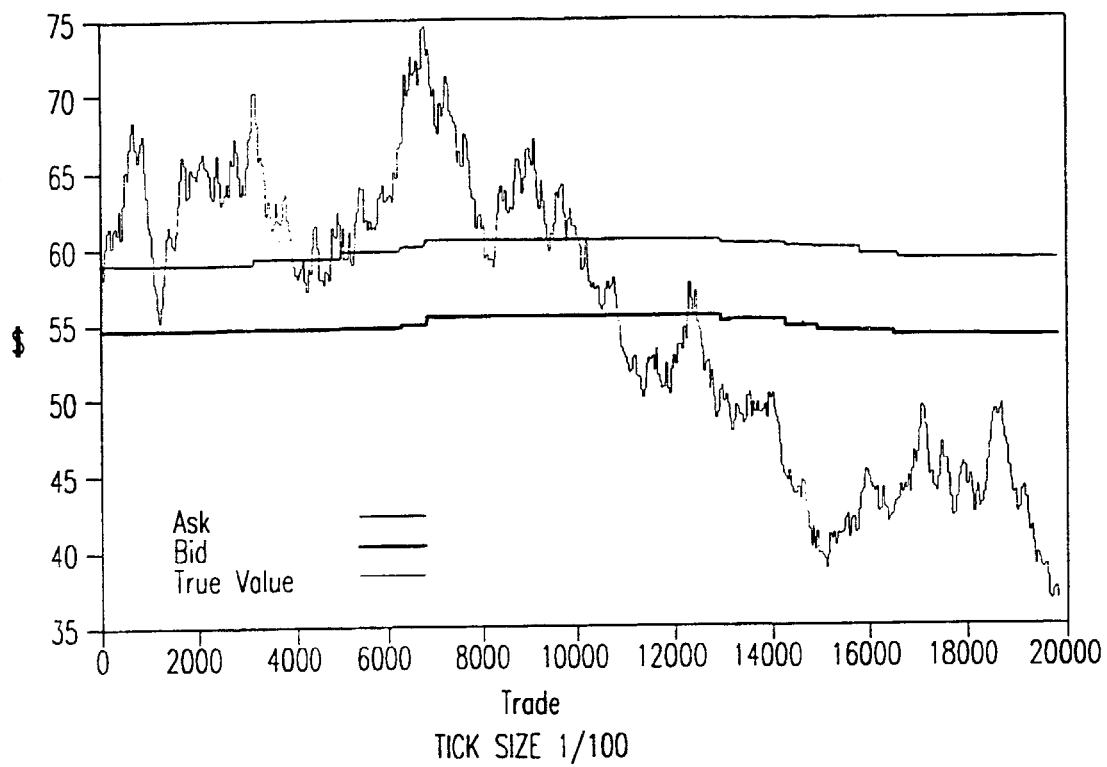
FIG.5A (TICK SIZE 1/100)
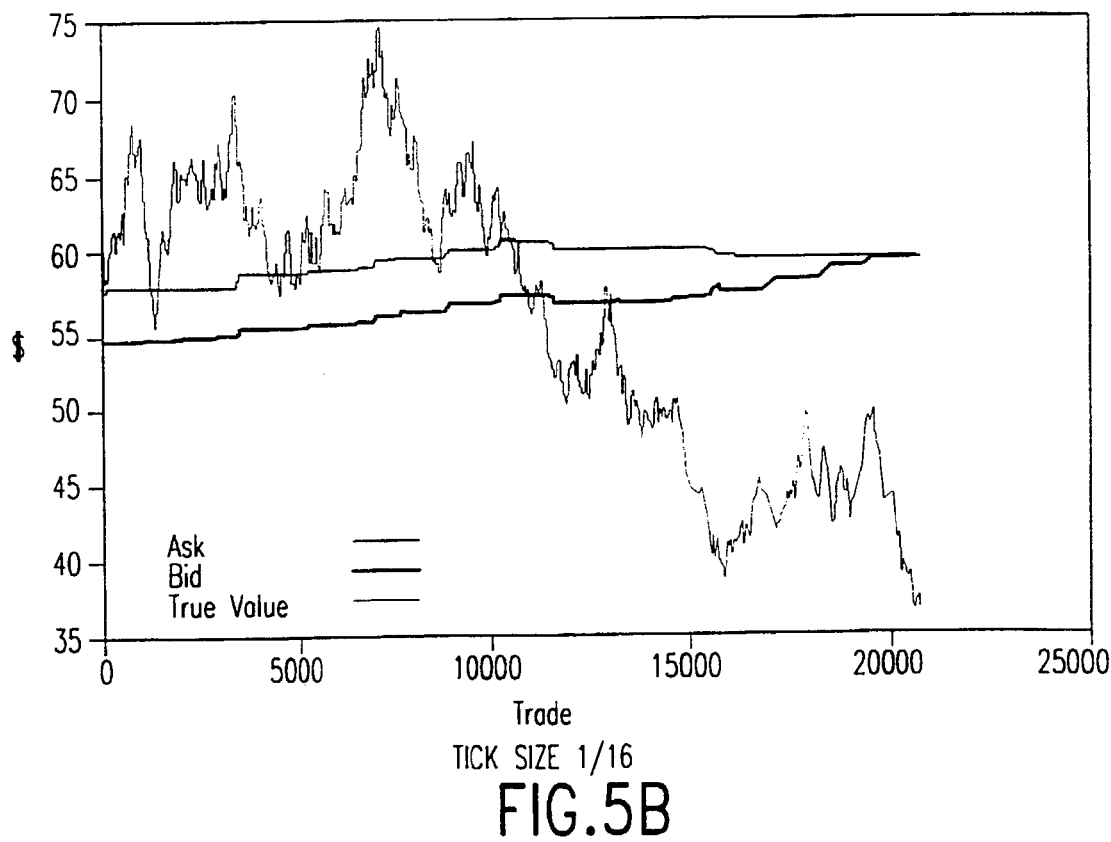
FIG.5B (TICK SIZE 1/16)

AVERAGE MEAN SQUARED DIFFERENCE OF BIDS AND ASKS, AND TRUE VALUE

| TICK | MIXED MARKET WITH PARASITES | | 7 BASIC AND 1 NEWVOLUME | | 4 PARASITES AND 4 NEWVOLUME | | BASIC DEALERS MKT | |
|---|---|---|---|---|---|---|---|---|
| SIZE | BID-TRUE ASK-TRUE VAL | | BID-TRUE ASK-TRUE VAL | | BID-TRUE ASK-TRUE VAL | | BID-TRUE ASK-TRUE VAL | |
| | VAL | | | | | | | |
| 1.00 | 6.56 | | 2.45 | | 2.92 | 2.66 | 2.16 | 2.29 |
| 0.25 | 9.18 | | 3.54 | | 4.05 | 3.5 | 2.24 | 2.17 |
| 0.06 | 8.22 | | 4.4 | | 4.89 | 4.1 | 2.71 | 2.56 |
| 0.01 | 9.94 | | 3.77 | | 5.68 | 4.75 | 2.66 | 2.66 |
| | SPREAD | | | | | | | |
| | MEAN | Std | MEAN | Std | MEAN | Std | MEAN | Std |
| 1.00 | -0.2 | 0.91 | 2.4 | 2.27 0.68 | 3.02 | 0.93 | 3.78 | 0.64 |
| 0.25 | 0.71 | 0.62 | 2.88 | 2.76 0.22 | 4.31 | 1.08 | 2.99 | 0.27 |
| 0.06 | 3.25 | 0.75 | 4.21 | 3.54 0.11 | 4.15 | 0.34 | 3.76 | 0.19 |
| 0.01 | 4.89 | 0.32 | 3.32 | 3.46 0.15 | 3.32 | 0.18 | 3.97 | 0.2 |

FIG.22

```
┌─────────────────────────┐
│  ENTER FITNESS LANDSCAPE│──── 2610
│  FROM HISTORICAL DATE   │
└───────────┬─────────────┘
            │
┌───────────┴─────────────┐
│   DETERMINE OPTIMAL     │──── 2620
│   SEARCHING DISTANCE    │
└───────────┬─────────────┘
            │
┌───────────┴─────────────┐
│   SEARCH FOR OPTIMAL    │
│   PORTFOLIOS AT THE     │──── 2630
│   OPTIMAL SEARCHING     │
│        DISTANCE         │
└─────────────────────────┘
```

FIG. 26

$$\begin{pmatrix}
\{1,\ 1,\ \{2,\ -1.\}\} \\
\{1,\ 2,\ \{1,-1.\}\} \\
\{1,\ 3,\ \{5,\ -0.629195\}\} \\
\{1,\ 4,\ \{5,\ -0.749052\}\} \\
\{3,\ 5,\ \{3,\ -0.629195\},\ \{4,\ -0.749052\},\ \{24,\ -0.350841\}\} \\
\{1,\ 6,\ \{8,\ -0.3866\}\} \\
\{2,\ 7,\ \{8,\ -0.434322\},\ \{9,\ -0.514114\}\} \\
\{3,\ 8,\ \{6,\ -0.3866\},\ \{7,\ -0.434322\},\ \{9,\ -0.332176\}\} \\
\{2,\ 9,\ \{7,\ -0.514114\},\ \{8,\ -0.332176\}\} \\
\{2,\ 10,\ \{11,\ -1.\},\ \{17,\ -0.333359\}\} \\
\{2,\ 11,\ \{10,\ -1.\},\ \{15,\ -0.311709\}\} \\
\{1,\ 12,\ \{14,\ -0.889441\}\} \\
\{1,\ 13,\ \{14,\ -0.411215\}\} \\
\{2,\ 14,\ \{12,\ -0.889441\},\ \{13,\ -0.4112215\}\} \\
\{3,\ 15,\ \{11,\ -0.311709\},\ \{17,\ -0.593436\},\{18,\ -0.602979\}\} \\
\{2,\ 16,\ \{17,\ -0.503126\},\ \{18,\ -0.52658\}\} \\
\{3,\ 17,\ \{10,\ -0.333359\},\ \{15,\ -0.593436\},\ \{16,\ -0.503126\}\} \\
\{2,\ 18,\ \{15,\ -0.60979\},\ \{16,\ -0.52658\}\} \\
\{1,\ 19,\ \{20,\ -1.\}\} \\
\{1,\ 20,\ \{19,\ -1.\}\} \\
\{1,\ 21,\ \{23,\ -0.770342\}\} \\
\{1,\ 22,\ \{23,\ -0.696416\}\} \\
\{2,\ 23,\ \{21,\ -0.770342\},\ \{22,\ -0.696416\}\} \\
\{1,\ 24,\ \{5,\ -0.350841\}\} \\
\{2,\ 25,\ \{26,\ -0.491271\},\ \{27,\ -0.459285\}\} \\
\{2,\ 26,\ \{25,\ -0.491271\},\ \{27,\ -0.49478\}\} \\
\{2,\ 27,\ \{25,\ -0.459285\},\ \{26,\ -0.49478\}\} \\
\{1,\ 28,\ \{29,\ -1.\}\} \\
\{1,\ 29,\ \{28,\ -1.\}\} \\
\{1,\ 30,\ \{32,\ -0.794733\}\} \\
\{1,\ 31,\ \{32,\ -0.53383\}\} \\
\{2,\ 32,\ \{30,\ -0.794733\},\ \{31,\ -0.53383\}\}
\end{pmatrix}$$

FIG.27

$$\begin{pmatrix}
\{3., 1\}, \{2., -1.\}, \{47., -0.31\}, \{87., -0.3\}\} \\
\{2., 2., \{1., -1.\}, \{46., -0.31\}\} \\
\{2., 3., \{5., -0.63\}, \{80., -0.34\}\} \\
\{1., 4., \{5., -0.75\}\} \\
\{3., 5, \{3., -.063\}, \{4., -0.75\}, \{24., -0.35\}\} \\
\{1., 6., \{8., -0.39\}\} \\
\{2., 7., \{8., -0.43\}, \{9., -0.51\}\} \\
\{4., 8., \{6., -0.39\}, \{7., -0.43\}, \{9., -0.33\}, \{44., -0.35\}\} \\
\{5., 9., \{7., -0.51\}, \{8., -0.33\}, \{54., -0.3\}, \{75., -0.3\}, \{98., -42\}\} \\
\{3., 10, \{11., -1.\}, \{17., -0.33\}, \{39., -0.36\}\} \\
\{2., 11., \{10., -1\}, \{15., -0.31\}\} \\
\{3., 12., \{14., -0.89\}, \{62., -0.35\}, \{90., -0.3\}\} \\
\{2., 13., \{14., -0.41\}, \{61., -0.31\}\} \\
\{4., 14., \{12., -0.89\}, \{13., -0.41\}, \{82., -0.32\}, \{89., -0.35\}\} \\
\{5., 15., \{11., -0.31\}, \{17., -0.59\}, \{18., -0.6\}, \{39., -0.31\}, \{80., -0.31\} \\
\{3., 16., \{17., -0.5\}, \{18., -0.53\}, \{82., -0.32\} \\
\{4., 17., \{10., -0.33\}, \{15., -0.59\}, \{16., -0.5\}, \{36., -0.38\}\} \\
\{2., 18., \{15., -0.6\}, \{16., -0.53\}\} \\
\{2., 19., \{20., -1.\}, \{42., -0.3\}\} \\
\{1., 20., \{19., -1.\}\} \\
\{3., 21., \{23., -0.77\}, \{45., -0.32\}, \{94., -0.3\}\} \\
\{2., 22., \{23., -0.7\}, \{97., -0.32\}\} \\
\{2., 23., \{21., -0.77\}, \{22., -0.7\}\} \\
\{1., 24., \{5., -0.35\}\} \\
\{2., 25., \{26., -0.49\}, \{27., -0.46\}\} \\
\{2., 26., \{25., -0.49\}, \{27., -0.49\}\} \\
\{2., 27., \{25., -0.46\}, \{26., -0.49\}\} \\
\{3., 28., \{29., -1.\}, \{48., -0.31\}, \{76., -0.31\}\} \\
\{2., 29., \{28., -1.\}, \{77., -0.3\}\} \\
\{1., 30., \{32., -0.79\}\} \\
\{2., 31., \{32., -0.53\}, \{89., -0.31\}\} \\
\{3., 32., \{30., -0.79\}, \{31., -0.53\}, \{46., -0.31\}\} \\
\{2., 33., \{35., -0.46\}, \{39., -0.31\}\} \\
\{1., 34., \{36., -0.39\}\} \\
\{4., 36., \{17., -0.38\}, \{34., -0.39\}, \{35., -0.51\}, \{54., -0.33\}\} \\
\{1., 37., \{38., -1.\}\} \\
\{1., 38., \{37., -1.\}\} \\
\{4., 39., \{10., -0.36\}, \{15., -0.31\}, \{33., -0.31\}, \{41., -0.49\}\} \\
\{1., 40., \{41., -0.79\}\} \\
\{2., 41., \{39., -0.49\}, \{40., -0.79\}\} \\
\{1., 42., \{19., -0.3\}\} \\
\{3., 43., \{44., -0.43\}, \{45., -0.4\}, \{69., -0.31\}\} \\
\{3., 44., \{8., -0.35\}, \{43., -0.43\}, \{45., -0.53\}\} \\
\{3., 45., \{21., -0.32\}, \{43., -0.4\}, \{44., -0.53\}\} \\
\{3., 46., \{2., -0.31\}, \{32., -0.31\}, \{47., -1.\}\} \\
\{2., 47., \{1., -0.31\}, \{46., -1.\}\} \\
\{2., 48., \{28., -0.31\}, \{50., -0.74\}\} \\
\{1., 49., \{50., -0.72\}\} \\
\{2., 50., \{48., -0.74\}, \{49., -0.74\}\}
\end{pmatrix}$$

FIG. 28A $$\begin{pmatrix}
\{2., 51., \{53., \underline{-0.62}, \{54., \underline{-0.57}\}\} \\
\{0, 52.\} \\
\{2., 53., \{51., \underline{-0.62}\}, \{94., -.38\}\} \\
\{4., 54., \{9., -0.3\}, \{36., 0.33\}, \{51., \underline{0.57}\}, \{72., 0.31\}\} \\
\{1., 55., \{56., \underline{-1.}\}\} \\
\{1., 56., \{55., \underline{-1.}\}\} \\
\{2., 57., \{59., \underline{-0.61}\}, \{91., -0.47\}\} \\
\{1., 58., \{59., \underline{-0.79}\}\} \\
\{2., 59., \{57., \underline{-0.61}\}, \{58., \underline{-0.79}\}\} \\
\{1., 60., \{63., -0.45\}\} \\
\{3., 61., \{13., -0.31\}, \{62., -0.3\}, \{63., -0.36\}\} \\
\{3., 62., \{12., -0.35\}, \{61., -0.3\}, \{63., \underline{-0.61}\}\} \\
\{3., 63., \{60., -0.45\}, \{61., -0.36\}, \{62., \underline{-0.61}\}\} \\
\{1., 64., \{65., \underline{-1.}\}\} \\
\{1., 65., \{64., \underline{-1.}\}\} \\
\{1., 66., \{68., -0.39\}\} \\
\{1., 67., \{68., \underline{-0.97}\}\} \\
\{2., 68., \{66., -0.39\}, \{67., \underline{-0.97}\}\} \\
\{1., 69., \{43., -0.31\}\} \\
\{1., 70., \{72., -0.45\}\} \\
\{1., 71., \{72., \underline{-0.63}\}\} \\
\{3., 72., \{54., -0.31\}, \{70., -0.45\}, \{71., \underline{-0.63}\}\} \\
\{1., 73., \{74., \underline{-1.}\}\} \\
\{1., 74., \{73., \underline{-1.}\}\} \\
\{2., 75., \{9., -0.3\}, \{77., \underline{-0.74}\}\} \\
\{2., 76., \{28., -0.31\}, \{77., \underline{-0.71}\}\} \\
\{3., 77., \{29., -0.3\}, \{75., \underline{-0.74}\}, \{76., \underline{-0.71}\}\} \\
\{3., 78., \{80., \underline{-0.65}\}, \{81., \underline{-0.6}\}, \{99., -0.31\}\} \\
\{2., 79., \{80., \underline{-0.5}\}, \{81., -0.44\}\} \\
\{4., 80., \{3., -0.34\}, \{15., -0.31\}, \{78., \underline{-0.65}\}, \{79., -0.5\}\} \\
\{2., 81., \{78., \underline{-0.6}\}, \{79., -0.44\}\} \\
\{3., 82., \{14., -0.32\}, \{16., -0.32\}, \{83., \underline{-1.}\}\} \\
\{1., 83., \{82., \underline{-1.}\}\} \\
\{1., 84., \{86., \underline{-0.59}\}\} \\
\{1., 85., \{86., \underline{-0.85}\}\} \\
\{2., 86., \{84., \underline{-0.59}\}, \{85., \underline{-0.85}\}\} \\
\{1., 87., \{1., -0.3\}\} \\
\{0, 88.\} \\
\{3., 89., \{14., -0.35\}, \{31., -0.31\}, \{90., \underline{-0.92}\}\} \\
\{2., 90., \{12., -0.3\}, \{89., \underline{-0.92}\}\} \\
\{1., 91., \{57., -0.47\}\} \\
\{0, 92.\} \\
\{0, 93.\} \\
\{2., 94., \{21., -0.3\}, \{53., -0.38\}\} \\
\{0, 95.\} \\
\{0, 96.\} \\
\{1., 97., \{22., -0.32\}\} \\
\{1., 98., \{9., -0.42\}\} \\
\{1., 99., \{78., -0.31\}\} \\
\{0, 1.0 \times 10^2\}
\end{pmatrix}$$

FIG.28B

SYSTEM AND METHOD FOR THE ANALYSIS AND PREDICTION OF ECONOMIC MARKETS

FIELD OF THE INVENTION

The present invention relates generally to a method and system for the analysis and prediction of economic markets. More particularly, the present invention forms a search space of different economic models, forms a fitness landscape by extracting observables from executions of the economic models with dimension reduction and by comparing the observables with actual data, and performs model selection and composite model synthesis through optimization over the fitness landscape.

BACKGROUND

The stock market and non financial markets are complex systems in which one or more stocks, goods, services, or their derivatives are sold or bought. Many techniques exist that attempt to analyze expected behavior of these markets, including predictions of price and volatility for a forward time series from any given date. Among these methods are those concerning prediction of volatility based on Black Scholes, and implied volatility given prices of options and the assumptions of Gaussian random walks in prices that are used to back estimate the volatility implied by actual option prices. In addition, procedures exist which posit some mathematical form for a feature such as volatility, such as truncated Levy, or Levy, or other distributions, then attempts to fit observed volatility distributions using these assumed underlying distributions and appropriate weighting of coefficients in the given mathematical form.

Still other attempts to predict expected volatility uses Black Scholes formalism but treats variance in price as itself a random variable which changes over time, then attempts to estimate the rate of change of this random variable. Still other efforts to predict volatility are based on causal models of various kinds. For example, some workers postulate a "herding" effect in which clusters of traders of various sizes form and trade in much the same way, causing small and large fluctuations in price, hence in volatility. Other attempts are based on Langevain equations which represent displacement of buy and sell orders at a moment from "equilibrium", then seek stochastic equations describing the change of this displacement as a function of drift terms, price momentum terms, penalties for price variance, and volatility growth terms. Still other efforts are based on local linear models which embed a single stock's price series, or sometimes several price series, in a multidimensional space of the past N periods and attempts to locally fit the next price move of one or several prices.

The predictive capability of each of these economic model can vary with the economic environment. Specifically, an economic model may exhibit a good predictive capability for one set of economic circumstances and a poor predictive capability for another set of economic circumstances. Since the economic environment changes with time, the utility of each economic model also changes with time.

A great many researchers in economics, finance, and related areas have investigated different aspects of financial markets or markets in general. Topics of interest to the researchers and of relevance to our project have included diffusion of information in markets (Kyle, Albert S. (1985): "Continuous Auctions and Insider Trading," *Econometrica*, v. 57, 1315-35, Grossman, Sanford J., and Joseph E. Stiglitz (1980): "On the Impossibility of Informationally Efficient Markets," *The American Economic Review*, v. 70, 393-408), efficiency and statistical modeling of markets (Foley (1982)), speculation and bubble formation (Tirole, Jean (1982): "On the Possibility of Speculation Under Rational Expectations," *Econometrica*, v. 50, 1163-81.), and many others.

Other existing work in market microstructure theory (O'Hara Blackwell, Maureen, *Market Microstructure Theory*, Cambridge, Mass., 1995.) suffers from a lack of means for experimental verification (with some important exceptions, such as (Rust, John, John Miner, and Richard Palmer (1993): "Behavior of Trading Automata in a computerized Double Auction Market", in *The Double Auction Market*). For example, Glosten-Milgrom (GM) model examines the relationship between Dealer spreads and the proportion of informed Investors in the market. But it is very difficult to quantify the fundamental concept of "proportion of informed investors in the market" Ideally, one would prefer a numerical and experimental framework in which one could examine the regions of validity of analytic models like the GM.

Another important shortcoming of the existing literature is the static nature of most of the models, i.e., results even for dynamic models are usually derived using some type of equilibrium assumptions. Such assumptions greatly limit one's ability to investigate dynamic, potentially non-equilibrium behavior of the system, and also one's ability to model realistically the market participants and as the result the market itself.

Accordingly, there exists a need for a broad encompassing algorithmic framework to develop effective and routinely improvable models and predictions of economic markets including stock markets and non-securities markets. In addition, there exists a need for a broad and improvable algorithmic framework to seek means to price securities such as options and other derivatives.

There exists a further need for a system for performing analysis and making predictions in a securities market using an agent-based models of the dealers and investors.

SUMMARY OF THE INVENTION

The present invention presents a system and method of economic analysis and prediction which dynamically adapts to a changing economic environment by selecting or synthesizing an economic model from a set of economic models based on the selected model's ability to make accurate predictions about an actual economic market. Specifically, the method and system of the present invention forms a space of different economic models, forms a fitness landscape by extracting observables from executions of the economic models, and performs model selection and composite model synthesis through optimization over the fitness landscape.

The present invention includes a method for performing analysis and prediction of economic markets comprising the steps of:

initializing a space of economic models;

executing one or more of said economic models to generate a corresponding one or more predicted time series;

determining one or more fitnesses corresponding to said one or more economic models by comparing said plurality of predicted time series to actual data; and searching for at least one of said economic models having a maximal fitness.

The present invention further includes a system for performing analysis and making predictions of a securities market comprising
    a model of the securities market comprising:
        a plurality of dealer agents representing a corresponding plurality of market makers in the securities market, each of said dealer agents having at least one of a plurality of dealer strategies for setting a price of securities;
        a plurality of investor agents representing a corresponding plurality of investors in the securities market, wherein said investor agent determines whether to buy or sell one or more of the securities at a given price;
        at least one market model comprising one or more rules for exchanging the securities; and
    a simulator for executing said model to perform analysis on the securities market.

The present invention further includes a method for creating a portfolio of assets comprising the steps of:
    initializing at least one current portfolio of assets having one or more desired properties;
    generating at least one next portfolio of assets to form said current portfolio, said next portfolio having a smaller size then said current portfolio;
    repeating said generating step after replacing said current portfolio with said next portfolio while said next portfolio has the one or more desired properties;
    defining a size range having an upper limit equal to the size of said current portfolio and a lower limit equal to the size of said next portfolio; and
    searching for an optimal portfolio of assets to within said size range.

The present invention further includes a method for optimizing a portfolio of assets comprising the steps of:
    determining a fitness landscape representation over a space of portfolios;
    determining at least one optimal searching distance in said fitness landscape representation; and
    searching for optional ones of said portfolio of assets at said optimal distances.

The present invention further includes a method for creating a portfolio of a plurality of assets comprising the steps of:
    determining a plurality of anti-correlated families wherein each of said anti-correlated families contains two or more of said plurality of assets that are anti-correlated; and
    determining one or a more perspective portfolios of said plurality of assets from said plurality of anti-correlated families.

The present invention further includes a method of modeling a portfolio of assets comprising the step of:
    defining a probability distribution of the value of the portfolio of assets with two or more Gaussian distributions.

BRIEF DESCRIPTION OF THE DRAWINGS

FIG. 22 displays a panel of results obtained by executing the dealer mediated securities market model.

FIG. 26 displays a flowchart illustrating the method for portfolio modification.

FIGS. 27, 28a and 28b display families of anti-correlated stocks that were generated by a method to create a portfolio of a plurality of assets with minimal risk.

DETAILED DESCRIPTION OF THE PREFERRED EMBODIMENT

System Framework

Figure 1:
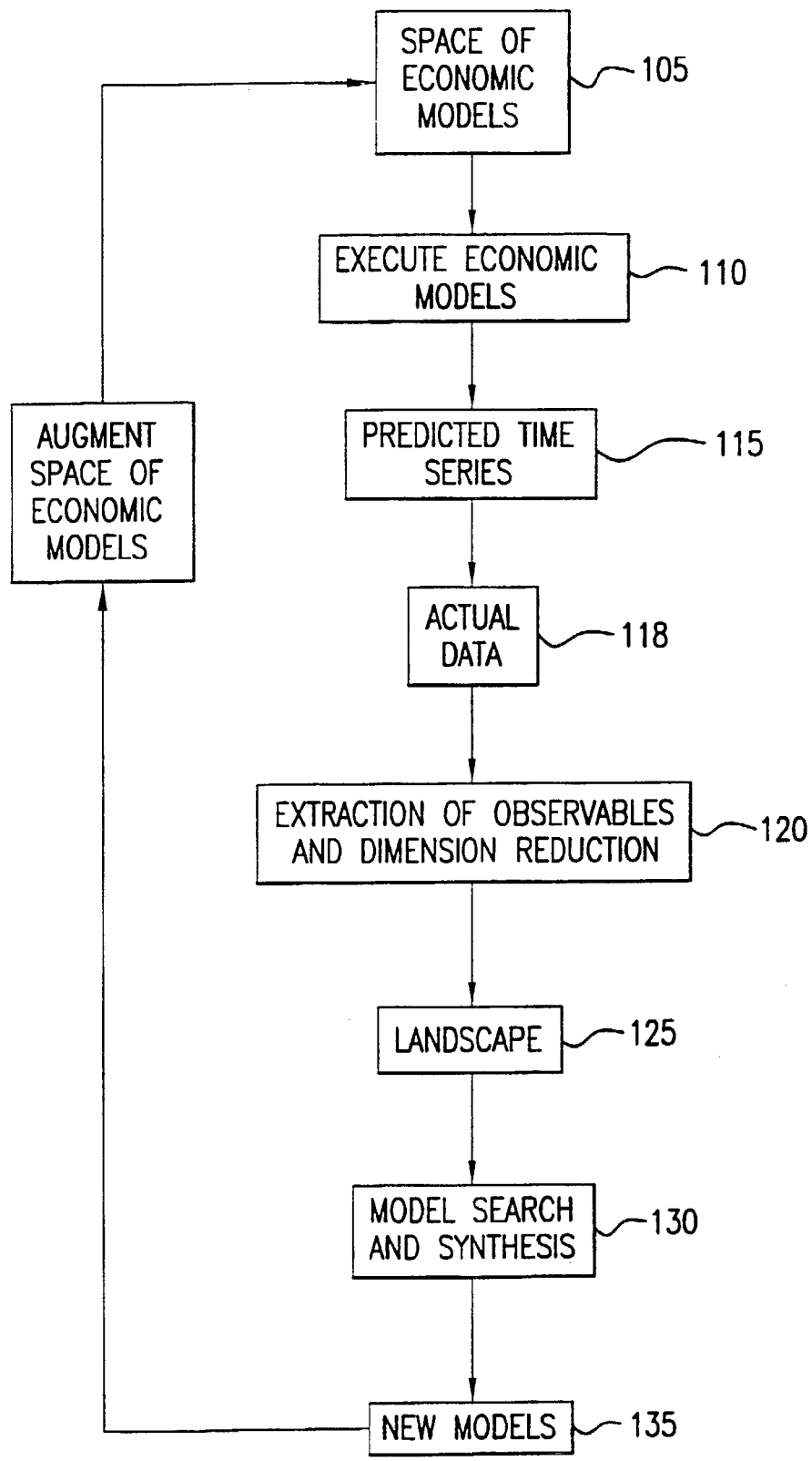
FIG. 1 provides a data flow diagram describing a framework of the system and method of economic analysis and prediction of the present invention.

FIG. 1 provides a data flow diagram describing an overview of the system and method of economic analysis and prediction of the present invention. In step 110, the method executes each economic model 105 in a set of economic models to form a corresponding family of predicted time series of desired features 115. Without limitation, the economic models 105 include a variety of different model types such as parameterized models, agent-based causal models, aggregate causal models, and intermediate causal models. The economic models 105 further include models based on a variety of data mining tools such as time series analysis. The economic models 105 also include causal models based on features such as the economic web model in which N stocks are located, hence the sensitivity of the values of the stock to the introduction of new goods and services and the extinction of old ones as described in copending patent application, "System and Method for the Synthesis of an Economic Web and the Identification of New Market Niches", U.S. application Ser. No. 09/080,040, filed May 15, 1998, the contents of which are herein incorporated by reference. The economic web models are further described in "A System and Method for Coordinating Economic Activities Within and Between Economic Agents", U.S. Application No. 60/091,656 and International Application number PCT/US99/15096, the contents of which are herein incorporated by reference.

The economic models 105 further include causal models based on detailed agent based models of the "players" in a stock market, such as dealers, traders, plus their order books, plans and facts concerning wishes to buy or sell stocks or derivatives as characterized by a finite list of features including price, volume, strike price, dates, underlying value of the stock by various estimates, and other factors. In addition, these agent based models may include strategy spaces for the different agents, means by which agents change strategies, and may include sets of hypotheses that agents hold with respect to other agents prospective actions, other agent's strategies, and other agents hypotheses. Specific examples of economic models 105 include AR(n), ARMA, ARV, ARCH, GARCH, BlackScholes, Langevain equations, etc. Accordingly, the space of economic models 105 is broad and indefinitely extendable.

The execution of step 110 yields time series data for models 105 having the same types and different parameter values, models having different types, etc. For the agent based models in the set of economic models 105, step 110 executes on models with different strategy spaces, different inventory requirements, different preferences, etc. For the agent based models where the agents have different models of each other, step 110 executes with different sets of rules which define how the models of the agents change over time. Since the models change with time, step 110 executes the set of economic models 105 for different time periods. For example, step 110 could be executed for a time period beginning 10 years ago and running until the present time. Likewise, step 110 could also be executed for a time period beginning 1 year ago and running to the present time.

In step 120, the method extracts a set of observables from the predicted time series and corresponding time series of the actual economic market to create a fitness landscape 125 of the space of economic models 105. Execution of step 120 yields metric distances between different models for different time periods. Specifically, execution of step 120 yields metric distances between models having the same type and different parameter values, models with different strategy spaces, models with different inventory requirements, different preferences, etc.

The method extracts a set of observables from the families of predicted time series and creates a fitness landscape using a wide variety of data mining techniques and dimension reduction techniques. Dimension reduction techniques include principal component analysis, localized principal component analysis, independent component analysis and the sparse basis of landscapes as described in copending patent application, "A System and Method for Coordinating Economic Activities Within and Between Economic Agents", U.S. Application No. 60/091,656 and International Application Number PCT/US99/15096, the contents of which are herein incorporated by reference.

In an alternate embodiment, step 120 computes probability distributions for the observables for the families of predicted time series. In this embodiment, step 120 computes a comparison between different probability distributions to approximate metric distances between corresponding predicted time series. Preferably, the Randan-Nikodyn Thereom is used to approximate the metric distance. Alternatively, the Kulback-Liebler method could be used. However, as is understood by persons of ordinary skill in the art, other techniques could be used to compare probability distributions and approximate their metric distances.

Execution of step 120 assesses a given state of an economic market. Without limitation, that current state might be an embedding of the current and N past day's prices of M stocks in an (N+1)M dimensional state space showing by a single point the entire history of all M prices over the past N+1 periods. The current state of the market, however, may be broader, and include prices, volumes, and other desired features of the stocks or goods sold and bought. The current state might be the present state, or a past historical state or a proposed future hypothetical or expected state of the market. More generally, the embedding might include the N+1 past moments and F future moments or periods, as sampled from historical data such that the state space has (N+1+F)*M dimensions.

Again at the highest level, the chosen model is utilized, together with an assessment of the current state of the market, to predict one or more successive states of the market. This process may be used a single time to predict, for example, a time series of the M stocks for P succeeding periods, where P is 1 or more, and periods are chosen as desired for past and future analysis.

More generally, the predicted future time series might be reformed deterministically, or stochastically, from the current state based on features of the model's mapping of past to future states. Thus, for a local linear method, the statistical features of a mapping of a set of neighboring past points to a set of future points in the (N+1+F)M state space is used to pick, stochastically predicted future points from the current state to, generally, a plurality of different members of "walks" from the current state into the future.

The ensemble of these walks may then be used to measure features such as price. More particularly, the ensemble of these walks, or partial differential equations based on the cumulants of the ensemble can be used to characterize the ensemble. Based on numerical study, or the partial differential equations, the ensemble can be used to assess hedging, risk minimization to a single option, or a portfolio of holdings.

In addition to the use of one or an ensemble of Predicted future price series, or time series of other features such as volume and otherwise to assess risk and proper prices for options and other instruments, the predicted time series can be compared to the observed behavior of the real market 118 in order to test, modify and improve the initial choice of model for the market.

At the highest level, this testing procedure consists in the use of one or more comparisons between the predicted time series 115 and actual time series 118, as assessed by features as simple as direct visual comparison, to principal component analysis, independent component analysis and other sophisticated modes of comparison of data sets. These comparisons yield one or more "errors", that measure different aspects of the deviation of the predicted behavior of the market to the observed behavior of the market.

Given a set of errors, the highest level algorithm constructs a "fitness measure" of the model in step 120. This fitness measure may, in general, consist in a single number, or might be a vector with all of the different features of errors noted by the comparison of fact and model predictions, or a still more general measure of fitness of the model.

Again at this highest level, the fitness measure or measures creates a fitness landscape 125 over the set of models 105 of the market. Given any one of a plurality of means of defining "nearby models", the most general algorithm achieves a space of models of the market. Since each model has a fitness, given the space of models 105, the algorithm achieves a fitness landscape 125 over the space of models 105. In this fitness landscape 125, it is natural to represent minimization of errors by being fitter, and allow the error measures to be a height. Hence, in this formulation, "fitter" is lower, corresponding to lower errors. Without loss of generality, fitter can be taken as higher by reformulating the error measures. Without loss of generality, let "high" be fitter than "low", so peaks represent high fitness and thus, low error. Then the fitness landscape 125 may, in general, be smooth and single peaked, rugged and many peaked but correlated, with correlations lengths that differ in different directions, or random. Means to search a landscape, to characterize and to represent a landscape are described in copending patent application, "A System and Method for Coordinating Economic Activities Within and Between Economic Agents", U.S. Application No. 60/091,656 and International Application Number PCT/US99/15096, the contents of which are herein incorporated by reference.

In step 130, at the highest level, the algorithm utilizes, first, means to assess the statistical structure of the fitness landscape 125 over the space of models 105 of the market, such as its correlation lengths in different directions. The algorithm determines the optimal search distance as a function of the current fitness of a model of the market and the correlation structure of the landscape, etc. as described in "A Method for Optimal Search on a Technology landscape", International Application PCT/US99/19916, filed Aug. 31, 1999, the contents of which are herein incorporated by reference. Then, based on these features, the highest level algorithm chooses, by mutation, recombination, or other methods, a new trial model of the market to test and assess the fitness of that model.

In step 130, over a succession of trials, the highest level algorithm searches for fitter models of the market. In general, this search procedure may be a local walk via fitter neighbor variants that becomes trapped on a local fitness peak in the space of models of the market or a more general search procedure that persistently searches in a space of models, generates new models, and continues to search for good models. This persistent search in the space of models in part reflects the fact that the market itself may be persistently non_stationary. For example, its rules and behaviors may be changing. Thus, the highest level algorithm can tune the rate of search in the space of models to match the non stationarity of the market itself such that the search procedure persistently finds good models of the market.

In addition, at this highest level, the economic models 105 may be algorithmically augmented by a variety of algorithmic procedures such as changes in the coefficients of a model or changes in the functional mathematical form of a model. For example, step 130 can alter a term in an equation from linear to squared, or generate entirely new models by mutation and recombination of terms and elements or agents that are present in existing models.

In step 130, the method searches the space of economic models and synthesizes new economic models 135. The search and synthesis step 130 will also include the use of a stacking function. The stacking functions can be arbitrary functions of the models of the system. Genetic operators such as recombination and mutation operate over the space of stacking functions to produce new composite economic models 135. The stacking functions must have adequate diversity to span the dimensionality of the behavior space.

The scope of some of the searches from step 130 will be restricted to intra-class searches. These searches include the refinement of parameters for parameter type models by comparing the actual data 118 with the families of predicted time series data generated by the model. In other words, the fitness of each economic model 105 is the metric distance of its predicted time series 115 from the actual time series 118.

The search and synthesis step 130 will also include the use of biological functions. The use of biological functions produces hybrid economic models 105 which are composed of individual economic models. Each individual component economic models 105 contributes a portion of the predictive time series data produced by the hybrid economic model 105. The biological functions adjusts the permutation and percentage contribution of each component economic model 105 in the hybrid economic model 105.

The extraction of observables from ensembles of time series generated from hybrid economic models 105 and composite economic models 105 can be done in different manners. In one exemplary technique, the method takes a weighted sum of each of the component economic models 105 and subsequently performs extraction of the observables. In an alternate technique, the method performs extraction of the observables for each component economic model 105 and subsequently takes of weighted sum of these sets of observables.

The non-stationarity of economic markets will induce a flow in the behavior space created by step 120. Specifically, the values of the observables extracted through the data mining and dimension reduction process will change with the economic markets. The present invention can be used to analyze the non-stationarity of the economic markets by studying the flow in the behavioral space. In turn, the present invention can be used to predict the non-stationarity of the economic markets from the observed flow in the behavioral space.

Algorithmic Procedures for Options, Hedging and Other Investment Decisions

Different economic models 105 can be used with the framework of the system and method of the invention shown in FIG. 1. A set of past time series and matching statistics forms an exemplary economic model 105. This process begins, without limitation, with a time series at some fixed interval, say a day, or an hour, or a week, with the prices of one or more assets, say of N different stocks. For each stock, there exists the past time values at the current price at time T, the price at T−1, T−2, T−3, . . . T−tau. In addition, there exists the future time prices T+1, T+2, T+3, . . . T+tau. In addition to merely including price information at these different times, it is possible to include further information such as volume and price per trade at these different times, or lumped into small intervals of time "boxes". In addition, it is possible to include other features such as measures of expectations of changes in interest rate, or the deviation of an index such as the DJIA above or below its average value for some past period or periods. It is possible in addition to include measures of concern over political events, economic events etc.

Without limitation, and for ease of description only, we now consider the case where only the prices of N assets for the past and future 2×tau+1 time moments are considered. This data is obtained from the actual historical data record for different moments, T, chosen, for example on different days in the past year or several years or more. The accumulation of these data yield a mathematical state space structure which has a "past" a "now" and a "future". The dimensionality of this state space is N (2×tau+1). Thus, if tau is chosen to be 4, meaning using data on prices from the moment T, back to T−1, T−2, T−3, T−4 and forward to T+1, . . . T+4, then each asset corresponds to 9 prices, or 9 variables, and the total state space has 9N dimensions.

Accumulation of data over a past set of times, say the past several years at daily intervals, will yield a set of points, one for each moment in the past chosen as "now". In general, nearby "past" points will have more or less nearby "future" points. Thus these data clouds of lumped nearby past and future points convey some information about the mapping from past to future in this state space.

In particular, the mapping from a nearby set of "past" points to their corresponding "future" points will be used in the present algorithm to generate a stochastic process that, at each step from a "now" point, matches the local statistics of the past-future mapping.

In general, the number of sampled points in this state space will be sparse. Interpolation procedures will be useful for the present algorithm which will yield good approximations to the statistics of "past"-"future" mappings for points in the state space that have not been sampled. In general, markov random fields and other procedures introduced below allow this interpolation before or during the stochastic process next constructed from this" "past", now, future high dimensional state space.

The next step in the algorithm begins at any chosen date, in particular, the actual current historical date, and utilizes the state space to generate a "walk" beginning at the actual or chosen "now", and choosing a "next price" randomly to fit the local statistics of "past", "Now, "future" prices in its vicinity of the state space. This random choice moves generates at next "mock" price at mock T+1, hence at a new point in the state space corresponding to the new price, and the new change in price, i.e. price at T−price at T−1, price at . . . T−2, . . . T−tau. Thus, the new mock price generates not only a new price, but locates the stochastic process at a new point in the "past" of the state space.

From the new point in the past of the state space, the stochastic process chooses at random, a mock future price matching the statistics of the future from this new point in the past in the state space. This stochastic process is iterated as many times as desired to yield a mock time series of "future" prices of the set of N assets from the initial position, "now" in the state space.

The next step in the algorithm generates a second "mock time series" from the same initial position, "now" in the state space. The algorithm then generates as many mock time series from the same initial position, "now" in the state space.

The family of mock time series forms the basis for all further evaluations of investment and hedging strategies, as well as measures of volatility, and means to obtain options prices. For example, using this family of mock time series, coupled with an assumed option, date of sale and strike price, one can numerically investigate the expected return on that option for each member of the mock time series, hence can derive the average and the higher moments of the return on the option over the family of mock time series. Since there are a finite, but indefinitely large number, of members of the mock family of time series, it is always possible to obtain these expected values on the mean, variance, and higher moments.

More generally, the motions in the state space exhibit the correlations in price and price changes among the N assets. Thus the family of mock time series can be used to construct good hedging strategies. More, the use of genetic algorithms and other procedures known in the art can be used to choose optimal hedging strategies among the N assets and their derivatives, given performance criteria such as risk aversion, and other desired features of the instrument.

Further, in general, the real markets are non-stationary. Thus, in general, over real time the mapping known "Past" to "Future" of the state space changes. These changes can be thought of as a higher order map that transforms the "Future" of the state space onto itself. This higher order map can be created as a Tensor process mapping the "Future" state space onto itself. In turn, the Tensor mapping may not be stationary, and a still higher order mapping of the Tensor onto itself can be created. These Tensor-Tensor maps are then used to modify the state space "over time" from the "initial now" to generate an improved family of mock/time series.

Indeed, the first construction of the state spare used historical data over, for example, the past several years. The market mapping of "past to future" is, in general, non-stationary over this historical past. Nearby points in the "past" in the state space correspond, in general to real time points that may be separated by months or years. Thus the "dispersion" of "Future" data points may reflect randomness of the market at any one time, or the non-stationarity overtime.

The "Tensor" method of mapping the "future" of the state space onto itself can be used to analyze and improve the initial state space by partitioning the state space into real time segments, each having a modest length, (i.e. 1 month compared to several years—say 10 years). Then the 12×10=120 "past-future" state space maps can be compared via the "Future-Future" tensor matching procedure to find; estimate and modify the initial "past-now-future" state space to achieve an improved "Tensor" mapping and higher order mapping to use to generate families of mock time series upon which asset strategies and pricing can be based.

Modeling and Simulation

The space of economic models 105 of the present invention goes far beyond simply fitting time series to stochastic models. Such approaches, including AR[n], ARV, ARMA, ARCH, GARCH, LSSM, Levy, and truncated Levy models, merely fit the data (usually of a stock price, or of price differences) to a mathematical model. Then that model is used in various ways for volatility prediction, risk assessment, option pricing, and optimal hedging. But those models generally have little or no basis in how markets really work, and treat the price data merely as a mathematical time series to be analyzed and fitted.

In contrast, causal models include ideas, represented in equations, about how markets really work, and about how agents in those markets make decisions. The observed data, such as the price as a function of time, is then understood in terms of its underlying causes, not just as a set of numbers. By refining and calibrating our causal models against real-world information and data on market and agent behavior, we can obtain a much better understanding of price series than models without any causal mechanisms. This better understanding in turn provides more predictive power, and thus improved volatility prediction, risk assessment, option pricing, and optimal hedging.

Our causal models of markets span three levels of modeling detail:

1. Individual Agent Level
2. Agent Distribution Level
3. Aggregate Level

These are discussed in more detail below. The present invention uses models at all three levels. The present invention calibrates models at levels 1 and 2 against each other, and similarly at levels 2 and 3.

The division into three levels is actually somewhat arbitrary. In particular, there are many possible levels of detail within level 2, and many hybrid cases between levels 2 and 3 in which some variables are modeled as distributions and some as aggregates.

The individual agent level models represent (in the computer) individual agents who buy and sell securities. These agents can include investors, brokers, specialists, and market makers. The security prices are determined by the activity of the agents, either through specific specialist or market-maker strategies, or through tatonnment rules in which the price of a security moves upwards when demand exceeds supply and downwards when supply exceeds demand.

The agents each have a current portfolio (or "inventory") of holdings in each of a number of financial securities (stocks, bonds, options, etc), and also have available reserves of liquid assets ("cash"). They change their portfolio, buying and selling securities, according to a current "strategy". These strategies may be represented by parameterized rules, a neural network, or fuzzy logic. The strategies, however represented, may involve agents' internal predictions of the future behavior of the market and/or of other agents.

Each agent may contain a set of many different strategies at the same time, using those that seem, on the basis of past experience, best under any particular circumstances. Alternatively a weighted average of the set of strategies may be used, weighting each according to its observed past success and generating composite or intermediate actions.

In general the set of strategies, and the individual strategies within the set, change through time as internal models are refined through learning, and as different approaches are found to be more or less successful. Entirely new strategies are generated using genetic algorithm and similar evolutionary programming techniques. The new strategies replace old unsuccessful ones.

At the opposite extreme, the least detailed level, the models at the aggregate level compress the behavior of the agents into one or a few aggregate variables. There is no representation of individual agents, but their average or aggregate behavior is represented. These are much simpler mathematically than the individual agent models. These models are further described in R. Cont and J.-P. Bouchaud, *Herd Behavior and Aggregate Fluctuations in Financial Markets*, preprint cond-mat19712318, available from http://xxx.J.anl.gov, 1998, the contents of which are herein incorporated by reference. The models at the aggregate level are further described in J.-P. Bouchaud and R. Cont, *A Langevin Approach to Stock Market Fluctuations and Crashes*, preprint cond-mat/9801279, available from http://xxx.lanl.gov, 1998, the contents of which are herein incorporated by reference.

The models at the aggregate level usually consist of a small number of coupled nonlinear differential or difference equations, some of which involve stochastic forces. Overall, these are Langevin-type equations in the terminology of physics. Some terms in these equations may also involve integrals or averages over past behavior, usually in the form of weighted moving averages. Analytical methods of the Ito calculus, including construction of Fokker-Planck equations, may be applied in some cases, but in general numerical solutions are used.

The aggregate variables that appear in the equations may include (but are not limited to):

1. aggregate demand—the total number of shares that the trader agents want to buy, minus the total number that they want to sell.
2. inventory level—the total amount of inventory (counting short sales as negative) that the market-maker or specialist agents currently hold.
3. average investor confidence—a "psychological" variable depending on the recent stability or predictability of the market, and affecting the agents' risk aversion (their balance between desire for expected profit and avoidance of loss). Similar variables may also be used for market-makers or specialists.
4. average net capital entry rate—the average rate at which new capital enters the market, less the exit rate.

Besides these and other agent-aggregate variables, there are of course pure market variables, including price, price trend, price volatility, price kurtosis, price correlation time, and the corresponding quantities for price differences and squared prices. There are also adjustable parameters in the model, including parameters to represent average growth rates, average shock and noise rates, strengths of couplings between various pairs of variables, etc.

Together the coupled equations produce a causal model of the agents' aggregate behavior and the market's response. In fact each drives the other; the market reflects the behavior of the agents, and the agents take their cues from the market.

At the intermediate level of detail of the models at the distribution level, the fundamental variables are distributions of aggregate quantities, such as those listed above for the aggregate level. These distributions are used in two ways:

1. to represent the variation of a quantity (such as average investor confidence) or a parameter (such as risk aversion, or trading lot size) across agents;
2. to capture the uncertainty of such a quantity or parameter through time, in the form of a probability distribution.

By using distributions rather than single aggregate quantities, we can model real agents and markets much more realistically, without needing to go all the way to the individual agent level. It seems indeed almost essential to have a distribution of large and small trades in order to fit the observed non-Gaussian distribution of stock price changes. Having a fixed size leads (according to the central limit theorem) to Gaussian price changes unless "herd" effects are invoked as described in R. Cont and J.-P. Bouchaud, *Herd Behavior and Aggregate Fluctuations in Financial Markets*, preprint cond-mat19712318, available from http://xxx.J.anl.gov, 1998 (the contents of which are herein incorporated by reference), and a herd acting together is effectively creating a large trading block in any case.

The equations for the distributions are derived from the corresponding Langevin-type equations for the variables whose distributions we are representing. This leads to coupled differential or difference Master Equations, with convolution integrals involved in the coupling between variables. In most cases, the present invention replaces these Master Equations by coupled differential or difference equations for the cumulant moments of the distributions involved, truncating the cumulant expansion after the first few terms (keeping at least 4 terms, up to at least the kurtosis). This procedure leads to algebraic evolution equations for the cumulants, enabling us to predict, for example, the price distribution of a stock.

At the individual agent level, and at the aggregate level, the causal models produce time series of securities prices as a result of agent behavior and trading. Preferably, the models are run many times in order to obtain an ensemble of such time series. This ensemble may be regarded as a sample from an underlying probability distribution for the whole stochastic process (the causal model) that generates it. The present invention usually fits such an ensemble of time series to a stochastic process model, such as (but not limited to) a truncated Levy flight. Neural network techniques, including (but not limited to) the expectation-maximization (EM) algorithm and Bayes networks is may be used to perform the fitting.

In contrast, the intermediate level approach, working directly with distributions, generates a probability distribution for the stochastic process directly. In all cases such a distribution is fundamentally what is required for accurate volatility prediction, risk assessment, option pricing, and optimal hedging.

The time-series ensembles, or their stochastic-process fits, are compared with real data from actual markets. The statistical differences between the model and the real data are then used to refine the model parameters or change the architecture of the model itself.

A Dealer-Mediated Securities Market Model

The space of economic models 105 further includes a dealer-mediated securities market model. The advantage of the agent-based models of this model is that a wider range of phenomena will become open to both investigation and validation. For instance, an agent-based model allows us to incorporate learning on the part of Dealers and Investors, as well as to investigate dynamics, which otherwise may not be amenable to existing analytical techniques. Particularly when individual agents learn or adapt over time, the resulting co-evolution is normally completely intractable. The computer simulation becomes the scientific tool by which we may model, and begin to understand, such systems.

Preferably, this market model is implemented with a platform in the Java programming language for simulation and investigation of such a market. The simulation consists of a computational Agent-Based Model (ABM) of a market that trades securities. We have used the model to investigate questions involving dealer strategies, especially parasitic strategies, and their implications for real-world issues for stock market exchanges such as Nasdaq. The present invention investigates decimalization (the reduction of the minimum quote increment or tick-size to and the market's effectiveness at performing price discovery under different proportions of parasitic strategies. Our results indicate that a move towards decimalization may have a significant negative impact on price discovery in the presence of parasitic strategies, and perhaps slightly impede it in a non-parasitic market. The model can also be used to investigate other issues.

These models, and the need to validate them experimentally, arise out of very practical considerations about the microstructure of security exchanges such as Nasdaq. In recent years, Nasdaq has changed the way it works, e.g., the new order handling rules and the recent proposal to decimalize the system by reducing the tick size to a penny. Every one of these structural changes has the potential to produce sweeping effects in the structure of the market-consequences not necessarily intended by their implementers.

To this end, the present invention includes an agent-based model of a dealer-based market. This computer simulation represents the players in the market, Dealers and Investors, as "agents." Agents are computational objects that behave so as to maximize some fitness criterion. In the case of a market, the fitness is (at zeroth order) profitability, with additional criteria, such as risk aversion, appearing as higher-order corrections. This model provides an "economic laboratory" to explore the behavior of the market and the consequences of modifying its institutions and rules.

The main questions we address concern the effects of tick-size, parasitism and their interaction with the market rules and structures. In addition, these models are quite capable of providing research tools for many other topics. The models are particularly adapted to provide reasonably robust answers to the focal questions of our investigation.

Parasitism is broadly defined as a strategy which attempts to make a profit without contributing to the process of price discovery. We will also use parasitism with a slightly different, albeit intuitively clear meaning—as an ability to take advantage of other players' actions. As discussed later, in the latter sense some players may behave as parasites, even without "consciously" realizing or attempting to do it where "consciously" means that its rules may not explicitly imply any parasitic behavior. An example of an explicitly parasitic strategy might be a strategy in which the trader hangs back (behaves non-competitively) until market conditions are ripe for exploitation and then trades inside the spread, making a quick profit. In the context of double-oral auction markets, such strategies were observed to be highly effective, outperforming all others as indicated in Rust, John, John Miner, and Richard Palmer (1993): "Behavior of Trading Automata in a computerized Double Auction Market", *The Double Auction Market: Institutions, Theories and Evidence*, Reading, Mass.: Addison-Wesley, the contents of which are herein incorporated by reference.

The main intention of the model of the present invention is to create a population of interacting agents (Investors and Market Makers/Dealers) that together produce price discovery in the marketplace. The Java simulation we have implemented is very powerful, and can incorporate additional features of the real world, such as a limit-order board, trading of multiple shares, or trading in a wide range of volumes etc.

The market contains a plurality of securities whose value is exogenously specified: the underlying value of the security is assumed to fluctuate according to a random walk with a drift. The market consists of a finite population of players trading in that single security. We have two types of players: Dealers (Market Makers) and Investors.

Each Investor has access to the current "true" value of the underlying security adjusted by an idiosyncratic error, which in turn is determined by the investor's degree of informedness. The simulations were run with errors distributed by a Gaussian law. The simulations can also investigate information time lags as well as errors.

Dealers, on the other hand, do not have any prior information about the "true" price. To a certain extent, competition drives Dealers to discover the price through market interactions (this is the process of price discovery which markets mediate). Dealers are obliged at every moment to post their current bid and ask prices, and their volumes, on the public board. Investors decide whether they consider a purchase or sale of the security beneficial to them (by comparing their knowledge of the true value with the current market quotes), and, if so, they execute a trade at the best available price.

The timing of the simulation is determined by a scheduling agent, which assigns to every player (dealer or investor) a period of time in which the player is able to take his next action. An action for a dealer is to choose his bid and ask price, and for an investor is to buy or sell at the best currently available price. A dealer can also update his quotes after every transaction he performs. There is much flexibility in the model with respect to the relative frequency with which each dealer and investor acts. In most simulation runs, dealers acted at a fast rate, with investors having a larger range of rates, from very fast to quite slow. The scheduling process could be adjusted to model the order flow of different kinds of security.

Each player is endowed with a fixed quantity of money and a fixed initial inventory. The total number of units of the security can be fixed in the simulation. If at any time a player's total assets fall below a negative constant (fixed at −$1000 in most of our runs), that player is removed from the simulation and replaced by another who's strategy parameterization is randomly selected. The old player's inventory (positive or negative) is redistributed to the remaining players (who are charged/compensated accordingly). Since the new player has an initial endowment of cash, money flows into the system as a consequence of player bankruptcy.

The model market consists of a framework in the Java programming language. This framework includes the model market, which is populated with Dealer and Investor agents who trade in one security; an agent scheduler, and a graphical user interface that allows one to control the microstructure of the market and monitor the progress of the simulation from both macroscopic (statistical) and microscopic (agent) points of view. The core simulation code can also be run separately from the graphical user interface (in "batch mode").

Figure 2:
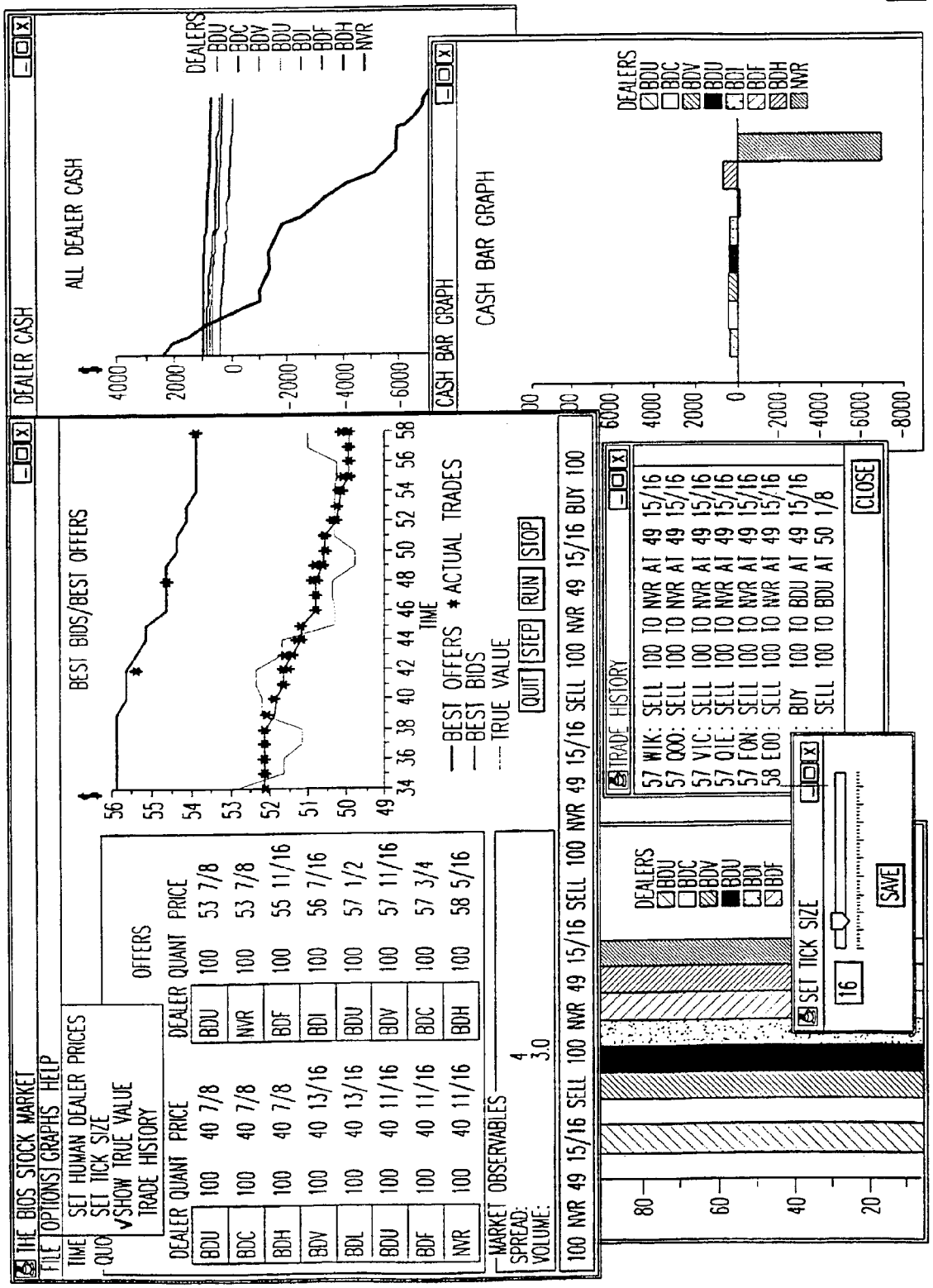
FIG. 2 shows a screen shot of the simulation of the dealer-mediated securities market model.
Figure 3A:
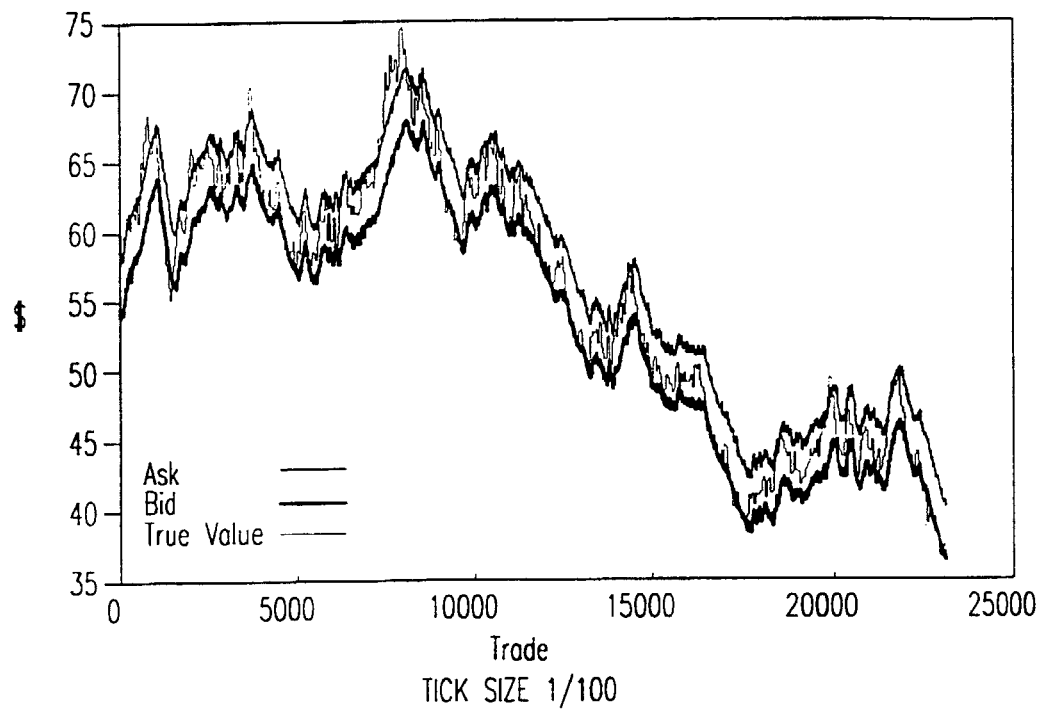
FIG. 3 shows the behavior of the population of Basic Dealers for different tick sizes.
Figure 3B:
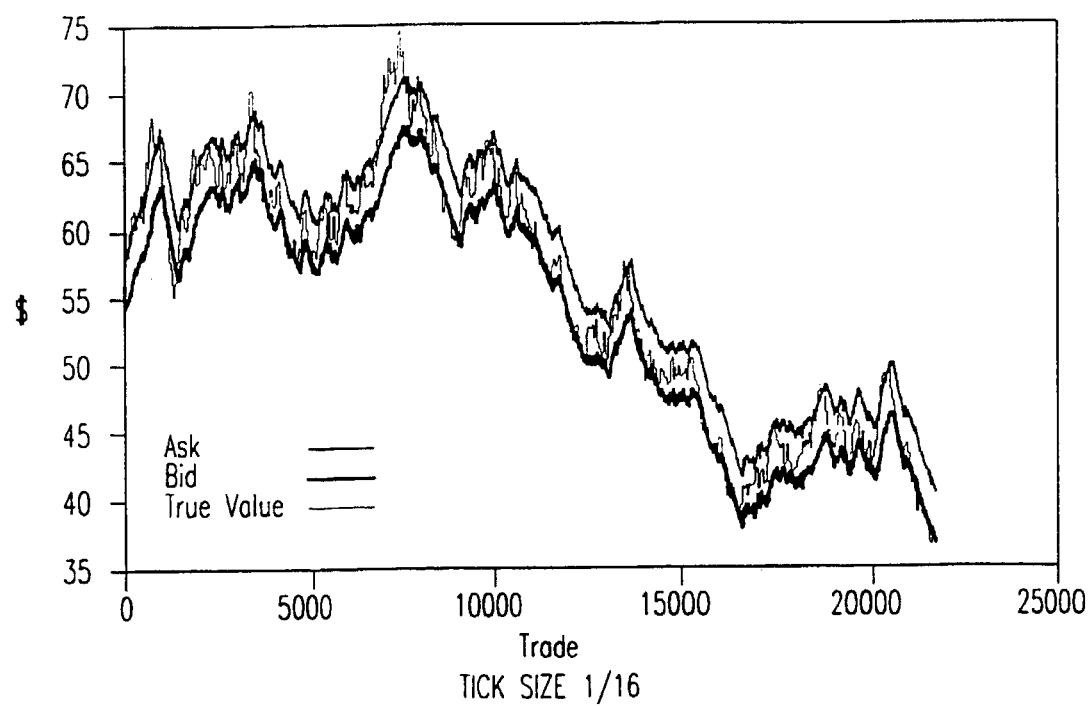
Figure 3C:
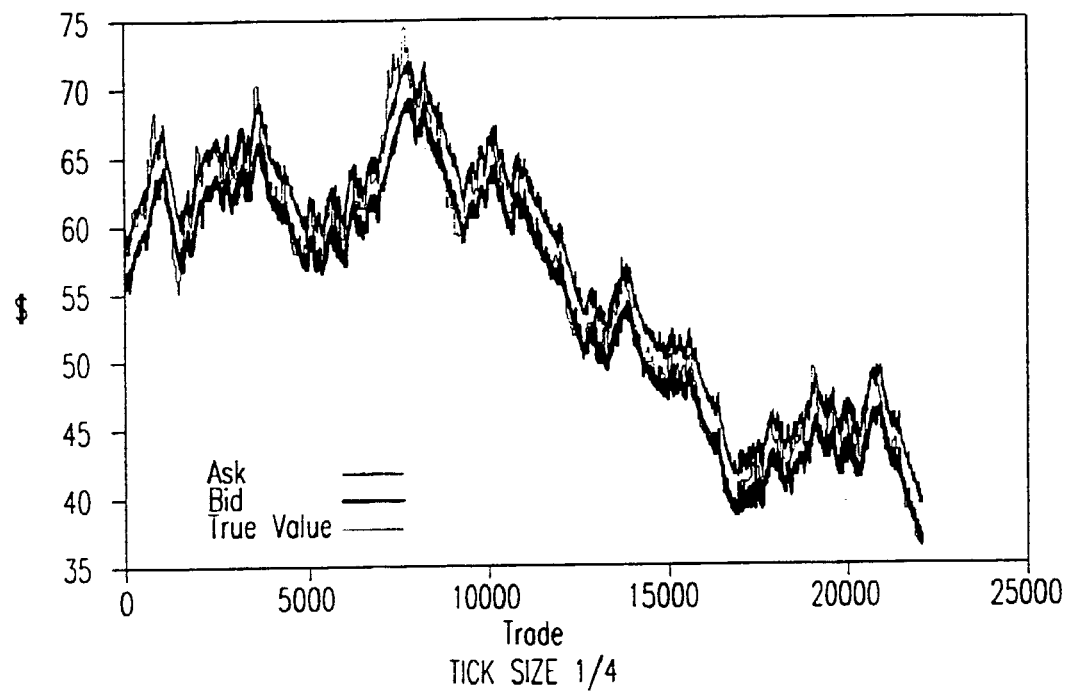
Figure 3D:
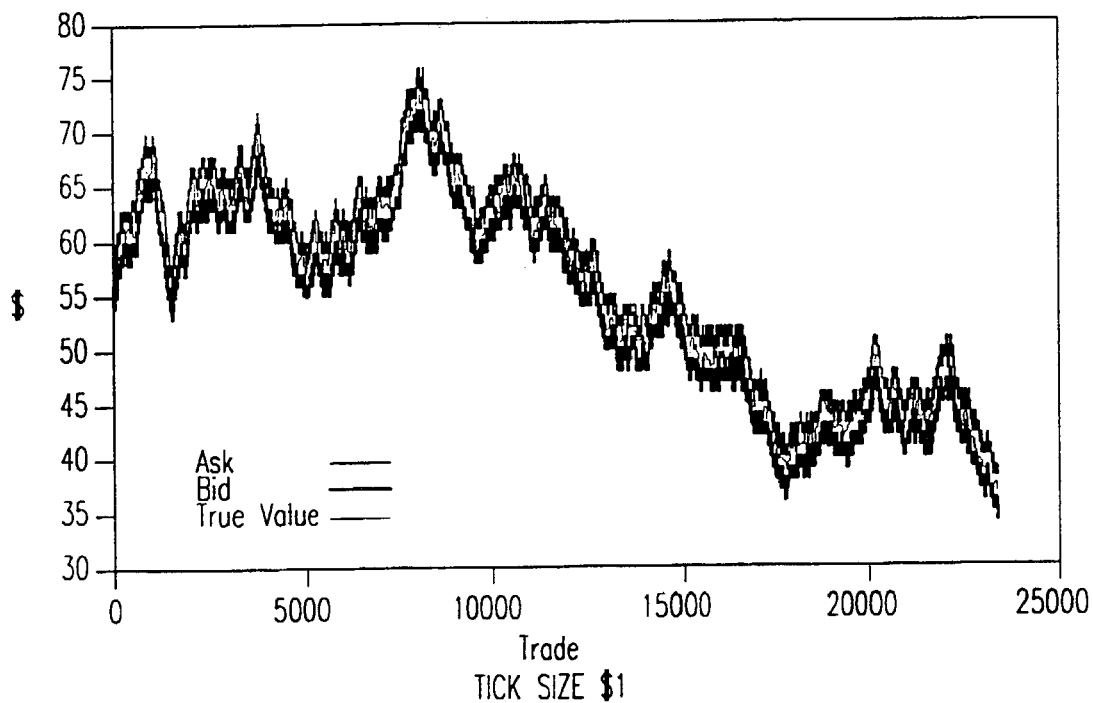
Figure 4A:
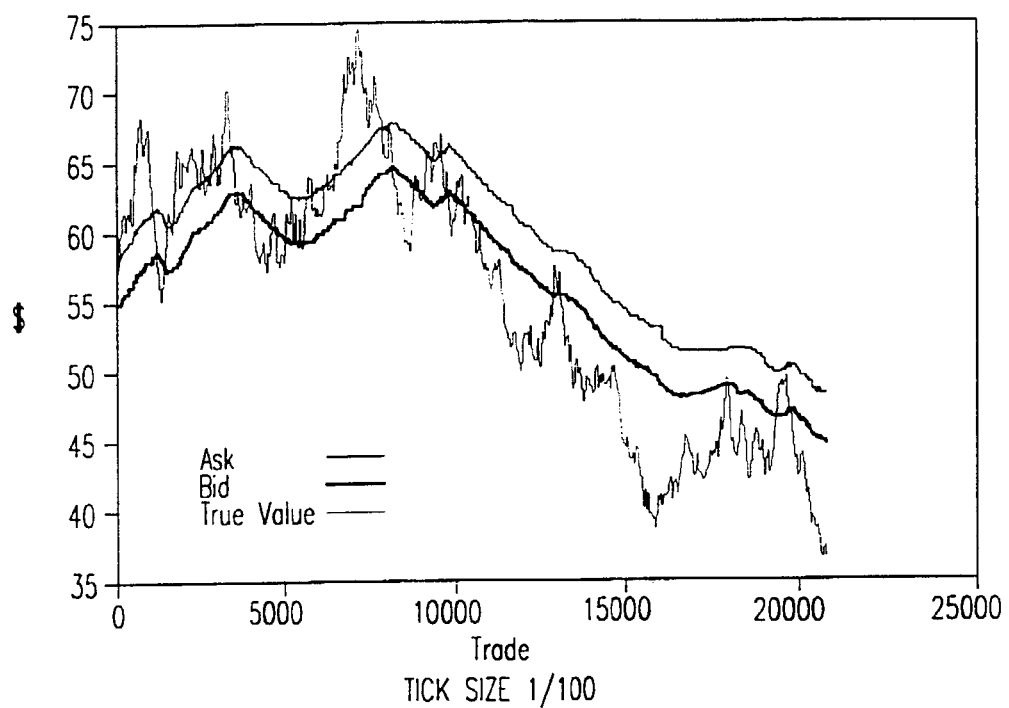
FIG. 4 displays the results of the dealer mediated securities market model for a market consisting of 7 Basic Dealers and one parasite.
Figure 4B:
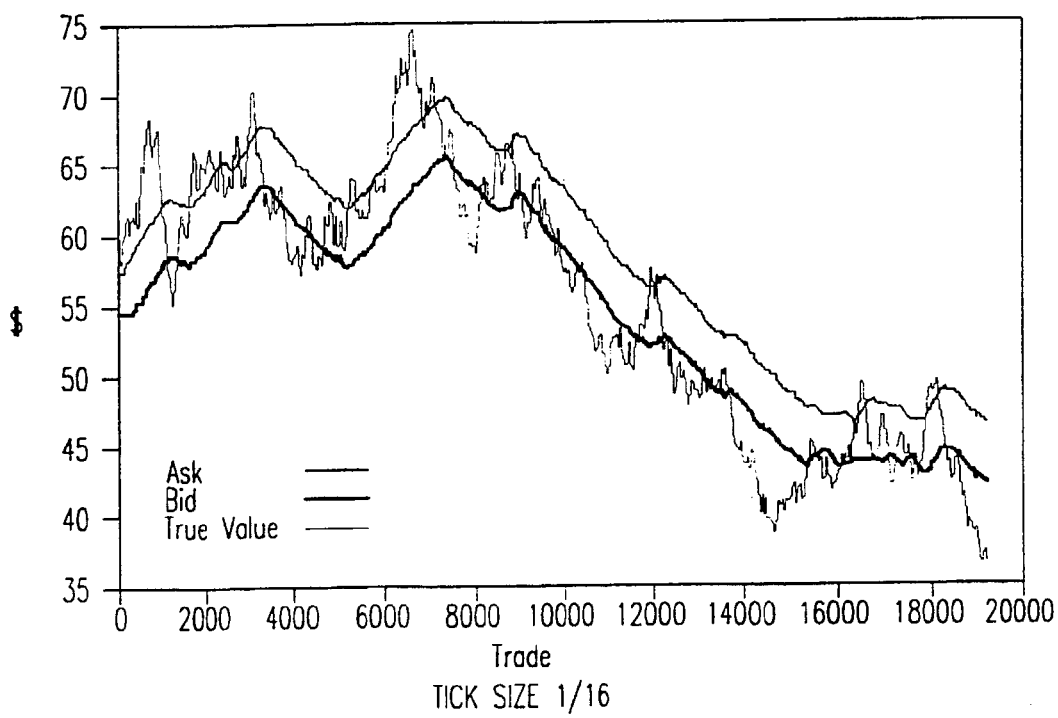
Figure 4C:
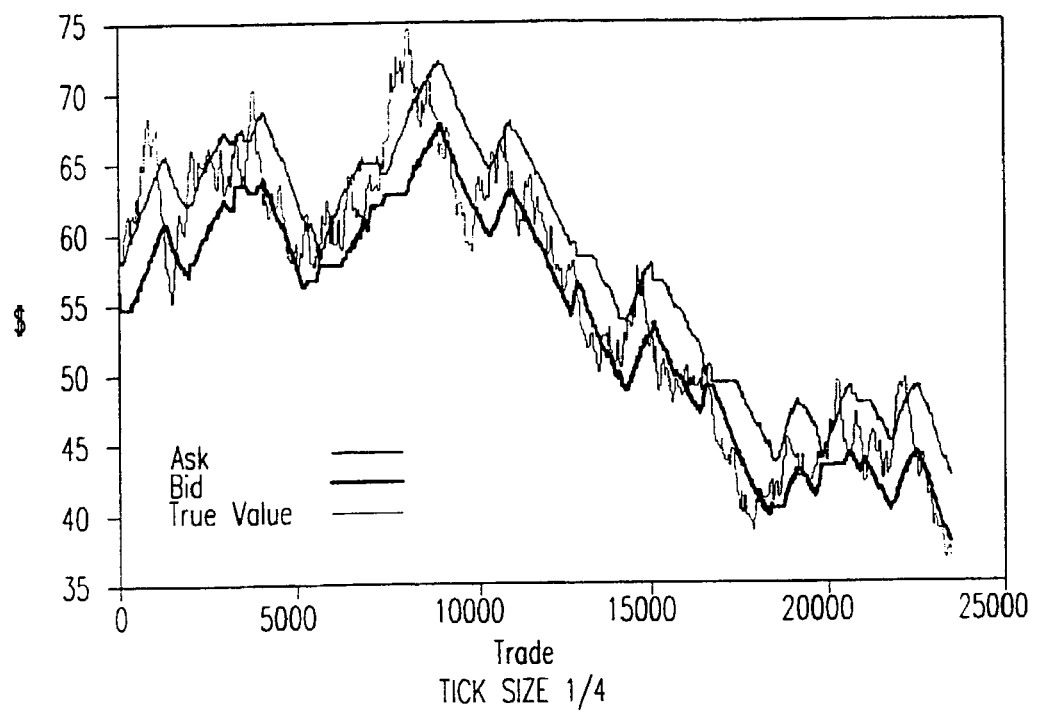
Figure 4D:
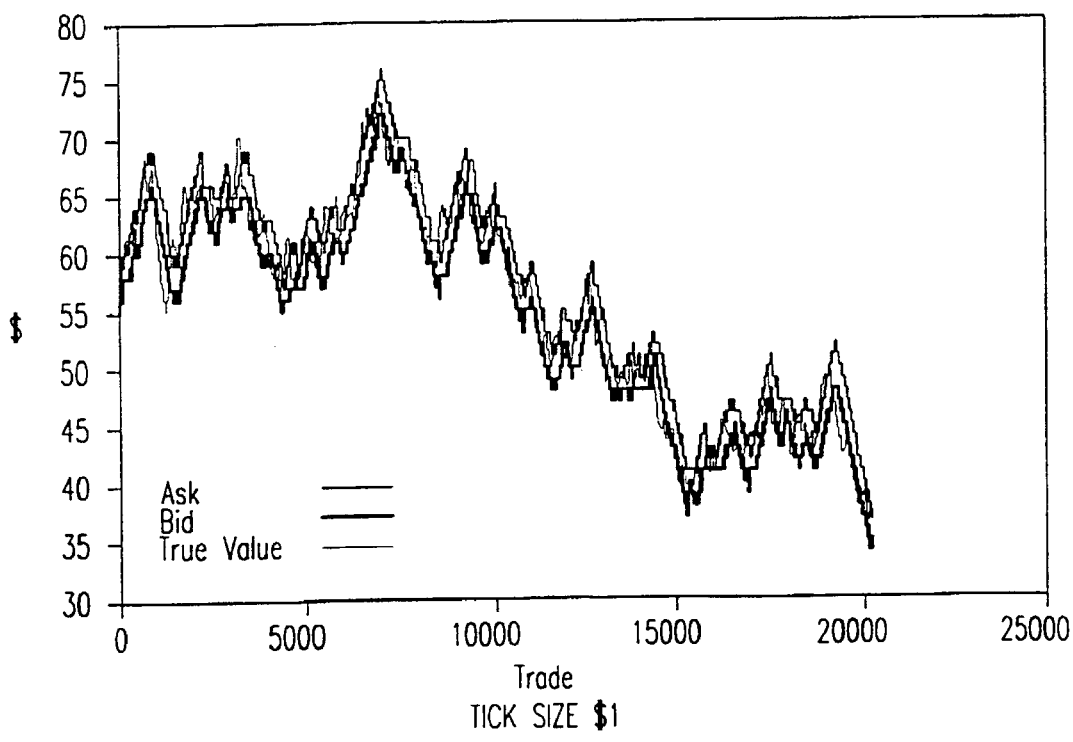

At the highest level, the simulation consists of four types of software objects: Price, Dealers, Investors, and the Market itself. At the next level down, all of these objects have member objects that provide communication and bookkeeping capabilities. A detailed breakdown of the simulation and its component objects is given later. FIG. 2 shows a screen shot of the simulation of the dealer-mediated securities market model. Each menu and chart shown is described in detail later.

The models represent agents' fitness functions and strategies. We have two types of strategies: Dealer strategies and Investor strategies. Both types of agents are concerned with making money. However, Dealers, as the mediators of all trading, have much more latitude in their strategies. Dealers must set both bid and offer prices and volumes. Investors must decide only on the course of action at any given moment, namely, whether to buy or sell at a given price and how many shares.

The underlying value follows a stochastic dynamic. At each opportunity to trade, an Investor is given this value plus some amount of error corresponding to his degree of "informedness." If a Dealer's current prices are below (above) the Investor's perception of value, then the Investor will buy (sell) one or two shares of the security. Using this strategy, we can easily set the proportion of informed Investors, as in the GM model, while retaining a much more realistic model of market dynamics. The present invention also comprises investors who wish to trade a range of volumes.

The core of our current work focuses on Dealer strategies, where there is a very rich environment for research. Our main goal was to investigate the effects of parasitism, tick size, and the combination of both on the market. For that, we have developed two broad classes of dealer strategy: one that makes price discovery happen, and another that uses information created by the rest of the population (parasitic strategies). As discussed later, there is not a clear distinction between the two. With this goal in mind, we developed and implemented several specific Dealer strategies:

- A "Basic Dealer" only reacts to trades which come his own way. He maintains his quotes until he receives a certain number of trades on the buy (or sell) side, and then adjusts the quote on that side appropriately. It is a simple strategy which manages to track price very effectively, in the absence of parasites.
- A "Price Volume Dealer" tries to deduce from the market data the current demand and supply schedules and thus decides whether the current price is above or below of the "true" value. From that data the dealer decides what bids and asks to quote. For this particular type of dealer it is also very easy to decide what volume to sell, which may be a very valuable feature for a market, where volume is determined endogenously.
- A "New Volume Dealer," is a modification of the previous type. He looks on the past discounted volume only, without explicitly taking the price into account. If the New Volume Dealer observes that there were more buys in the past, he concludes that the price is probably above the true value. The simplest version of this dealer reacts by increasing the ask price above the current market price. If the converse holds (there were more sells in the past), the dealer reacts by lowering his bid price. A slightly more sophisticated version of this dealer adjusts both bid and ask as a reaction to excess demand or excess supply (there is a parameter that allows to fine tune this dealer). When excess demand/supply is small enough (a Volume Dealer has a benchmark to determine this), the dealer concludes that the price is right and jumps inside the spread, essentially acting as a parasite. Surprisingly enough, even such a simple rule allows the population of the New Volume Dealers to track the prices really well.
- A very important strategy for our model is the "Parasitic Dealer" strategy. Parasitic Dealers do not actively participate in the price discovery process; rather, they "hang back," waiting until a sufficiently narrow spread with sufficient volume appears on the board. They then "steal the deal," buying and selling the security inside the spread. Such strategies have been shown to be both effective for the dealer employing them, and destructive to the market's function of price discovery as explained in Friedman, Daniel, and John Rust, eds. (1993): *The Double Auction Market: Institutions, Theories and Evidence*, Reading, Mass.: Addison-Wesley. On at least one major exchange, this strategy is well understood and strongly, albeit unofficially, discouraged. On the AMEX, this process is known as "steenthing the market", named from the practice of shaving a sixteenth of a point off the existing spread to steal the deal. While it is not officially outlawed, it is unofficially forbidden and occurs very rarely in practice.
- A somewhat more sophisticated version of a parasitic dealer, called "New Parasite," also looks at the excess supply/demand and decides whether it makes sense to jump inside the spread or not. This version of the parasite performs quite well in most of the markets we have experimented with.
- A "Matching" dealer who contains a collection of observations and actions. He learns connections between observations and actions which are profitable. Examples of observations are: "my inventory is high", "the spread is large", "my bid is below the market", "my inventory is near zero". "trade volume is high". Examples of actions are more obvious: "raise my quotes", "increase my bid", "narrow my spread".

A "Classifier" dealer is similar to the Matching dealer, except he learns over patterns of observations. For instance, instead of just matching one of the aforementioned observations. The classifier dealer might learn that "when volume is high" and "my inventory is near zero" and "my spread is large" it is profitable to "narrow my spread". This space is much richer, clearly, but therefore much larger and harder to learn in.

A "Dynamical System" dealer uses a discrete dynamical system to set his bid-ask spread and mean price. If one regards mean price, P. as a source or a sink of inventory, I, and the bid-ask spread, S, as a source or a sink of cash flow, C, then generically a system of the form:

$$\frac{dP}{dt} = -f(I)$$
$$\frac{dS}{dt} = g\left(\frac{dC}{dt}\right)$$

where f is monotonically increasing in I and g is increasing in C, will yield dynamics that are similar to those used by a real dealer. This can be seen in the P equation by considering the effect of changing inventory. If $f(I_0)=0$, then P will remain fixed; as I increases past $I_0$, P will start to decrease, which will generically lead to more sells than buys, reducing inventory until the equilibrium value $I_0$ is again reached. Similarly, as cash flow increases, this implies that there are additional profit opportunities, so the dealer should increase his spread;

$$g\left(\frac{dC}{dt}\right)$$

will also increase, causing the dealer to raise spread to capitalize on the increasing market volume. Clearly, one can make this simple formula more sophisticated by using a predictive model of C or I based on the order flow and pricing observed in the real market.

The names of these strategies are somewhat arbitrary and even misleading: for instance, the "New Volume" dealer turned out to be a very effective parasite.

There are two senses in which evolutionary agents have been investigated in this model. First, in the simpler sense, running the simulation for long periods of time, while incorporating mutation of the parameters inside dealers' strategies, allows one to discover good values of those parameters (although the actual good values of these parameters may depend upon the other dealers in the is simulation).

Second, one can use evolutionary approaches at a higher level to discover good strategies. Two of our dealer strategies are of this form: the "Matching Dealer" and the "Classifier Dealer." These are significantly more sophisticated types of strategies: the dealer has a whole repertoire of possible strategy building blocks, and by trying them out attempts to learn what the optimal strategies are. Our "Classifier Dealer" uses an approach very similar to classifier systems in the machine learning literature. These strategies must be run for very long periods of time to allow the agents to learn the connections between observables (quote changes, trade volume, inventory level, . . . ) and useful responses (changes to bid and offer) in the market.

Our results indicate that the choice of strategy building blocks is of vital importance in allowing evolutionary learning approaches to function effectively (analogous results are well known in the fitness landscape and optimization literature). The literature supports our result that a sophisticated strategy is by no means certain to be more successful. For instance, the Double Auction Market explained in Rust, John, John Miner, and Richard Palmer (1993): "Behavior of Trading Automata in a computerized Double Auction Market" found that the simplest parasitic strategy was the most effective. Furthermore, as suggested by Darley, Vincent M., and Stuart A. Kauffman (1997): "Natural Rationality" in *The Economy as an Evolving, Complex System II*, ed. by W. Brian Arthur, David Lane and Steven N. Durlauf, Reading, Mass.: Addison-Wesley (the contents of which are herein incorporated by reference), there may be some bound on the sophistication of a strategy for it to be effective in a system of co-evolving agents. We will discuss the issue of more complex, sophisticated Dealer strategies later.

Our primary results concern the influence of tick size and parasitic strategies on the market's effectiveness at price discovery. Within the current model, the underlying value of the single stock is exogenously specified, which allows a precise measurement of how effectively the market follows that underlying value, as we will discuss later.

Our particular focus has been to investigate the effects of introducing parasitic dealers into the market, to determine what level of parasitism the market can support before its functionality becomes degraded. We then investigate how that degradation occurs at varying tick sizes.

Our first observations are for systems consisting entirely of non-parasitic strategies. It has been discovered in the simulations that these systems track the underlying value somewhat more closely with larger tick sizes. FIG. 3 shows the behavior of the population of Basic Dealers for different tick sizes. Visually, we can see that the three curves plotted (best bid, best offer, and true value) are closer together at a larger tick size, although the difference is small (more precise quantitative measurements are given later).

The second set of observations concerns the introduction of parasites into the system. A number of different parasitic dealer strategies have been investigated, of varying sophistication. These results hold for each parasitic type. We observe that price discovery is largely unimpeded at large tick sizes, but dramatically affected for small tick sizes. FIG. 4 displays the results of the dealer mediated securities market model for a market consisting of 7 Basic Dealers and one parasite.

Figure 5C:
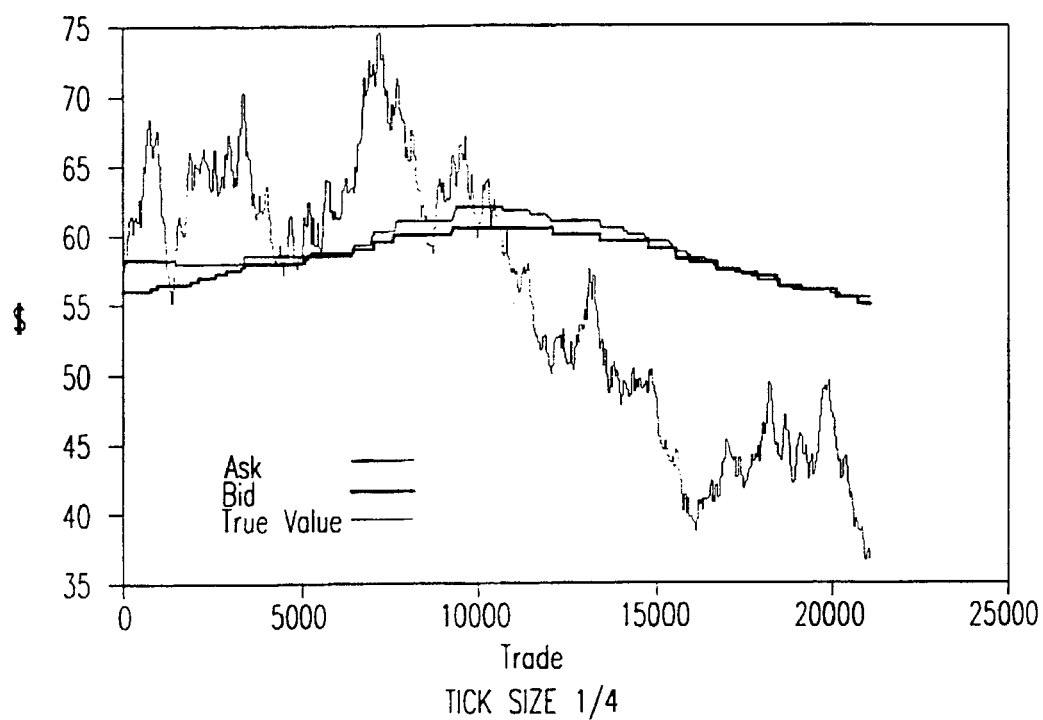
FIG. 5 displays the results of the dealer mediated securities market model for a market with a mixed population of dealers.
Figure 5D:
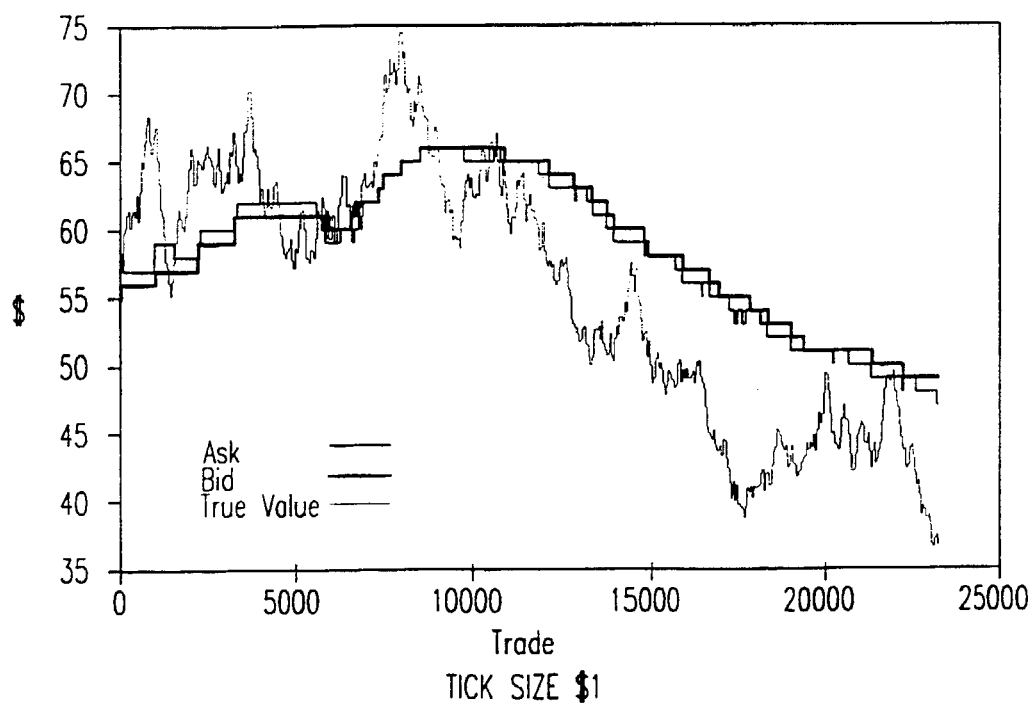

FIG. 5 displays the results of the dealer mediated securities market model for a market with a mixed population of dealers (we will call it a mixed market in the future); some parasitic and some not. This market contains a much higher proportion of parasites than the preceding ones, including some of the more extreme types of parasite.

Since we are using a "true" value for the price, we are able to quantify the impact of different strategies and market structures. In particular we have examined data on the statistical distribution of (best bid –true value)$^2$, (best offer –true value)$^2$, average value of the spread and standard deviation of the spread over time as estimates of the market's ability to track price.

The statements about price discovery and tracking the market in the preceding discussion are intuitively clear. A quantitative criterion, nevertheless, would be useful, especially to distinguish similar cases. We will define market tracking as consisting of two different components:

1) The market bid and ask prices are close to the true value, and
2) The true value is inside the market bid and ask.

As one can see, these two conditions do differ: it is possible for the market to "follow" the true price while the true price is outside the spread. It is also possible to observe that the market reacts very slowly to the true price although the true price stays inside the bid-ask spread, essentially because the spread size is large. Obviously, some regimes of tracking the price are more beneficial for Dealers and others for Investors.

With this in mind, we quantified the market's ability to track prices by four different parameters:

1) the square root of the average squared (bid-True Value). We will denote it RMS(bid-True Value) where RMS means Root-Mean-Square.
2) the square root of the average squared (ask-True Value), which we will denote as (RMS(ask-True Value))
3) average value of the spread
4) standard deviation of the spread.

While a combination of these variables is not necessarily the best measure of market success (for one thing, it does not gives us a proportion of time when the true value was inside of the spread), it gives us a very good idea of market performance.

Figure 6:
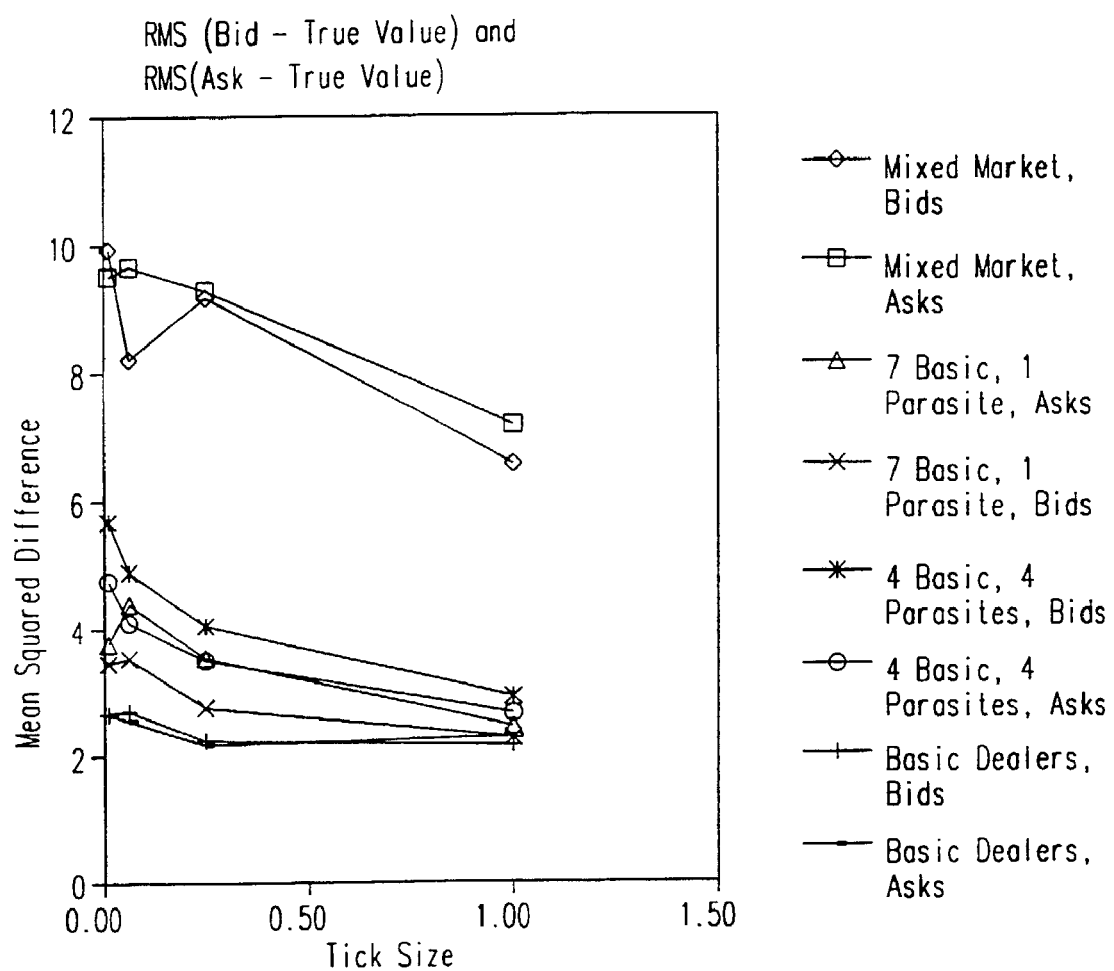
FIG. 6 shows graphs of RMS(bid-True Value) and RMS (ask-True Value) as a function of the tick size for different populations of Market Makers in the dealer-mediated securities market model.

FIG. 6 shows graphs of RMS(bid-True Value) and RMS (ask-True Value) as a function of the tick size for different populations of Market Makers in the dealer-mediated securities market model. It can be clearly seen that both parasites to the market, and decrease with the tick size.

Figure 7:
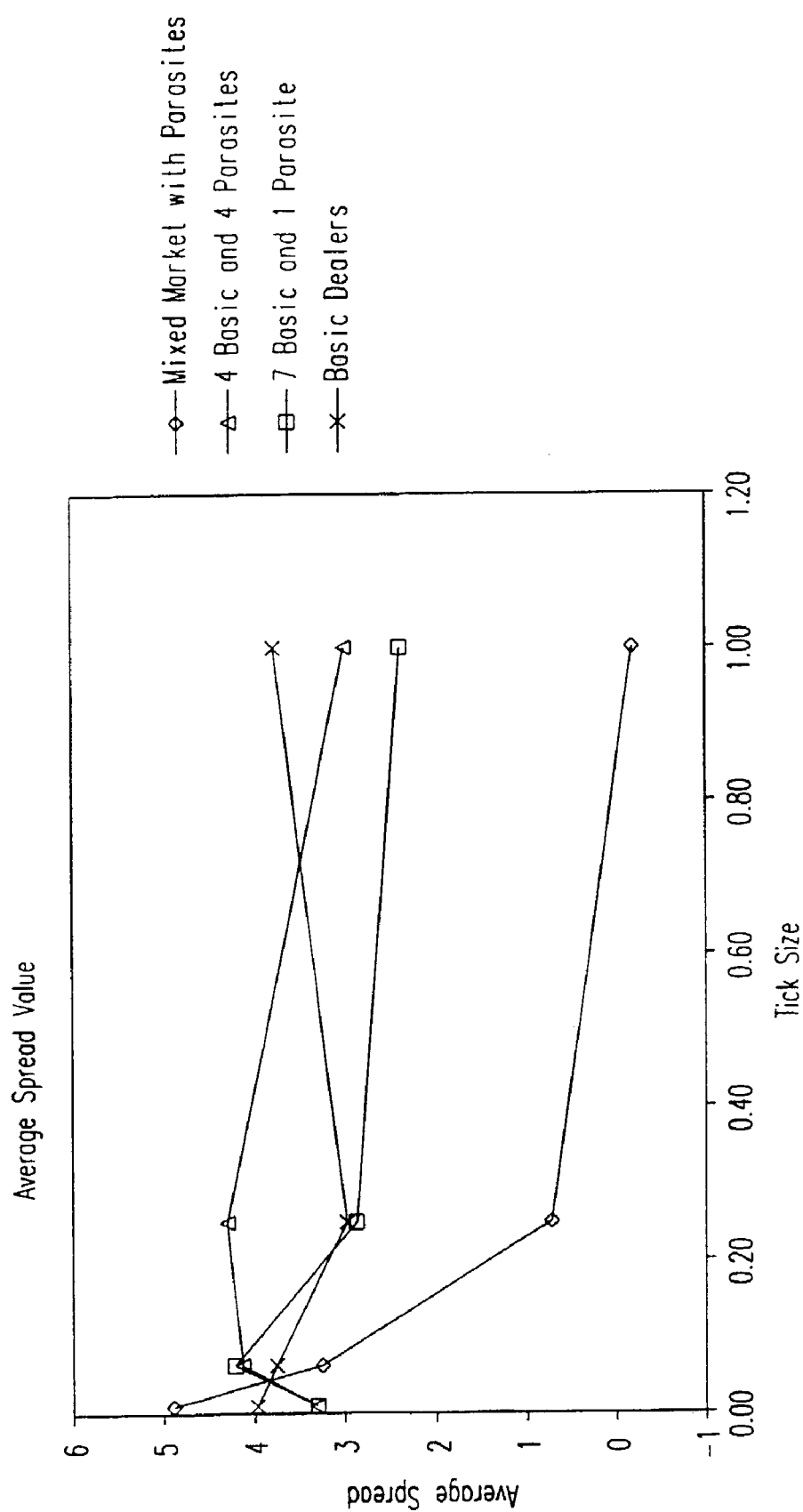
FIG. 7 shows the average value of the spread as a function of the tick size for different combinations of the market makers in the dealer-mediated securities market model.

FIG. 7 shows the average value of the spread as a function of the tick size for different combinations of the market makers in the dealer-mediated securities market model. There is one simulation where the spread was negative; that happened probably because of a very large tick size and of the fact that the market makers make their decisions simultaneously, therefore there is a possibility to "overshoot".

Figure 8:
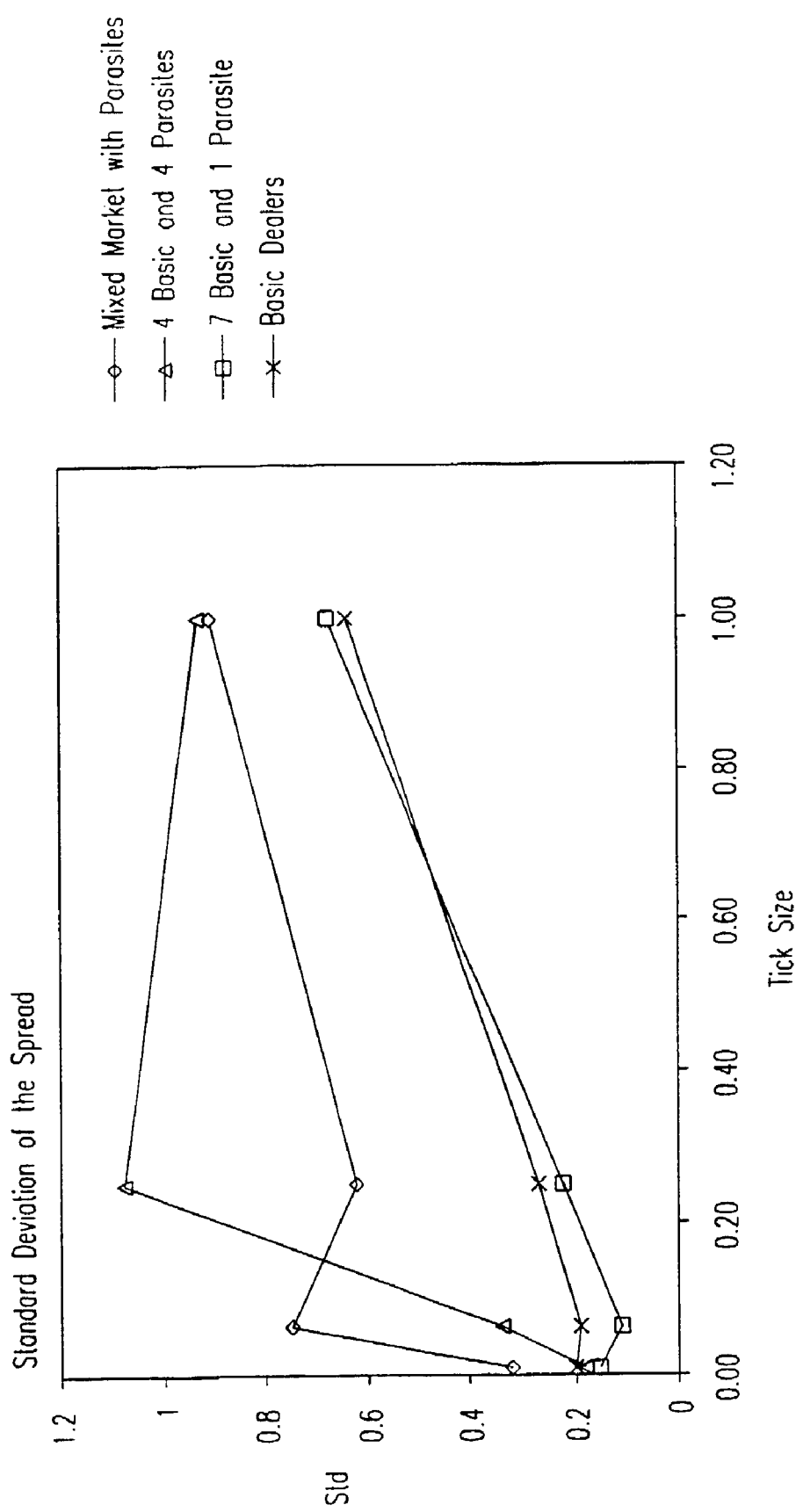
FIG. 8 shows a graph of the standard deviation of the spread size as a function of the tick size for different populations of Market Makers in the dealer-mediated securities market model.

FIG. 8 shows a graph of the standard deviation of the spread size as a function of the tick size for different populations of Market Makers in the dealer-mediated securities market model. The results are mixed, but quite surprisingly one can see that the standard deviation increases somewhat with the tick size. We can also see that the introduction of parasites into the market can increase the standard deviation of the spread.

The model is reasonably complex, and a number of other interesting phenomena have been noted (like patterns of wealth distribution among dealers, different market regimes). Our ability to measure how well the market is executing the process of price discovery under different circumstances can also help us to understand the interaction of inventory, liquidity (implied by price-volume combinations listed on the board), and volatility.

Further, we note that when investors are largely uninformed (i.e., their knowledge of the underlying value of the stock is very poor), any collection of dealers has great difficulty in tracking the true price. Empirically, the reason for this is clear: when most investors are uninformed, no matter where the market bid and offer are located, roughly equal numbers of investors will buy and sell, so very little can be learned by the dealers.

One relatively obvious way in which parasitism affects market behavior is that, by their mere existence, parasites decrease incentives for the market participants to aid in the process of price discovery (Rust, John, John Miner, and Richard Palmer (1993): "Behavior of Trading Automata in a computerized Double Auction Market", in *The Double Auction Market*). A less obvious observation, however, is that parasites can produce useful information just by jumping inside the spread. The quantity and quality of this information does depend on the tick size. For example, if a parasite has undercut the market by a significant amount, the effects of that undercut (for instance, on market volume on the buy or sell side) tell the market participants much more about the liquidity, demand, underlying fundamentals, etc., than when the price increment is negligible. Undercutting by a significant amount also carries more risk and less profit. It is this effect, we hypothesize, which allows price discovery to continue reasonably well at a large tick size, even in the presence of large numbers of parasites: by jumping inside the spread by a large amount, a parasite causes a significant change in the volume of trades on that side of the spread, which provides useful information to the market. When tick-size is small, the marginal impact of jumping inside the spread on trade volume is negligible, and hence parasites operate without providing useful information to the market. A decreasing tick size will make parasitic behavior more profitable, since the points shaved represent higher profit for the parasite.

If changes in the underlying market are quite large (i.e., the volatility of the security is large), it may be difficult for the market to track price effectively. In this case, it may be true that a larger tick size encourages better price discovery because the coarse-graining effect of the tick size allows for more rapid price tracking. One would anticipate that this result holds true at least for simple strategies, but that more sophisticated strategies could perhaps follow price changes equally well with a large or a small tick size. Our results so far support the idea that simple strategies can follow price slightly more effectively with a large tick size. They also suggest that, even if sophisticated strategies could track price well at all tick sizes, in the presence of parasites this tracking would be highly impaired at a small tick size.

We further conjecture that a somewhat unexpected relationship between the tick size and the spread may hold if the ability of the system (and therefore of an individual dealer or investor) to adjust depends on the tick size. Under that condition, the dealers' profit (which depends upon their ability to adjust) will depend upon the tick size; since dealers will often adjust their spread to account for profit/risk tradeoffs, their spread will in turn depend upon the tick size.

The present invention includes an Agent-Based Model of a stock market with a reasonably diverse population of dealer strategies which has allowed us to investigate the focal questions of tick size and parasitism quite effectively. Our main findings at the present stage pertain to the effects of tick size and of parasitism on the market's performance and on its ability to carry on the process of price discovery. It has been shown in the simulations that 1. the ability of the market to track price increases somewhat with tick size, and
2. parasitic strategies impede the process of price discovery, especially for a small tick size.

While unexpected and somewhat counterintuitive, these results seem to be very robust in the present model. They have been repeated time and again for different combinations of Dealers, different levels of Investor informedness, and different parameters of price fluctuations.

The market structure further comprises: a public limit order board must be included, together with a simulated electronic execution system; transaction costs must be included; and the typical statistical volume and size of trade must be configurable (to represent different types of Nasdaq stocks).

This in turn will require a more complex range of investor and dealer strategies. First, investors of varying types should be modeled: from small consumers to institutional investors, and of course day-traders (who would probably represent the main parasitic source in the more realistic market). Here an interesting addition to the concept of investor "informedness" would be information time lags: some investors are watching trading screens; others just read the *Wall Street Journal*. Second, dealer strategies account for the larger market environment (limit orders, greater range of trade size, etc.). Other possibilities which could be incorporated in the model are to allow the investors to choose between the single stock and a surrogate of the market index.

There are two basic modes of operation for the simulation: graphical and batch. The batch mode is most useful for data-gathering purposes. It runs the simulation entirely without a graphical user interface, outputting to a file whichever data the user requests. These files are in a standard text format and can be read by any data/graphing application for analysis and plotting. The batch version runs several orders of magnitude faster than the graphical version, and hence is ideal for the data-gathering purposes necessary to obtain statistically significant, robust experimental results.

This section will first explain the control of the simulation via the graphical user interface, followed by the batch mode features.

Figure 9:
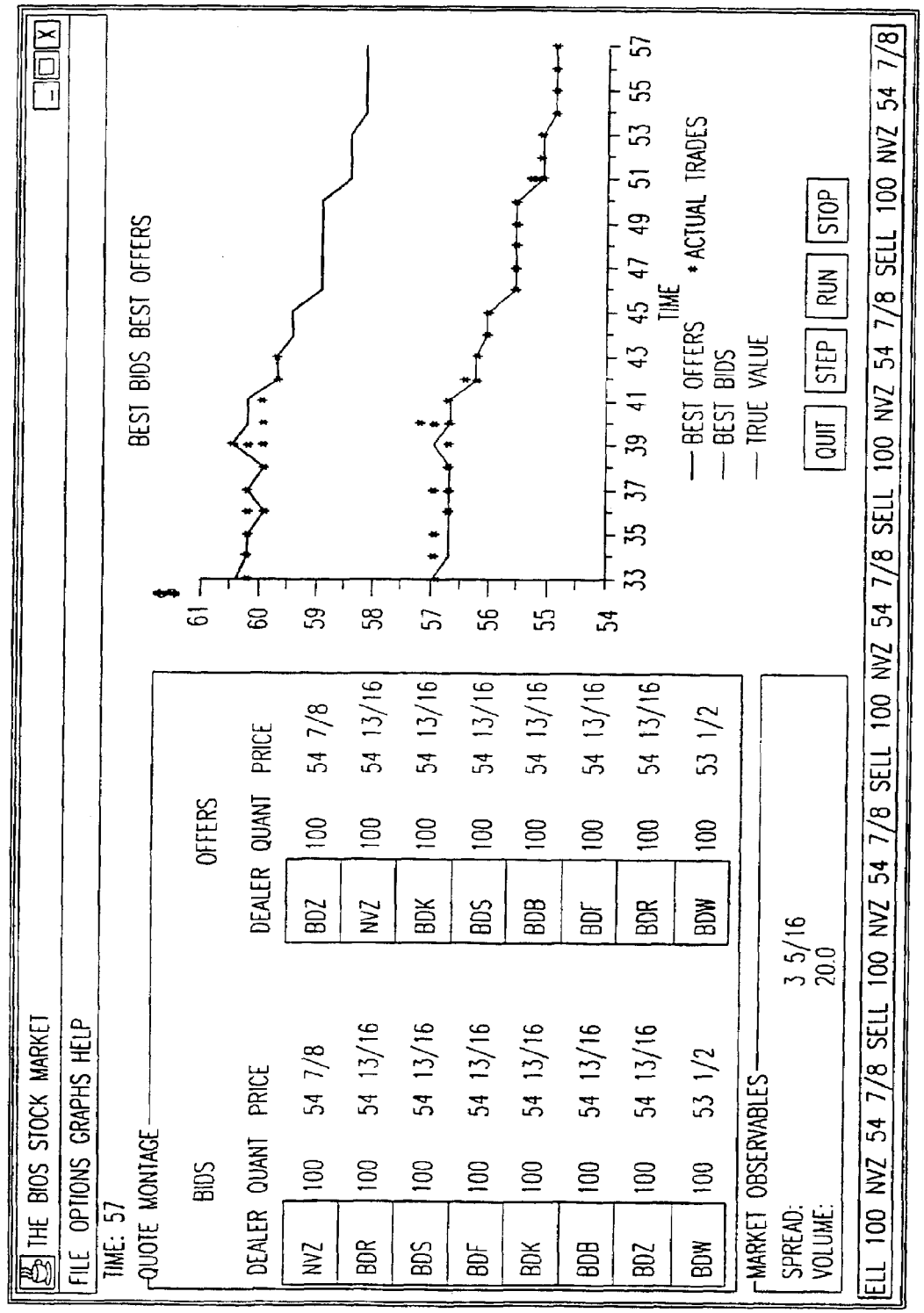
FIG. 9 displays the main simulation control window of the dealer-mediated securities market model.

The graphical version of the simulation is run by double-clicking on the "BiosMarketII" icon. This will bring up the main simulation control window. FIG. 9 displays the main simulation control window of the dealer-mediated securities market model.

The main window is split into two main areas: the "Quote Montage" on the left, and a recent historical view of the best quotes and trades as they occur on the right The quote montage contains each dealer's bid and each dealer's offer, ranked vertically from best to worst (so the largest bid and smallest offer are at the top of the montage). Dealers are identified by a name (a three-letter acronym) and a unique color. The graphs of the dealer's cash, assets, or inventory (discussed later) are also color-coded for easy identification. The first two letters of the acronym represent the dealer's strategy type (for example 'BD' for Basic Dealer, 'NV' for New Volume dealer, 'PD' for Parasitic Dealer, . . . )

The plot on the right contains, by default, a trace in pink of the best offer at each time-step, a trace in yellow of the best bid at each time-step, and asterisks in green of the trades that occur. Since, within each individual time-step, the available best bid/offer may change as trades come in, not all of the trades plotted will lie directly on either the bid or the offer traces.

There are five other parts to the main window: the current time indicator in the top left (since the simulation does not consider the opening-closing trading cycle, the units of time are somewhat arbitrary); the four control buttons in the bottom right; a display of market observables in the bottom left; the menus across the top of the window; and the ticker tape across the bottom that records recent trades.

The four control buttons are as follows: "Quit" terminates the simulation; "Step" runs the simulation for a single time-step; "Run" runs the simulation continuously; "Stop" pauses the simulation (pressing either "Step" or "Run" will continue from that point).

Figure 10:
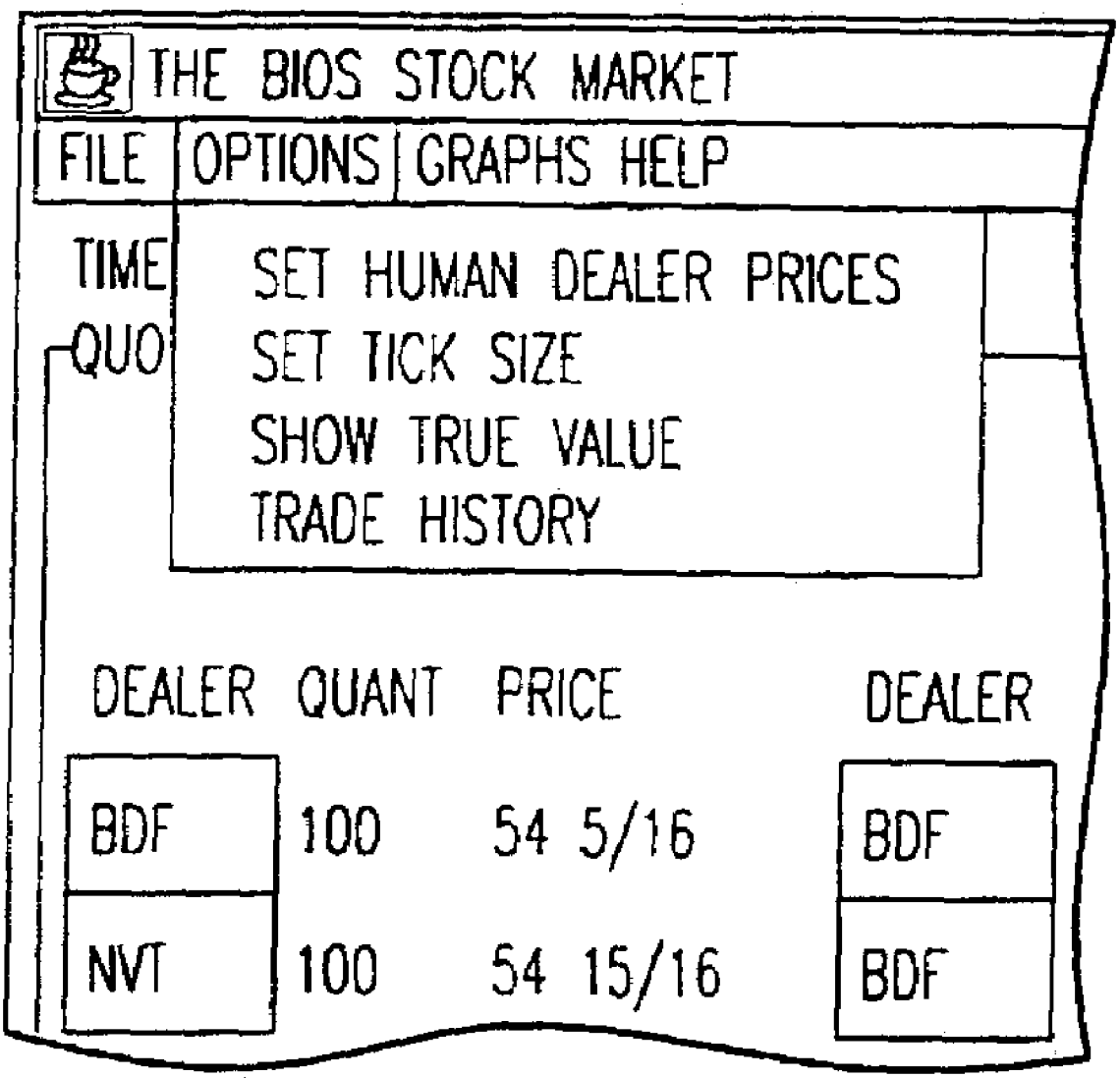
FIG. 10 displays the Options menu of the dealer-mediated securities market model.
Figure 11A:
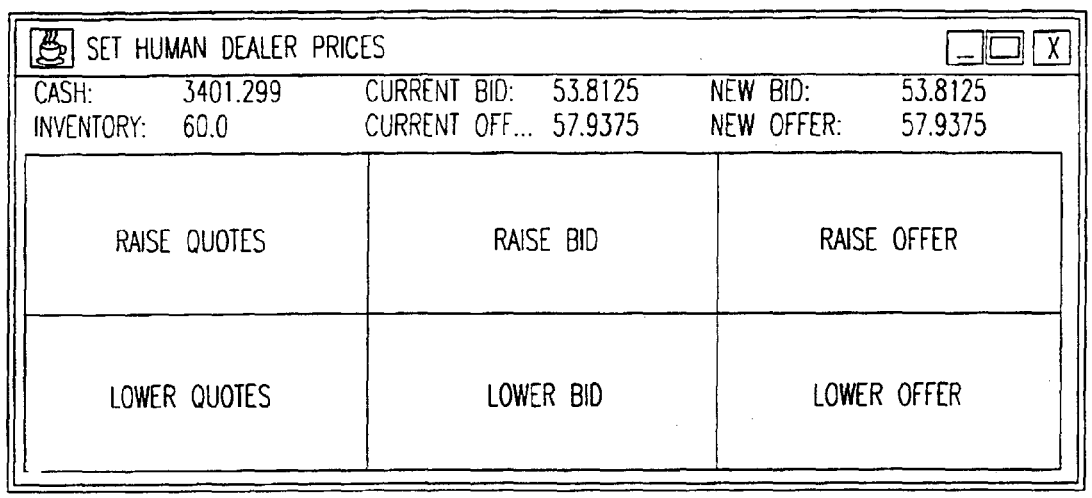
FIG. 11 displays the Set Human Dealer Prices panel and the Set Tick Size panel of the dealer-mediated securities market model.
Figure 11B:
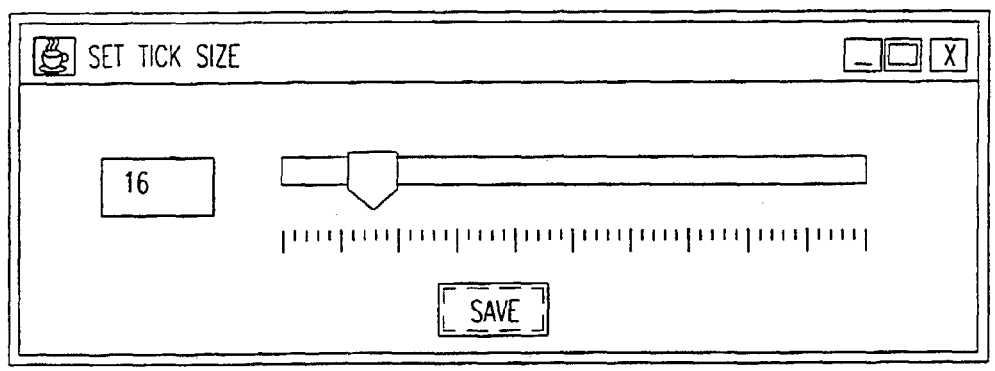

The main simulation control panel contains four menus. First, the "File" menu currently contains a single item, "Exit," which terminates the simulation. FIG. 10 displays the Options menu of the dealer-mediated securities market model. The "Options" menu has four choices. FIG. 11 displays the Set Human Dealer Prices panel and the Set Tick Size panel of the dealer-mediated securities market model. "Set Human Dealer Prices" will, if the current market contains a "human dealer," open a control window that allows the user to control that dealer and thus join in the simulation. By clicking with the mouse, the user can adjust either bid, offer, or both up or down by a single tick. Clicking multiple times will adjust by progressively large amounts. To run a simulation with a human dealer, double click on the 'HumanDealerMarket' icon. Due to the memory consuming nature of Java interfaces, the simulations will tend to run faster if only one is running at a time, so we recommend quitting the current simulation before starting a new one.

"Set Tick Size" brings up a small window which allows the user to adjust the tick size of the current simulation on the fly. It is used by moving a slider to the desired position (from $1 on the left, to $1/100=1 cent on the right), and then pressing the "Save" button.

Figure 12A:
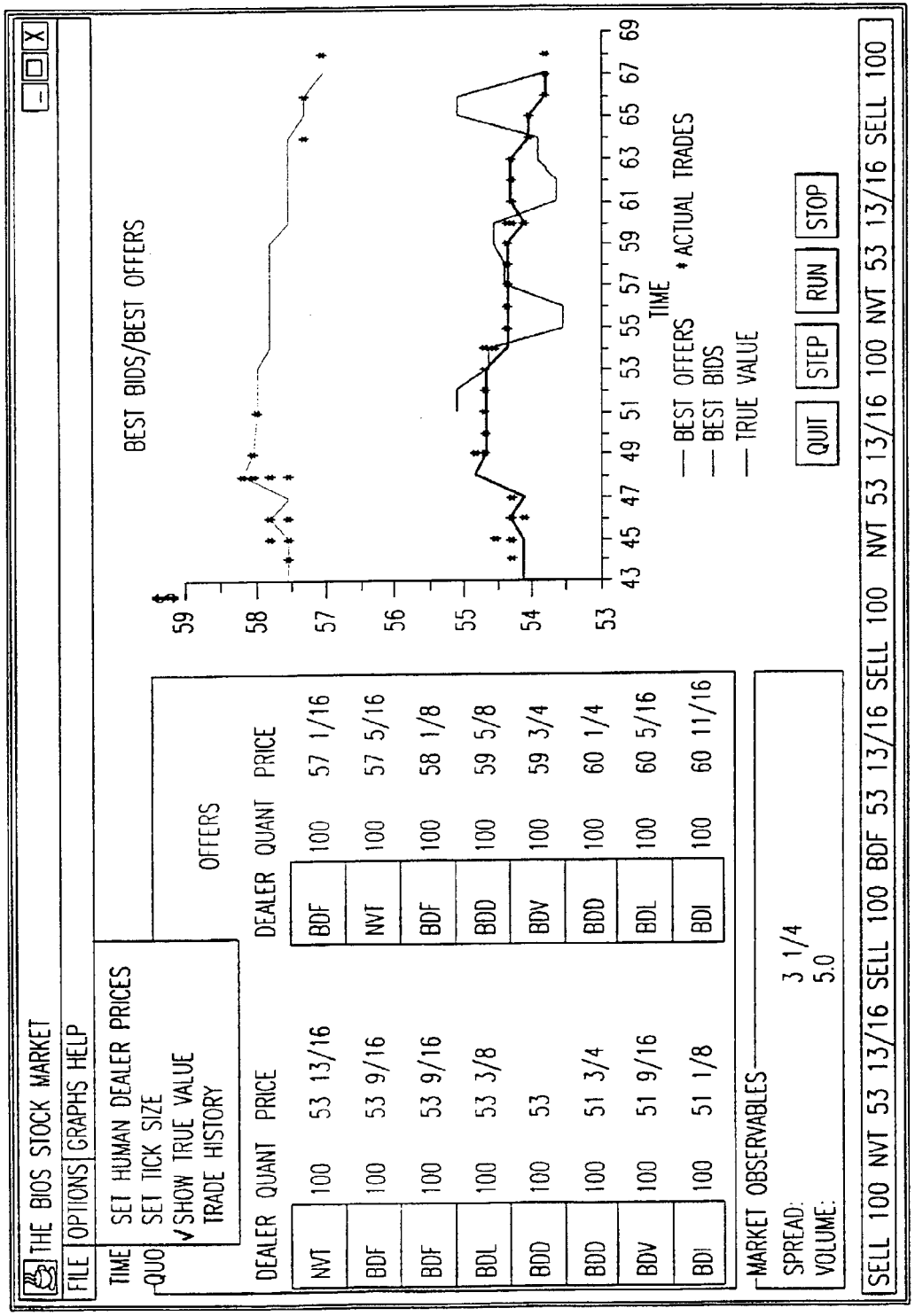
FIG. 12 displays the "Show True Value" panel and the "trade history" panel of the dealer-mediated securities market model.
Figure 12B:
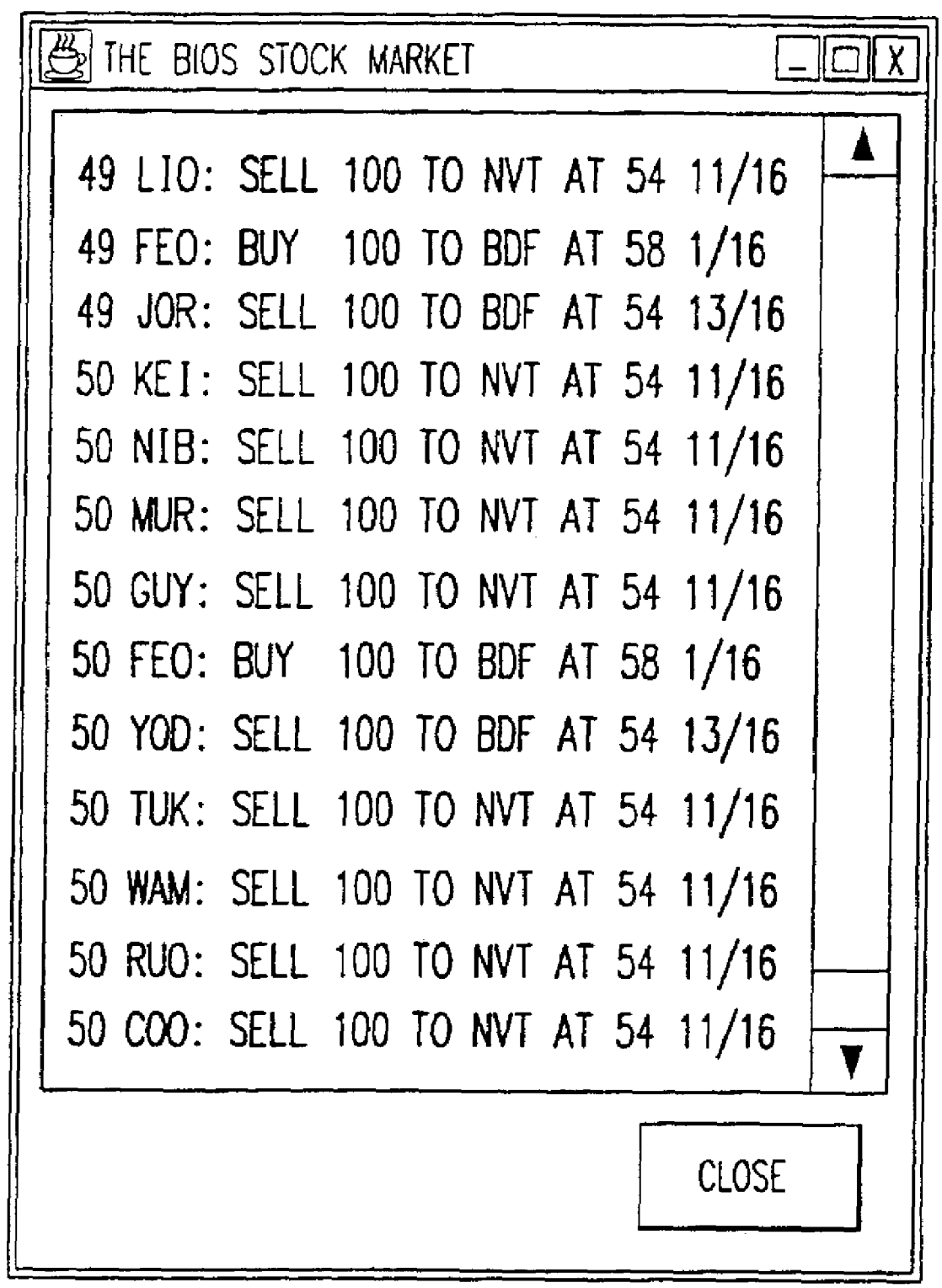

FIG. 12 displays the "Show True Value" panel and the "trade history" panel of the dealer-mediated securities market model. "Show True Value" toggles the display of a trace showing the true underlying value of the stock in the main display window. By default the display of the true value is off, so that a "human dealer" is not given information to which he is not entitled. Selecting "Trade History" from the menu brings up a scrolling window of recent trades. Each line in the window contains, in order, the time, investor, action that took place, volume, dealer involved, and price of the transaction. Each investor is given a three-letter lowercase name. Each dealer is in uppercase. We can see here that dealers "NVT" and "BDF" are dominating the market A characteristic of our markets is that often a small number of dealers provide most of the liquidity (much as in the real market). In this case, "NVT" is in fact using a parasitic strategy (of the "New Volume" variety).

Figure 13:
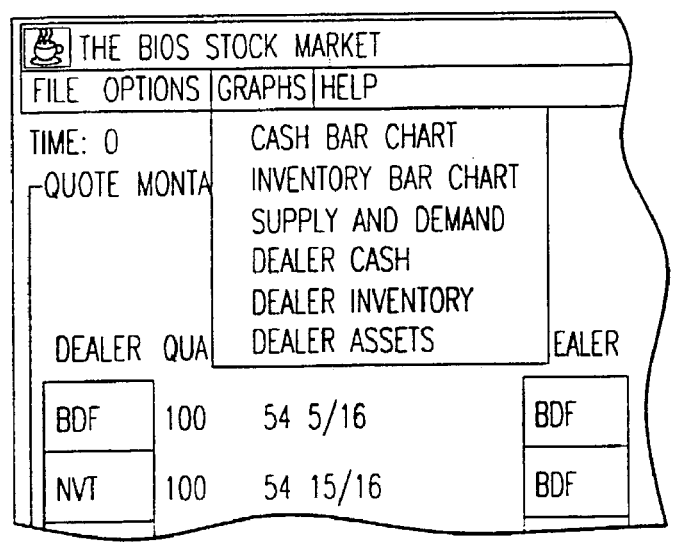
FIG. 13 displays the "graphs menu" of the dealer-mediated securities market model.

FIG. 13 displays the "graphs menu" of the dealer-mediated securities market model. In addition to the main trade/bid/offer display, the simulation allows the user to graph a number of other observables. There are six other built-in graphs. In addition, the simulation can be configured to save data to a file. This data can later be plotted or analyzed using any graphing/statistics package.

Figure 14:
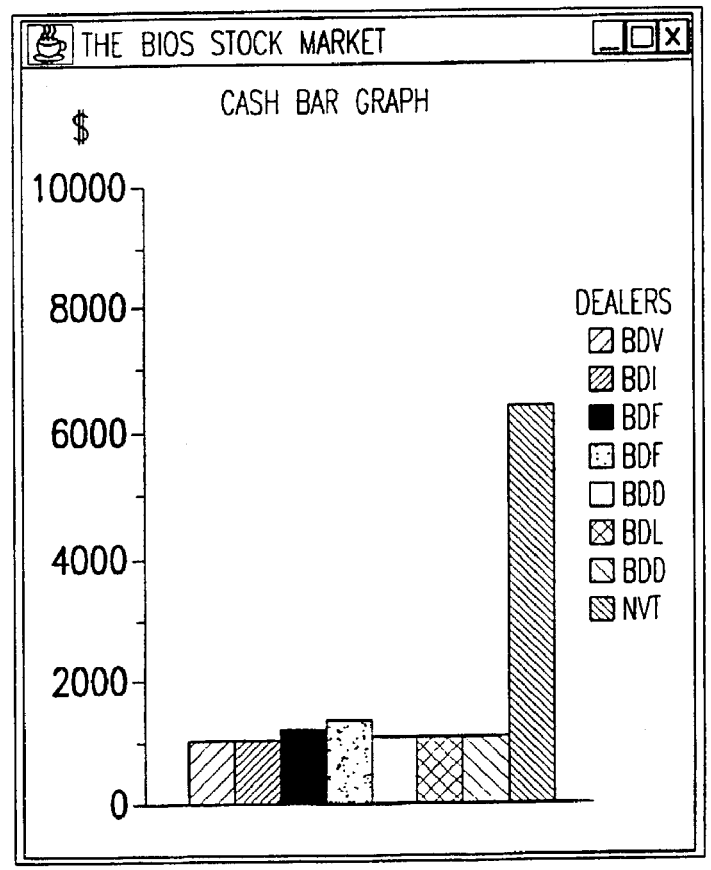
FIG. 14 displays the "cash bar graph" panel of the dealer mediated securities market model.

FIG. 14 displays the "cash bar graph" panel of the dealer mediated securities market model. The "Cash Bar Graph" displays a histogram of each dealer's current cash position. The color of each column identifies the dealer, and the height shows the current amount of cash the dealer has.

Figure 15:
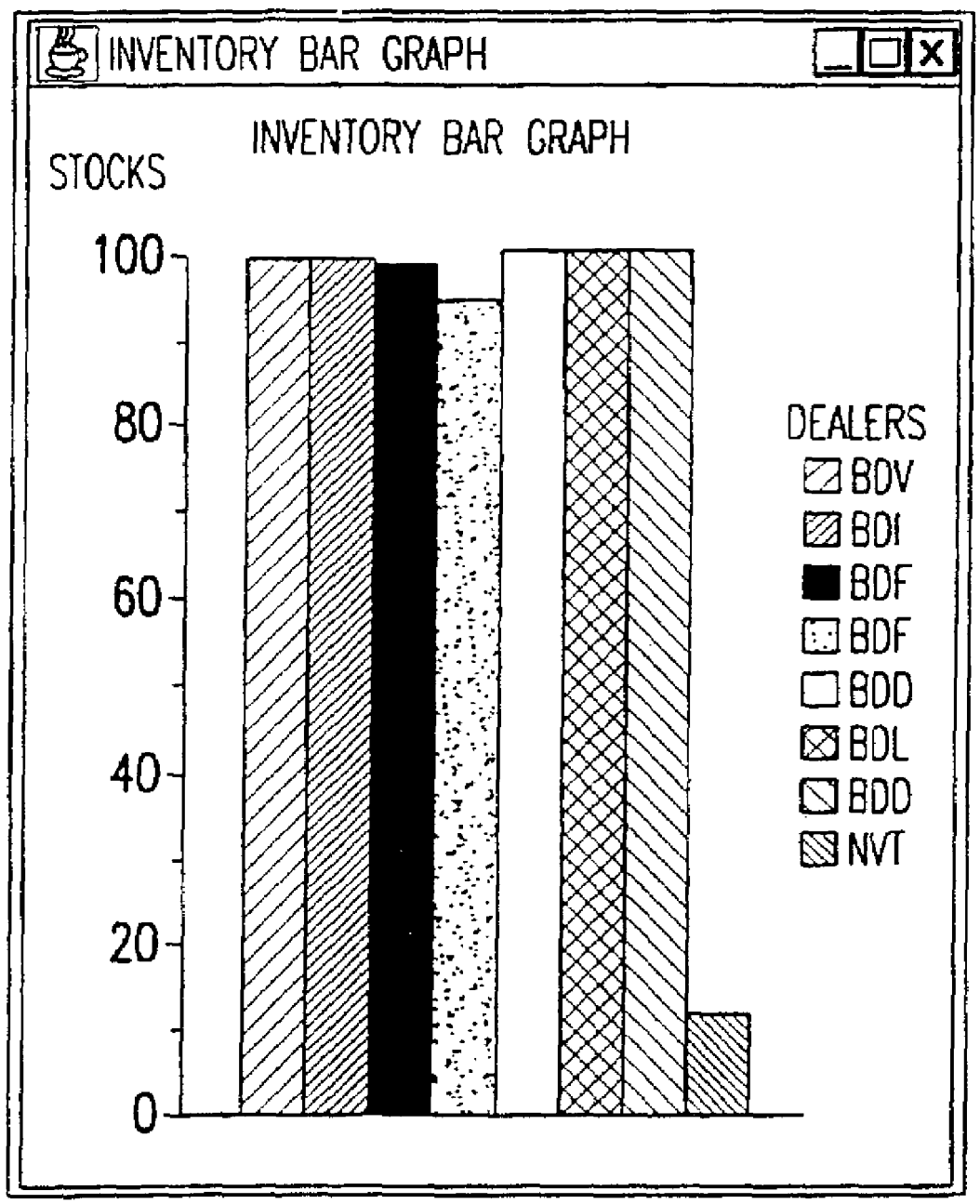
FIG. 15 displays the "Inventory Bar Graph" panel of the dealer-mediated securities market model.

FIG. 15 displays the "Inventory Bar Graph" panel of the dealer-mediated securities market model. The "Inventory Bar Graph" displays a histogram of each dealer's current inventory position. The color of each column identifies the dealer, and the height shows the current volume of stock the dealer has in his possession (which could be negative if the dealer is short in the market).

Figure 16:
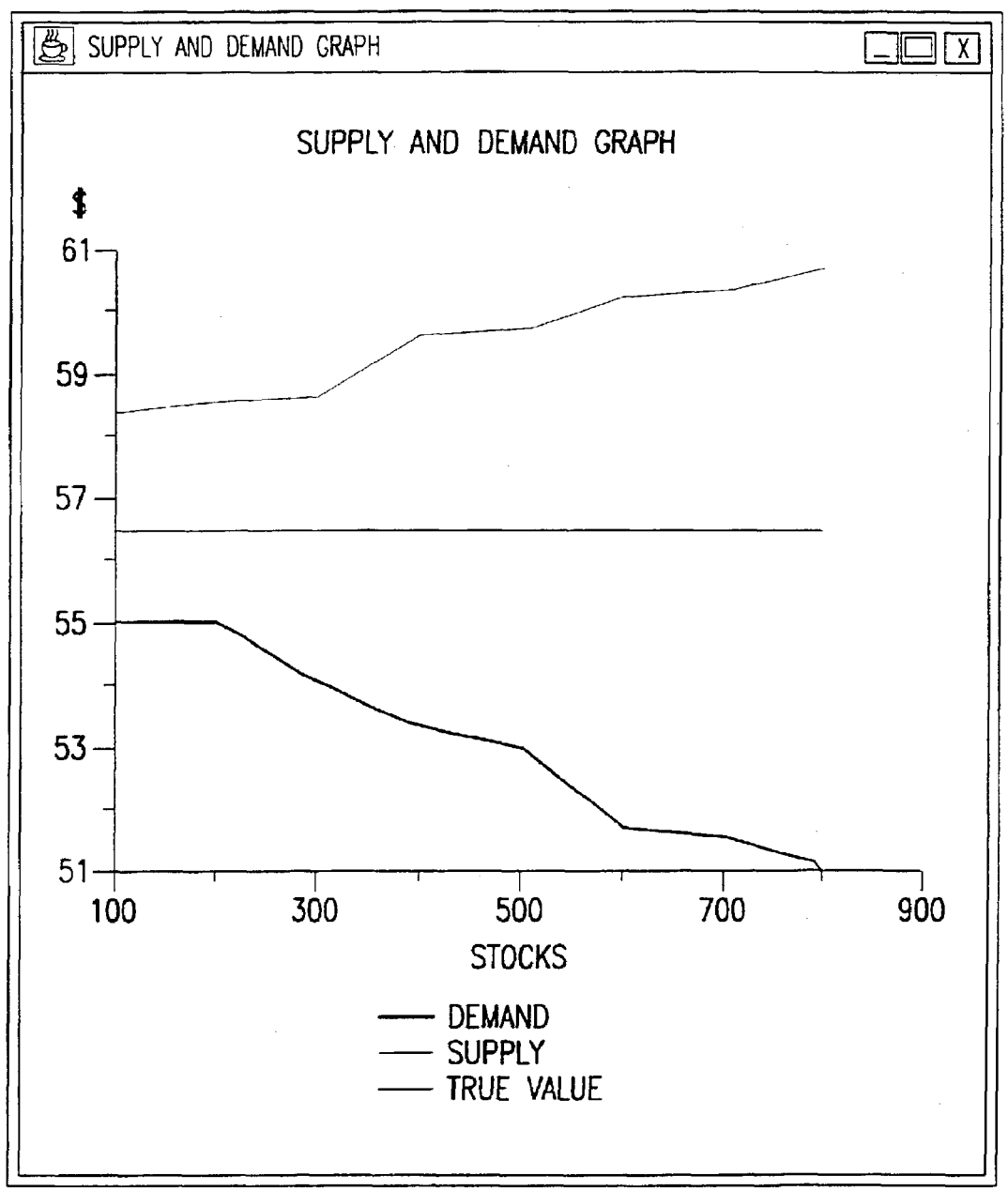
FIG. 16 displays the "Supply and Demand Graph" panel of the dealer-mediated securities market model.

FIG. 16 displays the "Supply and Demand Graph" panel of the dealer-mediated securities market model. The "Supply and Demand Graph" displays the supply and demand curves implied by the dealers' current quotes. The true value of the stock is also displayed. If the dealers are tracking the true value effectively, the graph should look something like the one in FIG. 16.

Figure 17:
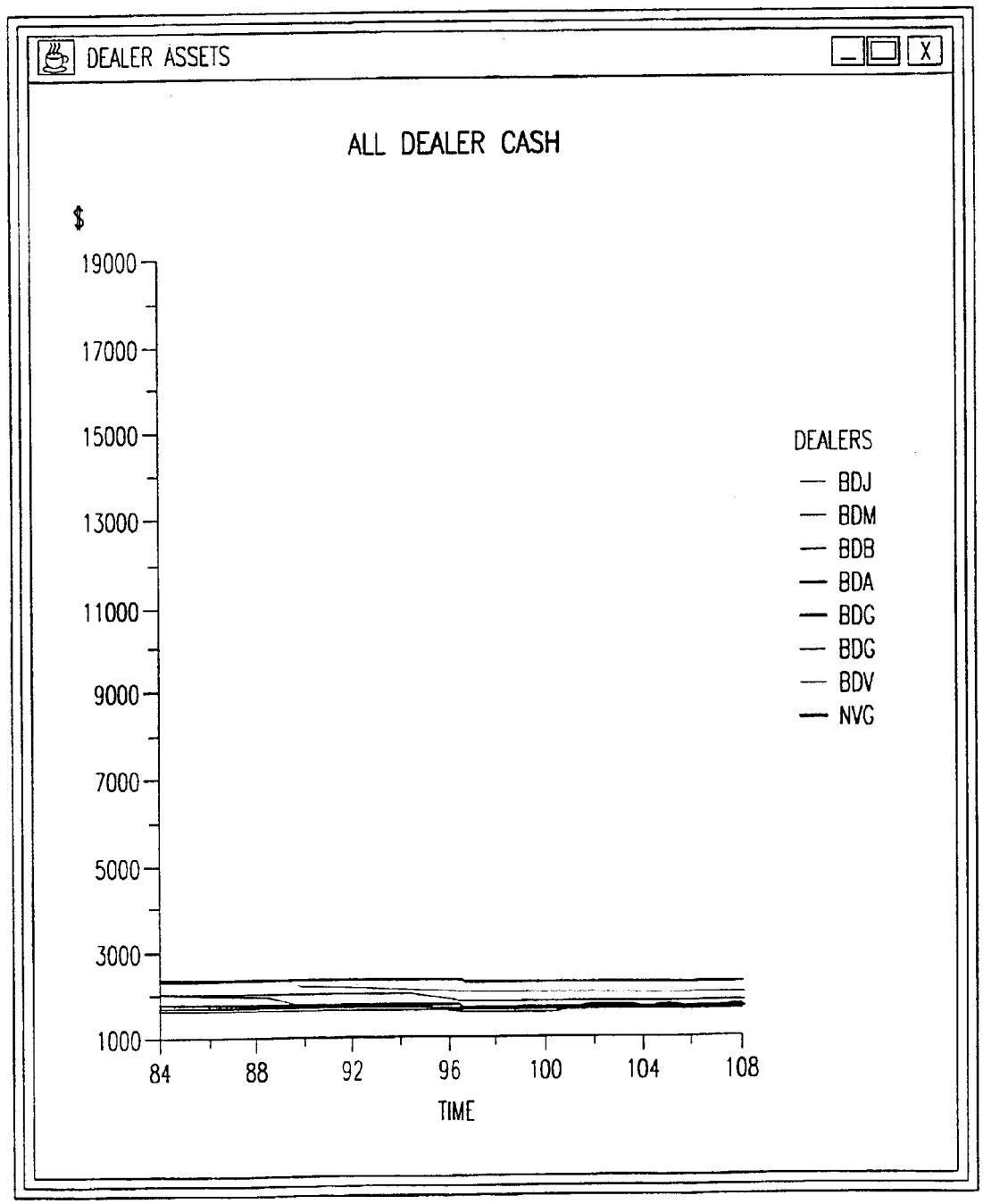
FIG. 17 displays the "All Dealer Cash" graph of the dealer-mediated securities market model.
Figure 18:
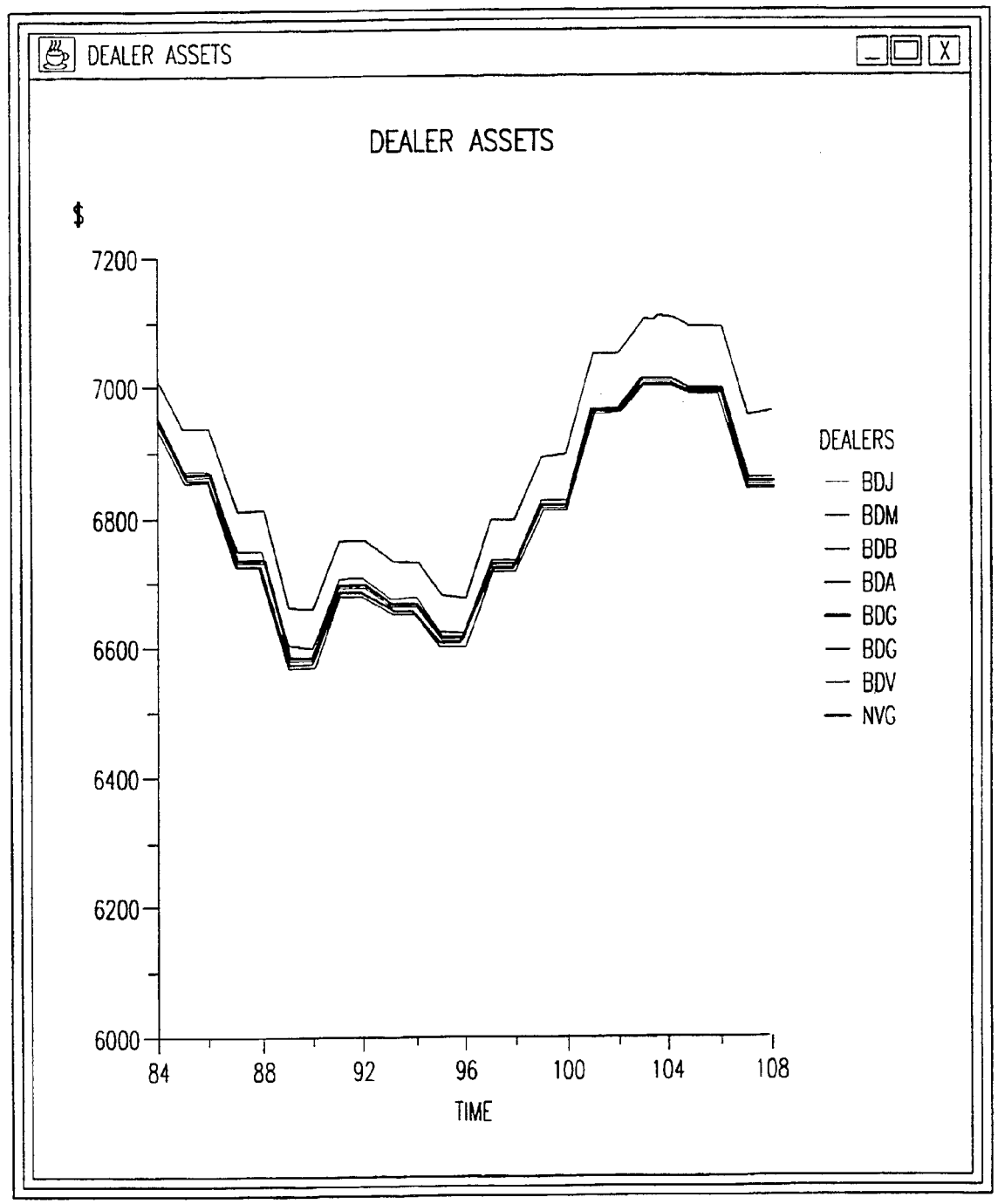
FIG. 18 displays the "Dealer Assets" panel of the dealer-mediated securities market model.

FIG. 17 displays the "All Dealer Cash" graph of the dealer-mediated securities market model. The "All Dealer Cash" graph contains a color-coded trace for each dealer's current cash holding. It allows the user to compare the cash positions of the different dealers over a recent historical period. FIG. 18 displays the "Dealer Assets" panel of the dealer-mediated securities market model. The "All Dealer Assets" graph contains a color-coded trace for each dealer's current assets. It allows the user to compare the total assets of the different dealers over a recent historical period. The assets are calculated by adding the dealer's cash position to the value of its inventory. This value is calculated using the instantaneous true value of the underlying stock, and hence fluctuates as that stock value fluctuates. The dealers themselves are of course not privy to this information.

Figure 19:
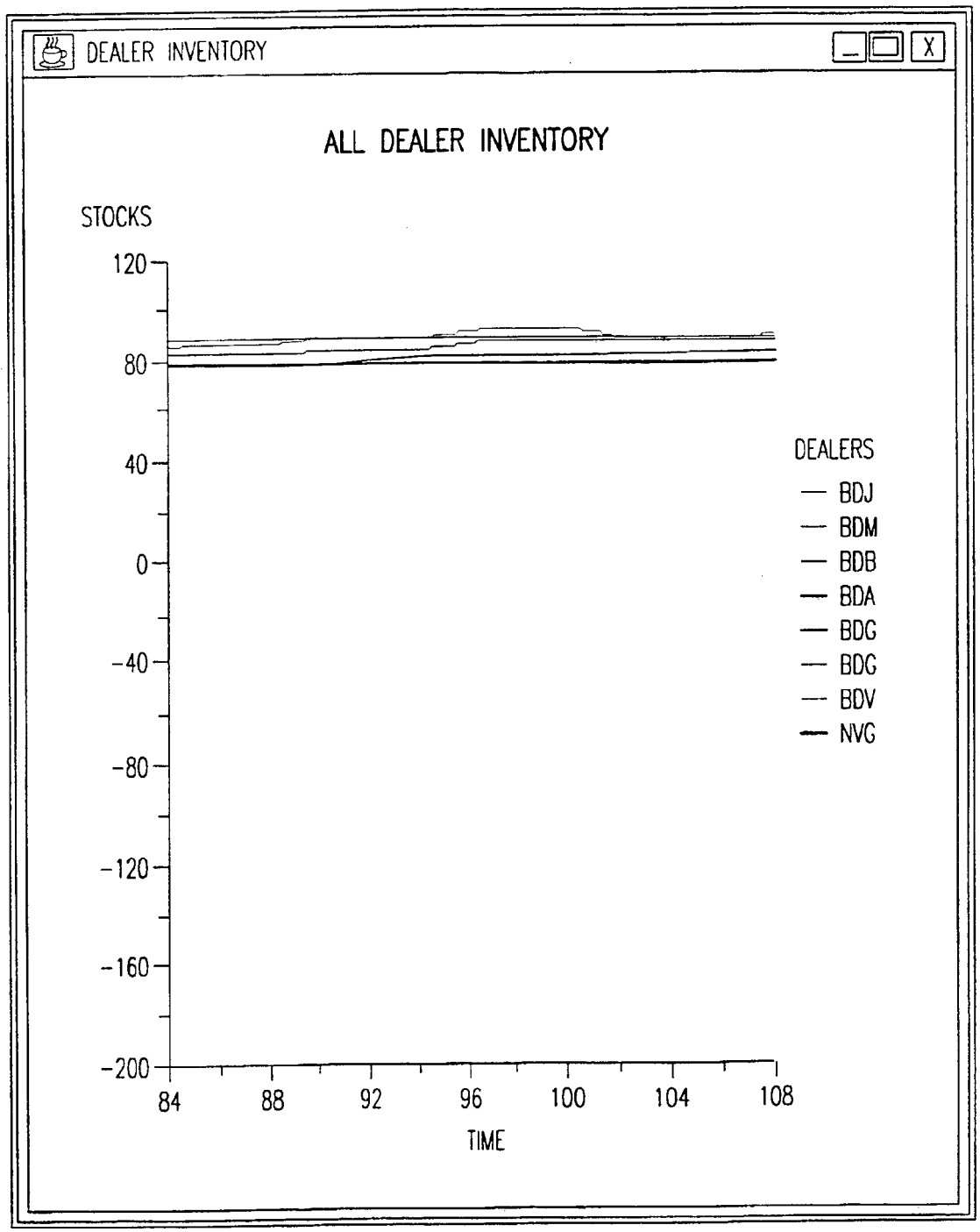
FIG. 19 shows the Dealer Inventory graph of the dealer-mediated securities market model.

FIG. 19 shows the Dealer Inventory graph of the dealer-mediated securities market model. The "All Dealer Inventory" graph contains a color-coded trace for each dealer's current inventory position. It allows the user to compare the inventory of the different dealers over a recent historical period. In the example in FIG. 19, the "NVG" dealer went very short in the market, but then bought significant amounts of stock in the 84-100 time frame to balance his books.

This section describes a simple example run that illustrates how the market's price discovery process fails in the presence of parasitic dealers when the tick-size is small. To start the simulation, double-click on the icon "BiosMarketExample." After a brief delay, the simulation interface appears. Before running the simulation, to see the process of price discovery in action, it is best to display the underlying value in the bid/offer/trade graph to the right of the main control panel. To do this, go to the "Options" menu and select "Show true value." To see the results most dramatically, it is best to change the tick-size first to a very large value, and then to a very small value. So, on the "Options" menu, select "Set Tick Size" and click on the blue slider to move it to the extreme left, so that the text entry reads "1." Now click on "Save." The tick-size in the market will now be set to $1; i.e., a very large value.

Figure 20:
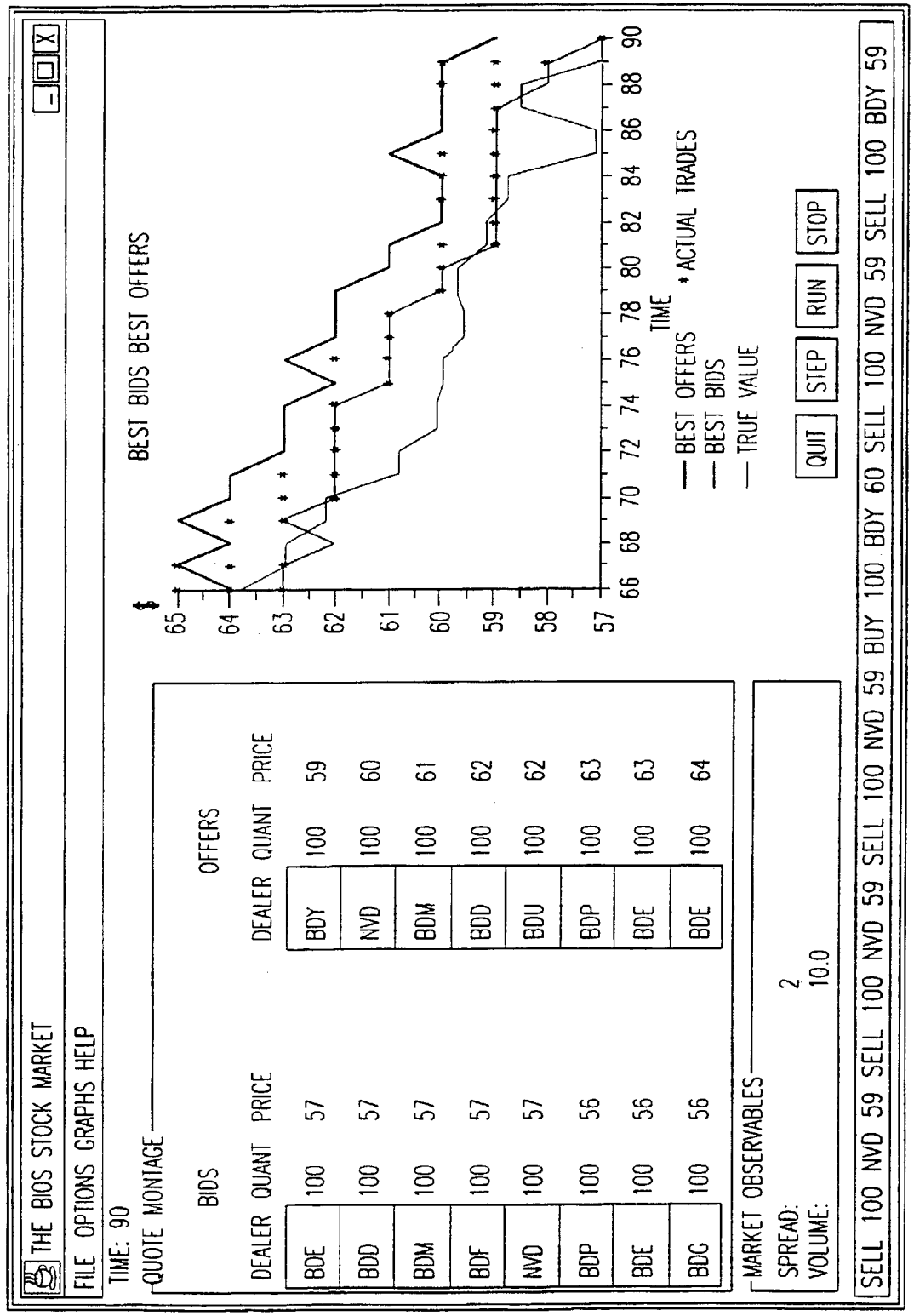
FIG. 20 displays a panel showing how the dealers track the true value reasonably well in the dealer-mediated securities market model.

Now click on the "Run" button in the main control window, and watch the simulation unfold. This simulation contains a single parasitic dealer, of the "New Volume" variety. FIG. 20 displays a panel showing how the dealers track the true value reasonably well in the dealer-mediated securities market model.

Figure 21:
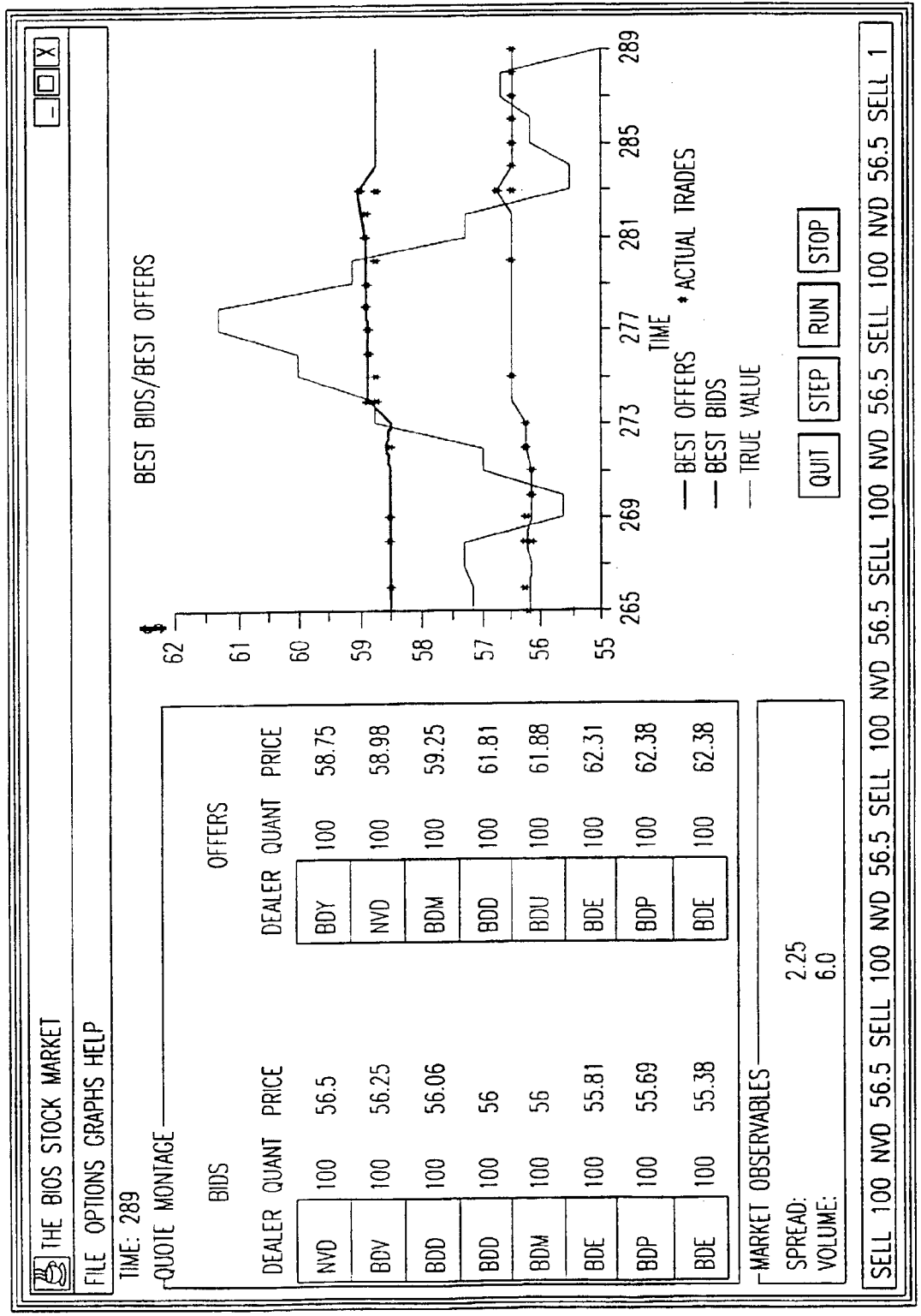
FIG. 21 displays a panel showing the simulation results for a smaller tick size in the dealer-mediated securities market model.

Once you are content that price discovery is functioning well, set the tick-size to a very small value. There is no need to stop the simulation to do this; simply go back to the "Set Tick Size" window and move the slider to its rightmost end so that the text entry reads "100" (or something near 100). Again, you need to click on the "Save" button for the change to take effect. FIG. 21 displays a panel showing the simulation results for a smaller tick size in the dealer-mediated securities market model. Price discovery is not as effective. With larger numbers of parasites, or a single more extreme parasite, the tracking of true value fails almost completely.

Almost all of the data we examined to draw our conclusions were generated by running the simulation in batch mode. This has several advantages: first and foremost, the simulation runs several orders of magnitude faster; it is also possible to pre-specify a total number of time-steps for which to run it (anywhere from 5000 to 500,000 were used in practice), and it is easier to run several simulations in parallel.

It is possible to run the simulation in these two different ways because the core of the simulation is highly modular. It is necessary simply to connect that core with either the GUI or the batch code to run the simulation. To run a simulation in batch mode, one simply types (from the command line):

java BatchMarket [prefix] [duration]

where "[prefix]" is a character prefix the simulation uses to identify input and output files for this run, and "[duration]" is the number of time-steps for which to run the simulation (if omitted, this defaults to 10,000 time-steps). For instance, to run a simulation without the GUI for 5000 time-steps, using the same input files as the example run described earlier, one types:

java BatchMarket EG 5000

The files that describe the initial conditions (dealer mix, etc.) for the example run are called "EGdealerMix.dat," "EGoutputParms.dat," and "EGplayerParins.dat."

The user can configure the initial conditions for the simulation by editing those files. The "outputParms" file contains "name value" pairs in the following format:

outputDealerCashData true
outputInvestorInventoryData false

The possible parameters to configure are as follows:

base filename: the suffix to use for all data files created by this simulation run outputData: true/false flag that globally turns data output on or off. If off, it overrides all other data output flags.

OutputInvestorCashData: if true, investor cash holdings are output to file at each time-step OutputDealerCashData: if true, dealer cash holdings are output to file at each time-step OutputInvestorinventoryData: if true, investor inventory holdings are output to file at each time-step OutputDealerinventoryData: if true, dealer inventory holdings are output to file at each time-step OutputValueDebugData: if true, best bid, best offer, and true value are output whenever a trade takes place.

OutputObjectFilesRate: rate at which to save (using Java's serialization capabilities) all Dealer objects to file for later examination OutputAssets: if true, dealer assets are output to file at each time-step OutputBids: if true, each dealer's bid is output to file at each time-step OutputOffers: if true, each dealer's offer is output to file at each time-step OutputBankruptcy: if true, data on which dealers and Investors go bankrupt is output to file UniformRandomWalk: if true, using a uniform random walk with drift, otherwise a log-normal random walk FoolishnessMax: the standard deviation of the investors' knowledge-error in the true value DisallowArbitrage: if true, then disallow dealer quotes that would allow obvious arbitrage opportunities RandomWalkSeed: can be used to fix the seed for the random number generator used by the random walk TickSize: sets the initial tick size.

The "dealerMix" file contains the list of dealers which take part in the simulation. Usually we fix this at eight dealers. The file simply contains a list of the names of the Java classes which implement the different dealer types. For example "EGdealerMix.dat" contains the following list:

BasicDealer

BasicDealer

BasicDealer

BasicDealer

BasicDealer

BasicDealer

NewVolumeDealer

NewVolumeDealer

The third file, "playerParms" contains default initial parameters (including the inventory and cash holdings) for the different dealer types. It contains a number of lines, the first item on the line being the name of the dealer type, followed by the number of arguments required by the object's constructor, followed by the arguments themselves. For example, the line for the basic Parasitic Dealer is:

ParasiteDealer 5 1000.0f 100 3 2.0f 3

So the dealer is initialized with $1000 in cash, 100 units of stock, a responsiveness of 3 (the scheduler will allow the dealer to act every three time steps on average), a risk aversion of 2.0 and will accept a maximum of 3 trades inside the spread before moving his quotes outside.

This aspect of the present invention has been developed using an object-oriented simulation of a single-security market with the Java programming language. Three principal classes make up the simulation: the Market class, the Dealer class, and the Investor class. In addition, there is a support class, the GuiMarket class, which provides a user interface and ties the other objects together in an actual simulation. Individual instances of these classes are objects.

Market: The Market class provides a venue where the Dealer and Investor agents can interact. The Market provides the following functionality:

A time-step method, which runs the simulation forward one step in time.

Methods for matching Investors who wish to buy or sell the security with the Dealers who are trading the security at the Investors' desired price.

A Quote Montage object, which displays the current bid and ask prices and volumes of all Dealers in the market. It also provides a method for displaying the current best bid and ask and their volumes.

A Scheduler object. The scheduler determines the order and frequency of trades made by each Dealer and Investor. It allows each player waiting on a queue to trade, and then puts them back onto the queue to wait for their next opportunity.

Dealers and Investors: These are both subclasses of a Player superclass. The Player class provides interfaces for keeping track of inventory and capital and executing trades. Dealers have the additional ability to interact with the Market's Quote Montage object, while Investors are able to query the Market for the current "true" value of the security. Both Dealers and Investors have strategy functions that determine their trading desires. Investors decide whether to buy or sell the security, while Dealers decide what bids and asks to post on the Market's Quote Montage.

GuiMarket: The GuiMarket provides the user interface, and the GuiMarket object is the entry point into the simulation when run in graphical mode. The main functions of the GuiMarket object are:

Instantiation of the Market object with desired initial conditions.

Display of the Market's Quote Montage object as trades occur. This panel displays pertinent information about the time and spread. It also displays all the dealers, the volume, and the bid price on the left side, and the dealers, volume, and price offered on the right side.

Display of Buy/Sell graph as trades occur. The volume of stock for current bid prices is graphed against the volume of stock at the current offer price.

Buttons for running/stopping/stepping/quitting the simulation.

Instantiation of a Ticker object, which currently displays to the scrolling ticker tape at the bottom of the main control window. The ticker records market activity, i.e., time, Investor name, buy or sell, volume, dealer name, and price.

Initialization of a Config object

Config: this object provides the following functionality:

Market parameter set-up, which includes initialization of the number and types of dealers (BD—basic dealer, PD—parasitic dealer, etc) and number and types of investors (FI-foolish investor, etc.); setting the number of time iterations for a simulation, setting initial cash and inventory for investors and dealers and their response time statistics; setting the "true" price of the stock. These parameters are accessed through the three parameter files discussed above.

BatchMarket: This provides the non-graphical entry point to the simulation. It initializes a Config object which reads in the input files (simulation run parameters), sets the market running for the specified number of steps, and then exits. The input files specify which data is to be saved during the run.

When the market is run (either via "java GuiMarket" or "java BatchMarket") another command line parameter is required. This parameter, as described previously, is the prefix used for the three input files. So, to create a new simulation, one simply edits those files, and then executes the command "java GuiMarket <prefix>" or "java BatchMarket <prefix> <duration>".

FIG. 22 displays a panel of results obtained by executing the dealer mediated securities market model.

Predicting Market Volatility

The space of economic models 105 further include models which are particularly adapted to predict volatility. It is clear that current efforts to predict market volatility based on the Black-Scholes formula for option pricing do not work particularly well.

As is well-known the implied volatility obtained by running the formula backwards, using stock and option prices, varies nonlinearly with the difference between the current price of the underlying and its exercise price, instead of being independent, so there is something wrong with the structure of the Black-Scholes model.

It is also well-known (and possibly related) that parameterising market returns by the lognormal density does not work very well for short term data, i.e. the density $p(s'/s)$ where s is the asset value now and s' its value in the future, is not lognormally distributed if the future is not more than about two weeks, but follows a Pareto-Levy distribution.

It follows that better formulas are need to predict volatility both within the framework of implied volatility, by developing better models of the variation of stock returns than the simple Markov process which underlies the Black-Scholes equation, but also by developing better ways to analyze the data provided by market time series.

We propose to start the process of finding better market volatility predictors by constructing a nonlinear state space model (NLSSM) of the market. Such a model contains hidden state variables and parameters. To estimate these variables and parameters we propose to use a version of the expectation-maximization or EM-algorithm. Such an algorithm has two steps (a) an expectation or E-step in which hidden variables are estimated from given parameters, and (b) a maximization or M-step in which parameter estimates are updated given hidden variables. The E-step can be carried out using a Kalman filter, which can be viewed as a generalization of the backpropagation algorithm of neural networks.

It is clear by now that in applying such algorithms to markets, data should be as low dimensional as possible. There are now a number of differing techniques for dimension reduction which can be used. There is a class of unsupervised learning algorithms (as distinct from backpropagation which is a supervised learning algorithm) embodied in neural networks available for this purpose, e.g. the principal components analysis algorithm (PCA) and various variants (localised PCA, nonlinear PCA), and a close relative, the independent components analysis algorithm (ICA). These algorithms can be used to find optimal representations of the data before setting up the NLSSM.

Several other issues associated with this approach suggest themselves.

(a) What is the relation of the hidden variables in an NLSSM to those found in causal or agent based models of the market? Evidently better market models can give rise to better state space descriptors. Such descriptors could include cooperative interactions between traders, such as herding.

(b) There are also many new developments associated with parametric approaches to market modeling that use Pareto-Levy distributions etc, or nonlinear Langevin models, e.g. Bouchoud et. al. and Farmer. These can also give rise to better state space representations.

(c) Finally it is also possible that ways can be found to optimize NLSSMs using search algorithms, e.g. genetic algorithms (Gas) to find better hidden state variables and their combinations. This will require a measure of improvement in the ability of such models to predict market data or properties such as volatility.

Optimization

Once the causal models have been evolved and adapted to fit real market data, they are used to generate data more widely for a multitude of situations, including what-if scenarios. In particular, they can be used:
1. for predicting volatility;
2. for evaluating and predicting risk for any desired portfolio, allowing ranking of different portfolios;
3. for optimization of portfolios;
4. for pricing of options and other derivatives;
5. for choice of optimal hedging strategies.

Because the models produce non-Gaussian distributions of return, a single simple measure of risk such as volatility is not adequate to characterize risk, rank portfolios, optimize portfolios, price options, and hedge risks. Practical risk measures that we use include the probability of loss greater than a specified threshold, the expected worst drawdown in a given period, the expected time between significant drawdowns, and the value at risk (VaR) at a given confidence level. We extract these quantities from our models using combination of analytic and statistical means.

Minimizing Values at Risk

The present invention includes techniques to minimize the value at risk of a portfolio. Value at risk is a single, summary, statistical measure of possible portfolio losses. Specifically, value at risk is a measure of losses due to "normal" market movements. Losses greater than the value at risk are suffered only with a specified small probability.

Using a probability of x percent and a holding period of t days, a portfolio's value at risk is the loss that us expected to be exceeded with a probability of only x percent during the next t-day holding period.

The technique to minimize the value at risk uses historical simulation. Historical simulation is a simple, atheoretical approach that requires relatively few assumptions about the statistical distributions of the underlying market factors. In essence, the approach involves using historical changes in market rates and prices to construct a distribution of potential future portfolio profits and losses, and then reading off the value at risk as the loss that is exceeded only x percent of the time.

The distribution of profits and losses is constructed by taking the current portfolio, and subjecting it to the actual changes in the market factors experienced during each of the last N periods. That is, N sets of hypothetical market factors are constructed using their current values and the changes experienced during the last N periods. Using these hypothetical values of market factors, N hypothetical mark-to-market portfolio values are computed. From this, it is possible to compute N hypothetical mark-to-market profits and losses on the portfolio.

The following discussion describes the technique for isolating low value at risk portfolios. Let us consider a single instrument portfolio, in this case stocks traded on the New York Stock Exchange and Nasdaq markets. For this instrument, there exists tremendous amounts of data. If we assume a one day time horizon (t=1), then the data we are interested in are the daily closing prices of every publicly traded stock on the two markets. Such data exists for thousands of stocks for tens of thousands of days. From these data, it is possible to construct an m×n matrix (where m is the number of stocks, and n is the number of days) of prices.

Let us assume that within this collection of stocks, there are pairs, triplets, quadruplets, etc., of stocks whose values at risk are lower as a group than any of the stocks individually. This occurs because sets of stocks whose price changes are anti-correlated will have low values at risk. When the price of one stock goes down, the price of the other tends to go up. The chance that both stocks go down together is lower than the chance that two stocks chosen at r-random would go down together because the stocks are anticorrelated. This reduces value at risk.

The optimal portfolio would group anti-correlated stocks in the optimal proportions to minimize value at risk. Because there are so many stocks, however, the space of all possible portfolios is too large to search exhaustively. Genetic algorithms are well suited to finding good solutions to just this type of problem in reasonable amounts of time.

The algorithm works as follows:

Step 1:

Start with m portfolios. Each portfolio can be represented as a vector of length m. Each bit ($m_i$ in the vector is either a 1 or a 0 signifying that the $i^{th}$ stock is either included or excluded from the portfolio. This can later be extended to letting each bit specify the number of shares held rather than simply inclusion or exclusion. To each portfolio, assign a random number of stocks to hold such that every possible portfolio size is covered (at least one portfolio excludes all but one stock, at least one portfolio excludes all but two stocks, . . . at least one portfolio includes all the stocks). Once the number of stocks to hold has been assigned, let each portfolio randomly pick stocks until it has reached its quota.

Step 2:

Go back in time n/2 days (halfway through the data). For each of the m portfolios, compute the value at risk for the n12 days that precede the halfway point.

Step 3:

Randomly pair portfolios. For each pair of portfolios, let the portfolio with the higher value at risk copy half of the bits of the lower value at risk portfolio (i.e. randomly select half of the bits in the more successful portfolio. If a bit is different, the less successful portfolio changes its bit to match the more successful portfolio). The portfolio with the lower value at risk remains unchanged.

Step 4:

Repeat steps 2 and 3 until some threshold for value at risk is achieved.

In this way, clusters of anti-correlated stocks will tend to spread through the population of portfolios. The hope is that this method will ultimately select for most or all of the good clusters. Notice that this method may also alight upon the optimal number of stocks to hold in a portfolio. For example, if the minimum value at risk portfolio contains only three stocks, three-stock portfolios will tend to propagate through the population.

Additional Techniques for the Analysis of Risk

The present invention includes additional techniques for the analysis of risk. The general understanding of portfolio risk requires an understanding of three contributing problems. The current understanding of these three problems is insufficient to accommodate the challenges posed by modem portfolios. The first problem is volatility. It has long been known that Gaussian approximations to volatility do not correctly describe the behavior of markets, and that price fluctuations show long tails. This means that large deviations are much more likely than conventional theory suggests. The second issue is that of interdependence. In many areas of interest, elements of a portfolio do not move independently of each other, but rather influence each other in ways both subtle and complex. Current methods only uncover a minimal rendering of this complex structure. The third issue is that of time dependence. Many portfolios contain elements that do not mature on the same time scale, but are nonetheless dependent. Again, conventional portfolio analysis and optimization techniques do not address the subtleties of interacting time scales.

It was originally pointed out by Mandelbrot in 1961 that price fluctuations in speculative markets follow a particular class of fat-tailed (relative to Gaussian) distribution known as a Levy distributions. Levy distributions can be created by correlated random walks, and have been studied in statistical physics under the rubric of anomalous diffusion. In the last two years, these distributions have been revisited in the area of option pricing, but not yet in the area of portfolio management. Since Levy price fluctuations do not add together in the same way as Gaussian fluctuations, results for expected portfolio risk and associated volatility will in general be different. The present invention incorporates an underlying Levy model of volatility for portfolio risk analysis which accounts for the different additivity characteristic.

In the construction of portfolios, it is experimentally known that the prices of certain stocks are correlated, and this correlation is typically measured using a covariance matrix. The covariance matrix has two implicit assumptions which we believe are wrong: Fluctuations in prices are Gaussian (see above) and correlations between stocks are describable with pair-wise interactions. The present invention modifies this approach in two ways:

1. The covariance matrix requires a large amount of data for accurate results. Extending the covariance matrix method to higher order interactions (three- or four-point interactions) requires an exponentially increasing amount of data. We separate the analysis of interdependence into effect and magnitude. The effect aspect is obtained by encoding price fluctuations as (+, −) instead of numerical values. Now we have prices encoded as binary strings instead of numerical sequences. Since the fundamental activities of a market are buying and selling, and their attendant effects are the raising and lowering of prices, we believe that the binary encoding is a more fundamental signature of market microstructure than the actual prices. The magnitude of gains and losses are obtained by the statistics of large numbers of players making "atomic" buy and sell decisions.

Once we have encoded the market dynamics of individual instruments as bit strings, we have essentially a telegraph representation of information. This is amenable to the tools of information theory, a field developed to analyze the dynamics of information transfer in telephony. Information theory allows us to measure correlations at arbitrary levels of interconnectedness, and although the data requirements scale exponentially as interconnectedness increases, the constant in front of the exponent is much smaller than the covariance case because of the binary nature of the data. Interconnectedness is measured by a quantity called mutual information, and the assumptions associated with it are less stringent than the assumptions required to measure covariance, and in particular are not dependent on the assumption of a normal distribution.

2. The present invention uses the measure of mutual information to construct a phylogeny of interdependence, using the technique of minimal spanning trees coupled with higher order information correlations to remove degeneracies. (multiple solutions satisfying the same constraints) Once we have constructed a phylogeny (a tinkertoy like structure showing connections of influence), we can use time-structured data to obtain directions of influence. This directed map allows us to model the propagation of financial disturbance through a web of connections. This is an important tool for constructing a portfolio of minimum risk, because it decomposes portfolio risk into an ensemble of interconnected contributing factors which can then be optimized to obtain the desired results.

Note: The connections discussed above can be endogenously or exogenously generated. If the portfolio in question consists of internal assets, (R&D portfolio, for instance) there is some control as to the degree and nature of the interconnection. Hence the optimization procedure is somewhat different, as the interconnections are no longer viewed as given but are now variables over which we have some control.

In many areas of interest, different time scales are an important consideration. Examples include bonds with different dates of maturity, and internal portfolios with different payback profiles. Optimizing over such portfolios requires understanding the spectrum of possible paths that a portfolio can take over time, and again interdependencies and large fluctuations make standard approximations of Gaussian uncertainties inaccurate. The present invention uses techniques borrowed from non-standard statistics (large deviation theory, sampling theory) and quantum field theory (path integrals) to generate a forward curve of the behavior of a complex portfolio over time. Not only is the end result important, but the shape of the curve over time is important, as there are many quantities of interest which are dependent on the local shape of the curve.

Evaluating and Minimizing Risk

The present invention includes additional techniques for portfolio optimization using sampling and selection to evaluate and minimize risk for a portfolio of assets with uncertain returns. Consider the general setting in which a holder owns portfolio of assets. The assets may be financial instruments (such as stocks, bonds, options, or other derivatives) or investments in research and development with unknown future payoffs (e.g. the drug leads pursued by a pharmaceutical company). In this setting, where the future rewards are uncertain, there are two important concerns of the holder of the portfolio. Firstly, it is important to quantify the risk (the amount of money that could be lost) over some time horizon. Secondly, the holder wishes to structure the portfolio so as to minimize the risk. In this document we will focus on answering these questions for portfolios of financial instruments but the ideas are more generally applicable.

Let $x_i(t)$ represent the value at time t of the ith asset in the portfolio. If there are N assets in the portfolio let x(t) be the N-vector representing the values at time of all components of the entire portfolio. The value of the entire port folio to the holder is specified as some function f(x) of the values of the assets. Typically, this function might lie a linear combination of the asset volumes times the asset prices. i.e. $f$ $$(x) = \sum_{i=1}^{N} v_i x_i.$$

Furthermore let P(x', t'|x, t) represent the probability that the asset prices are x' at time t'>t given that the asset prices were x at time t. If t indicates the present time and x represents the present value of the assets then the expected value of the portfolio at some time t' in the future is $$V(t'|x,t) = \int dx' f(x') P(x',t'|x,t).$$

This value indicates the expected worth of the portfolio but does nothing to tell us what the risk is, i.e. what we might conceivably lose. To get at this quantity we realize that from P(x', t'|x, t) we can also determine the probability P(v|t) that the value at. rime t is v:

$$P(v|t) = \int dx' \sigma(v' - f(x')) P(x'|x,t).$$

This probability is the fundamental quantity which allows us to assess risk since it gives the probabilities for all potential outcomes. Thus for example we can say things like "with 95% confidence the most money that will be lost, is v*." In this case v* is determined from the requirement that only 5% of the time will more money be lost, i.e.

$$\int_{-\infty}^{v'} dv\, P(v|t) = 0.05.$$

Other measures of risk are similarly based on P(v|t)

The risk will depend sensitively on the precise form of P(x', t'|x, t). To see this, imagine that a pair of assets i and j are anti-correlated with each other (i.e. when the price $x_i$ increases the price $x_j$ usually decreases). If we invest equally in both stocks then the risk will be small since if the value of one stock goes down the other compensates by going up. On the other hand if the price movements of assets are strongly correlated then risks are amplified. To evaluate and manage risk it then becomes paramount to identify set of assets that are correlated/anti-correlated with each other. This observation forms the basis of traditional value at risk analyses (VaR) in which the risk is assessed in terms of the covariance matrix in asset prices. The covariance matrix includes all the possible pairwise correlations between assets.

While traditional VaR captures pairwise variations in asset prices it completely ignores higher order relationships between variables, e.g. when assets i and j go up asset k goes down. Moreover the Gaussian assumption inherent in VaR is known to be false. What is needed is a more general approach. The present invention describes new risk management techniques which move beyond pairwise VaR. We propose two methods by which this can be accomplished.

The core of the new ideas is to recognize that information about higher order relationships can be uncovered by looking at the VaR of subsets of assets from the portfolio.

Imagine for a moment that a specific set of assets covaries with each other in some predictable way. Knowledge of this co-variation can be used to devise a risk averse combination of these particular stocks. Since the variation involves all four stocks it can never be determined by only looking at pairs of assets. How might important, clusters of stocks like these be discovered?

The first point to note is that the historical record of asset prices and portfolio values provides a training set from which we can discover these clusters of stocks. The historical record provides a data set which includes the true VaR because the future value of the portfolio is known from the historical data. Let v represent the true VaR for a particular portfolio x at a point T into the future. From the historical record we can form the data set $D=\{x_i, v_i\}$ and thus estimate the VaR for the assets in the chosen portfolio, i.e. P(v|x). If we assume that the stochastic process that generated D is stationary then the same relationship discovered in D will also hold in the future. Once the mapping from a set of stocks to a VaR has been determined we can search over subsets of stocks to find a combination that gives particularly low VaR.

We begin by making the simple assumption that $P(v|x) = \delta(v - \mu(x))$, i.e., it is characterized entirely by its mean value $\mu(x)$. This mean value will differ for different subsets of stocks. Without much additional complication we could also include the variance around this mean and assume that fluctuations around the mean are Gaussian: $P(v|x) = N(\mu(x), \sigma^2(x))$. Obviously from the data D we could try to infer much more complicated relationships but for the moment we stick with simple case.

Given that we can determine the true average VaR for any set of stocks we can identify those assets within a portfolio of N assets that form good combinations. Computationally the following scheme can be used to identify good subsets of assets. We assume that the optimal subset of assets is of size n<<N. Starting from the original portfolio randomly form portfolios of half the size by sampling stocks (without replacement) from the entire portfolio. The probability that any one of these randomly generated profiles contains all n assets is approximately $1/2^n$. Thus as we examine significantly more random portfolios than this it is likely we will obtain at least one subset containing all n assets. For each of the randomly generated portfolios of N/2 assets we determine its VaR by calculating it from D and keep those portfolios with high VaR. In this way we filter out only the most promising portfolios, i.e. those that contain the subset that we are seeking. This process can then be iterated further. From these remaining portfolios of size N/2 we randomly generate make portfolios of half the size (no N/4). Assuming that, at least one of the size N/2 portfolios contained the desired cluster the probability that one of the size N/4 portfolios contains the full subset, is again $1/2^N$. We can keep iterating this process of generating and filtering portfolios and each time come closer to good subsets of stocks.

After m iterations of this procedure the portfolio size is $N/2^m$. Let $\overline{m}$ be the largest value of m such that $N/2^m \geq n$ (i.e., the largest portfolio that contain all n assets) and let $\underline{m}=\overline{m}+1$. If our hypothesis is correct then we should see an abrupt increase in the VaR from $\overline{m}$ to $\underline{m}$ since we can no longer form a risk averse combination of all the n assets at $\underline{m}$. This fact alerts us to the important fact that n must lie between $N/2^{\underline{m}}$ and $N/2^{\overline{m}}$. At this point we can then sample from the portfolio of size $N/2^{\overline{m}}$ to form new portfolios of size $(N/2^{\underline{m}}+N/2^{\overline{m}/2}$. The extremal VaR values of these new portfolios will either be comparably to the $N/2^{\overline{m}}$ in which case $(N/2^{\overline{m}}+N/2^{\underline{m}})/2 \leq n \leq N/2^{\overline{m}}$ or comparable to $N/2^{\underline{m}}$ in which case $(N/2^{\overline{m}} \leq n \leq (N/2^{\overline{m}}+N/2^{\underline{m}})/2$. Iterating this procedure we can determine the optimal subset size n. Knowing the optimal n we can look at many different subsets of this size to eventually pick out the precise combination of the n assets.

Figure 23:
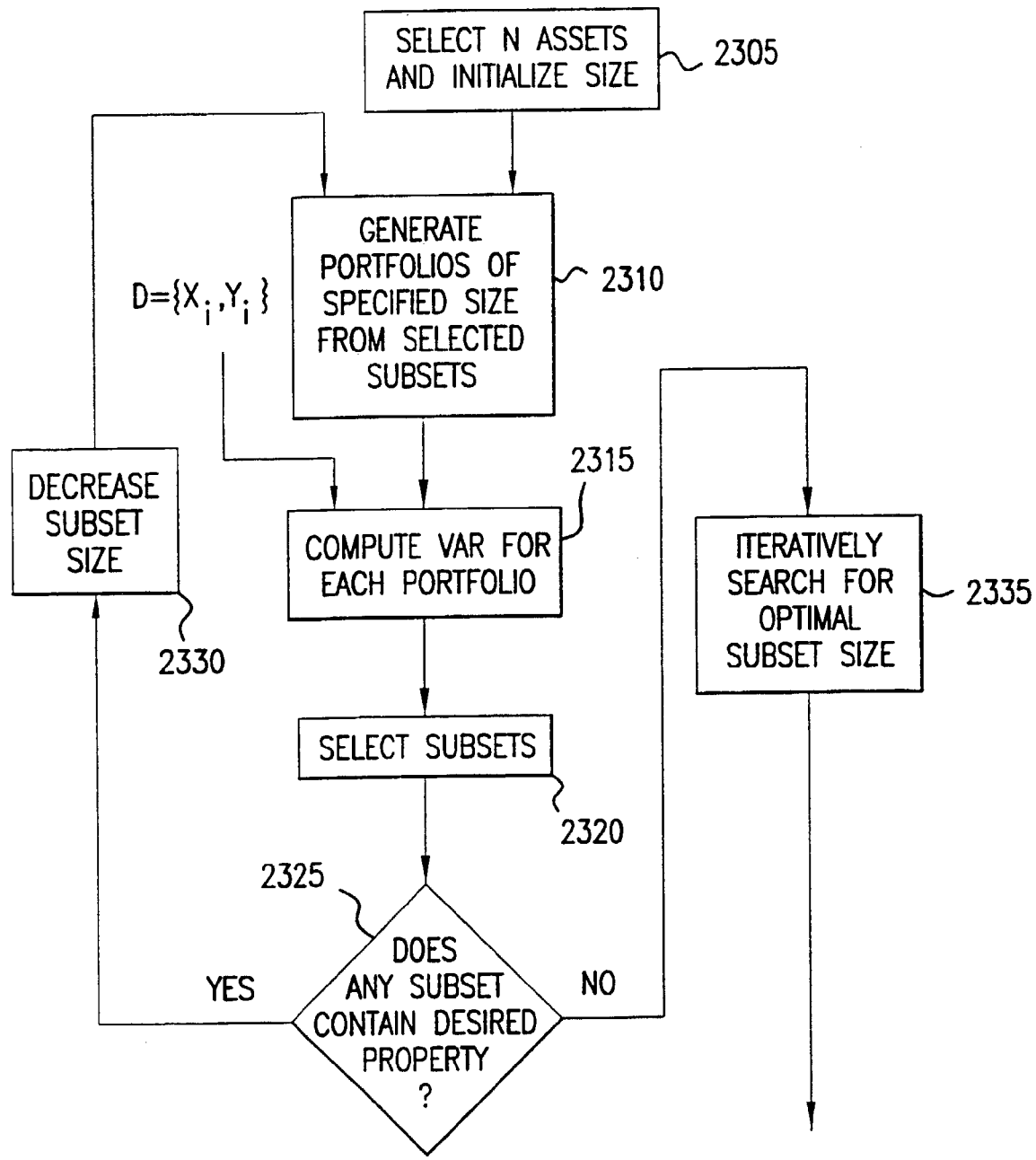
FIG. 23 provides a flow diagram of a method for evaluating and minimizing risk.

FIG. 23 provides a flow diagram of a method for evaluating and minimizing risk. In step 2305, the method selects N assets and initializes the portfolio size. In step 2310, the method generates portfolios of the specified size from the selected subsets. On the first iteration of the loop, the selected subset will be the set of N assets. In step 2315, the method computes the value at risk for each portfolio generated in step 2310. In step 2320, the method selects the optimal portfolios (subsets) from those generated by step 2310.

In step 2325, the method determine whether any portfolio contains the desired properties. If at least one portfolio contains the desired properties, control proceeds to step 2330. In step 2330, the method decreases the subset size before generating new portfolios in step 2310 in the next iteration of the loop. If the method determines in step 2325 that no portfolio contains the desired properties, control proceeds to step 2335. In step 2335, the method iteratively searches for an optimal subset size.

There are many variations to this basic method that might improve its efficiency. It may not be optimal to halve the portfolio size at each step since we might want to have a higher probability of retaining the subset intact. The best number of random portfolios to generate and test can also be fine-tuned to make the search more efficient. Simple analytical model can be built to optimize these algorithm parameters.

Another important extension is to realize that the sample and select method outlined above can be used to determine subsets with any desired properties. Nothing in the above procedure restricts its use to minimize VaR. The method can be used to extremize any figure of merit. Along these lines what happens in practice is that there are actually more than one objective in designing a portfolio: we want to minimize risk but also maximize a profit. Is there a way of modifying the above procedure to account for more than a single objective? At the very least we must be able to balance risk/reward the way it is conventionally done.

There is however a very simple extension of the above method to handle the case of multiple objectives. Sub-sampled portfolios are generated as usually but the selection criteria amongst portfolios is modified. Now Instead of picking sub-sampled portfolios which have the best VaRs we measure a number of objectives for each of the particular sub-sampled portfolio and keep those sub-sampled portfolios which Pareto dominate all other portfolios (generated at the present iteration or all previously generated portfolios). With this simple change in the selection criteria everything else proceeds the same way. At the end of the process we obtain a subset which is hopefully good on all objectives.

There are also a host of issues involving sampling to form the new portfolios. In the above I have assumed that the sampling is uniform. Of course this need not be the case. The distribution can be altered over time (much as in boosting) based on the VaR (or distributions over VaR) over previous samples. This also ties into pooling in that the samples may be constructed in a much more deterministic fashion.

There are also a number of possible extensions based upon the fact that the mapping from the asset subset can be determined. At this point it remains unclear how to exploit this fact. The basic procedure might also have to be modified slightly to fit the context.

One of the main difficulties of the procedure may occur in the initial phases of the algorithm. Initially we must filter out subsets that contain the desired small subset. There arises the signal/noise ratio issue on whether the small optimal subset can be detected in the larger portfolio. An estimate of this would be useful to know how many subset samples to generate. This has been tested and the results will be discussed below.

In order to test the algorithm, a random number generator was used to create a "toy" set of stock data in which all of the clusters were known a priori.

Figure 24:
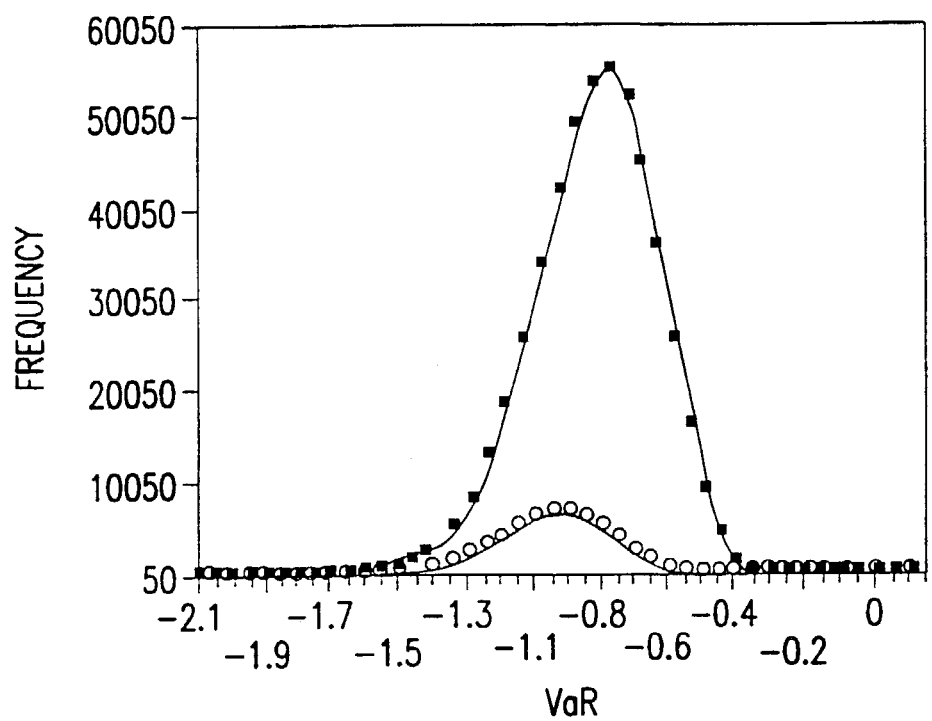
FIG. 24 provides the results of the method for evaluating and minimizing risk from executing on 500,000 random draws from this "toy" world.

FIG. 24 provides the results of the method for evaluating and minimizing risk from executing on 500,000 random draws from this "toy" world. The world consists of 32 stocks in which an investor may invest. The solid square plot is a histogram of VaRs for portfolios which include exactly 16 stocks. The mean VaR for these portfolios is 0.96 (where negative means the investor loses money). The smaller histogram of hollow circles shows the VaRs only for those portfolios which, through random sampling, failed to include any of the good clusters. The mean for the no-stocks-in-clusters (SIC=0) portfolios is −1.08, clearly worse than for the population as a whole. This is exactly the signal we need to separate the good portfolios from the SIC=0 portfolios.

At the next iteration, the best 16-stock portfolios are selected and 8-stock children are made from them. All 16-stock portfolios which lie outside the 99% confidence interval of the SIC=0 portfolio distribution are selected. The number of children to draw from each is determined by the histograms shown in FIG. 25.

Figure 25:
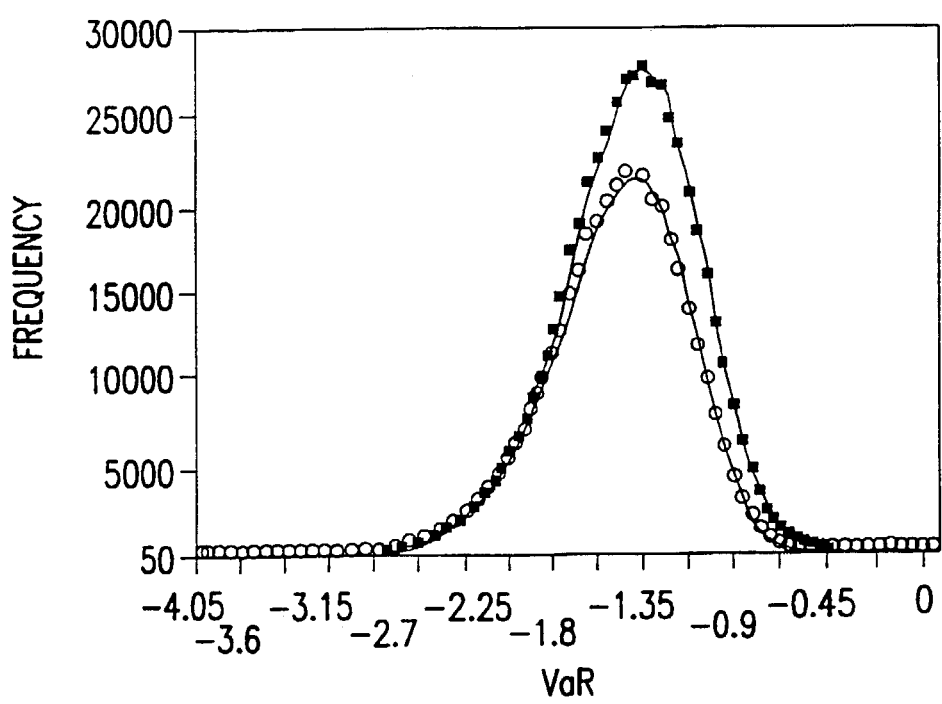
FIG. 25 displays the histograms that determine the number of children to draw from during execution of the method for evaluating and minimizing risk.

There are three features worth noticing in FIG. 25. First, the total number of portfolios that contain zero stocks in clusters has increased dramatically. This is because as you remove stocks, your chance of breaking up clusters increases exponentially. Second, the entire distribution has shifted to the left, meaning that the VaRs have gotten worse (mean −1.66). This is because their is value in diversity and diversity must decrease as portfolio size goes down. Third, the distribution of SIC=0 portfolios is still worse (mean=−1.72) than the distribution of all portfolios.

This third feature allows the modeler to determine the number of child portfolios necessary to ensure that some children still contain intact clusters. The number of children containing clusters is negatively binomially distributed as $$\begin{bmatrix} n \\ r \end{bmatrix} p^r (1-p)^{n-r}$$

where n is the number of children, r is the number of children that contain clusters, and p is the probability of randomly selecting a portfolio which is to the right of the 99% confidence interval of the SIC=0 histogram.

Using these facts, a preliminary model has been calibrated and successfully finds clusters on more than 95% of the runs.

The present invention also includes a method for portfolio modification. There are other methods to try to identify beneficial changes to a portfolio. Traditional VaR theory measures the effects of modifying (i.e. increasing or decreasing the holding) a position in one of the assets. As we have seen, if higher order combinations of assets are important then the effects of a single asset might be minor There is an important practical reason why traditional VaR focuses on the changes of only a single asset. If the portfolio is of size N and we consider changes involving m assets then on the order of $N^m$ stocks must be examines. Consequently, for practical reasons attention is usually restricted to m=1 or single asset changes.

In contrast, the present method determines the optimal number of assets to change while searching for an optimal portfolio. FIG. 26 displays a flowchart illustrating the method for portfolio modification. In step 2610, the method infers a fitness landscape from historical data. The landscape can be inferred from historical data using techniques described in the co-pending application titled, "An Adaptive and Reliable System And Method for Operations Management", U.S. application Ser. No. 09/345,441, filed Jul. 1, 1999, International Application No. PCT/US99/15096, filed Jul. 2, 1999, the contents of which are herein incorporated by reference.

In step 2620, the method determines the optimal searching distance as described in co-pending international application No. PCT/US99/19916, titled, "A Method for Optimal Search on a Technology Landscape", filed Aug. 31, 1999, the contents of which are herein incorporated by reference. Once m is known, the method searches for optimal portfolios at the optimal searching distance in step 2630. For example, the method shown in FIG. 23 could be used to find an optimal portfolio after the method of FIG. 26 determines the optimal searching distance.

In this case, the landscape is defined over portfolios. The fitness is the VaR measurement of the portfolio and two portfolios are neighbors if they differ in the holding of a single asset. So for example a portfolio of five assets might be represented as [2, 1, 1, 3, 1] meaning that the portfolio consists of two units of asset one, one unit of assets two, three and five, and three units of asset four.

Portfolio Management—Optimization of Risk-Revenue

The present invention further includes additional techniques to optimize both risk and revenue for portfolio management. Portfolio optimization (management) normally includes two-fold problem, the control of risk which is usually associated with the volatility (and as it's recently understood with higher moments of the multivariate distribution of the return of the assets constituting the portfolio). This is a formidable problem and a variety of methods have been already proposed to treat it, mention for instance one-dimensional measures of risk in terms of the Value-at-risk (VAR). Also the problem of the so-called heavy tails has been discussed in the literature in order to manage higher order yet less probable risk.

Mathematically the problem is reduced to minimization of the variance and kurtosis of the weighted sum $$y = \sum_{i=1}^{n} \lambda_i x^i$$

of specified stocks under the wealth condition $$\sum_{i=1}^{n} \lambda_i = 1$$

In what we propose the problem posed is to first search for "good" families of stocks on the basis of all stocks available at the market. For instance a family of two stocks perfectly anticorrelated will simultaneously minimize variance as well as kurtosis (which defines the higher risk contribution) properly created from these stocks. Their image in the vector space of zero-mean deviations is ⟷ and the angle is given by the correlation coefficient $$\rho_{ij} = \frac{cov(x_i x_j)}{\|x_i\| \cdot \|x_j\|}$$

with $\|x_i\|$ being the standard deviation, the norm in that space, and a vector $$x_i = \{x_i^1, x_i^2, \ldots, x_i^m\}$$

represents detrended time series of the stock "i".

By calculating the correlation matrix of the stock available at the market we can pick up the families consisting of a reference vector (stock) "a father" and strongly anticorrelated with it members "sons". These members could be statistically independent: $\rho_{ij}=0$ such that they are perpendicular to each other. Using standard window techniques robustness of the families is checked and most persistent members are chosen to constitute the basis from which optimal portfolios should be built. Minimization of the portfolio variance inside the family is achieved by means of standard procedure of linear programming or some other known technique. As a result, we have a set of "good" portfolios suitable to make search in order to optimize and expected return.

Given requirements for risk and return the techniques described allows to build up corresponding portfolios. The whole procedure is comprised of three phases:

Search for good families.

a) Creation of the correlation space, including shifted correlations.

b) Looking for "anticorrelated" families.

c) Checking robustness of the families.

Building perspective portfolios a) Creating two, three and four stock clusters with minimal variance.

b) Evaluating their risk

Optimization of expected return (revenue) of a portfolio chosen from the perspective ones.

Figure 29:
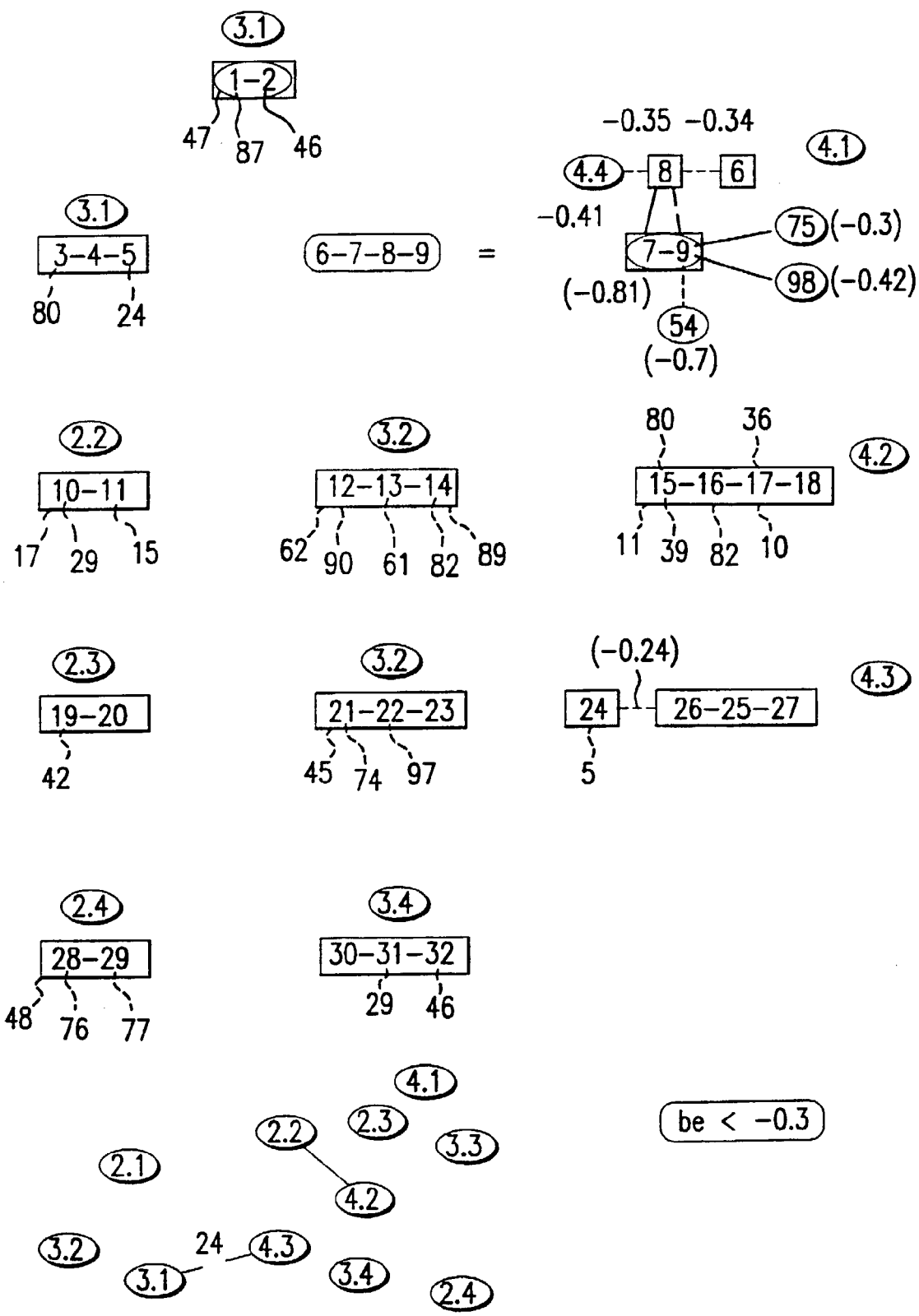
FIG. 29 displays a picture illustrating the anti-correlation relationship among family members that was generated by a method to create a portfolio of a plurality of assets with minimal risk.

The first most difficult part of the program has been checked on the samples consisting of 32 and 100 time series with intentionally created clusters in the first 32 of them. There were four 2-point clusters, four 3-point clusters, and three 4-point clusters comprising all the first 32 series. Applying the method described we identified all the clusters in the sample of 32 as well as in the sample of 100 series. Corresponding families are listed in FIG. 27, FIG. 28*a* and FIG. 28*b* for $\rho = \leq -0.3$ and on FIG. 29, where are also shown lesser couplings between the clusters and some other series. As far as the method is geometrical in character, identification of clusters for the both samples (32 and 100) only differs in time needed to build the correlation matrix, it is proportional to n(n−1)/2.

Portfolio Risk Management Using Multi-Gaussian Distributions

Portfolio Risk Management (PRM) is essentially based on the techniques applied to estimate probability of "bad events". For that one should know the corresponding probability distribution. During several years after Black and Scholes in finance business became widespread the VAR machinery which used Gaussian distribution, even though market data showed quite noticeable deviation from it. As a result, the so-called problem of fat tails arose along with a new fashion to treat it on the ground of Levy distribution (later on the truncated Levy distribution). Underline there is no evident reason to regard the latter the only possible cure. Moreover even its relation to the problem from the market point of view, has still remained foggy.

This invention addresses the problem by using a very well-known two-time scale formalism going back to Van der Paul and then Bogolubov and Mitropolskii.

In our case the method gives rise to the two-gaussian distribution (2-GD)

$$\rho_k(x) = \frac{n_1}{\sqrt{2\pi T_1}} e^{\frac{x^2}{2T_1}} + \frac{n_2}{\sqrt{2\pi T_2}} e^{\frac{x^2}{2T_2}} \qquad (1)$$

For the sake of simplicity we consider the symmetric distribution with zero mean and the normalization $n_1 + n_2 = 1$ (2)

$n_1 T_1 + n_2 T_2 = 1$ (3)

This approach allows us to represent market dynamics at a level of description intermediate between macroscopic modeling (one-factor models) and microscopic modeling (individual agent models or multi-factor models, general stochastic processes). Two-gaussian approach being the simplest exactly solvable model yet can catch certain specific features of the fat tails behavior. It describes two groups of investors acting at the market with different time scale behavior.

For comparison we are using the standard normalized distribution (the Black-Scholes approach)

$$g(x) = \frac{1}{\sqrt{2\pi}} e^{\frac{x^2}{2}} \qquad (4)$$

that implies the variance is measured in units of the σ. Let us consider the probability, sometimes called VAR, of negative deviations larger than a specified value "a"

$$p(x \leq -a) = \int_{-\infty}^{-a} \rho(x)\,dx \qquad (5)$$

and the difference $$\delta P_r(x \leq a) = \int_{-\infty}^{-a} \delta\rho(x)\,dx \equiv \int_{-\infty}^{-a} (\rho_k(x) - g(x))\,dx \qquad (6)$$

Since the first two moments are same for the both distributions the difference is proportional to the kurtosis of 2-GD (1):

$$\delta P_r(x \leq a) \propto K = \frac{\langle x^4 \rangle}{\langle x^2 \rangle^2} - 3 = 3n_1 n_2 (T_2 - T_1)^2 \qquad (7)$$

It can be shown that under conditions (2) and (3) the difference while expanding in the series over moments is $$\delta P_L \approx \frac{1}{\sqrt{2n}} e^{\frac{x^2}{2}} \frac{K}{24}(x^3 - 3x) + O(\langle x^6 \rangle) \qquad (8)$$

This difference can be incorporated by the so-called implied volatility (variance) through considering the effective (implied) gaussian process $$g(x) = \frac{1}{\sqrt{2\pi\sigma_{im}}} e^{\frac{x^2}{2\sigma_{im}}}$$

where $\sigma_{im} = 1 + \delta\sigma$ is the implied variance:

$$\sigma_{im} = 1 + \frac{1}{24} K(a^2 - 3) \qquad (9)$$

In order to check out formula (8) we calculated JP by using the exact distribution (1) and (8) with the kurtosis given by (7). The approximate formula using implied volatility gives sufficiently good qualitative description and for certain values of K and "a" even quantitative one. But there is the region of a's where the approximate formula (8) along with the notion of implied volatility (9) works bad. Since the 2-GD is a very simple model containing enough parameters to fit the market data it can be used as an exact tool to calculate the "fat tail VAR". Moreover as far as pricing formulas for all the derivatives available at the market linearly depend on the distribution function the model (1) is exact solvable in the sense that all results are straightforward. For instance the option pricing formula is $$c = e^{-r(T-t)} \int_x^\infty (S_T - X)g(S_T) dS_T = SN(d_1) - Xe^{-r(T-t)} N(d_2)$$

where S is the current (stock) price of the underlying asset, $S_T$ is the maturity asset price and X is the strike (exercise) price. We see that the price is linear (proportional) over the distribution density and in the case of two gaussians it will contain four terms with the cumulative gaussian functions N(d) instead of two:

$$c = e^{-r(T-t)} \int_x^\infty (S_T - X)[n_1 g(T_1; S_T) + n_2 g(T_2; S_T) dS_T + n_2 N(T_2; d_2)] =$$
$$S[n_1 N(T_1; d_1) + n_2 N(T_2; d_1)] - Xe^{-r(T-t)}[n_1 N(T_1; d_2)]$$

To make the model less restrictive one can consider three (and even more) gaussian distributions $$g_m(n_i, T_i) = \sum_{i=1}^{m} n_i g(1, T_i)$$

with the normalization conditions $$\sum n_i = 1$$
$$\sum n_i T_i = 1$$
$$\sum n_i T_i^2 = 1$$

such that the difference $$\delta P_m^r = \int_{-\infty}^{-a} [g_m(n_i, T_i) - g(1)] dx$$

can be made proportional to any specified moment.

Finally we give the next term in the expansion (8):

$$\delta P = \frac{e^{\frac{x^2}{2}}}{\sqrt{2n}} \frac{x}{24} \left[ K(x^2 - 3) + \frac{\langle \delta x^6 \rangle}{2}(15 - 10x^2 + x^4) \right]$$

with $$\langle \delta x^6 \rangle = n_2(T_2^2 - T_1^2)(T_2 - 1) + K/3$$

for the 2-GD.

Figure 30:
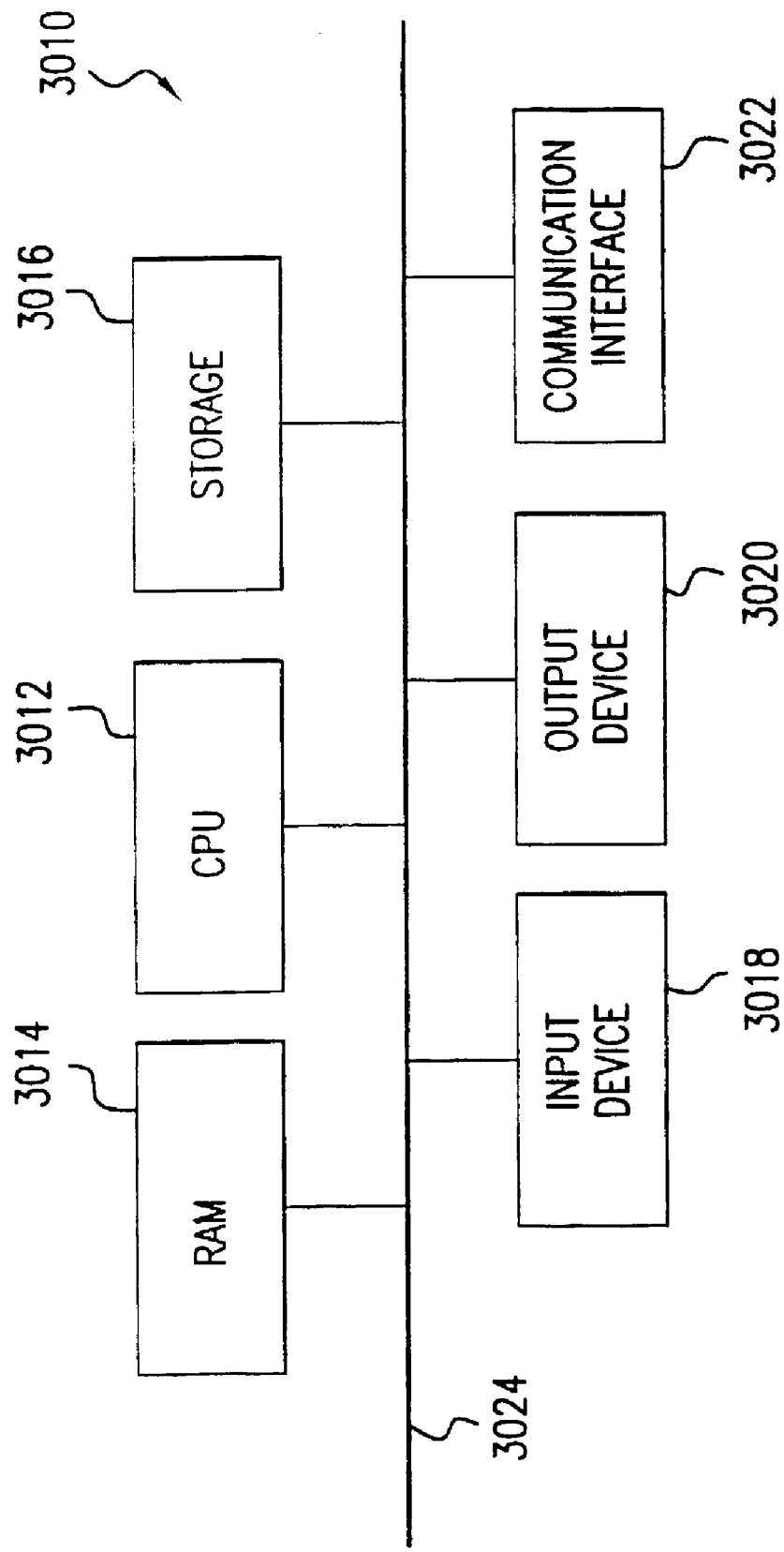
FIG. 30 discloses a representative computer system 3010 in conjunction with which the embodiments of the present invention may be implemented.

FIG. 30 discloses a representative computer system 3010 in conjunction with which the embodiments of the present invention may be implemented. Computer system 3010 may be a personal computer, workstation, or a larger system such as a minicomputer. However, one skilled in the art of computer systems will understand that the present invention is not limited to a particular class or model of computer.

As shown in FIG. 30, representative computer system 3010 includes a central processing unit (CPU) 3012, a memory unit 3014, one or more storage devices 3016, an input device 3018, an output device 3020, and communication interface 3022. A system bus 3024 is provided for communications between these elements. Computer system 3010 may additionally function through use of an operating system such as Windows, DOS, or UNIX. However, one skilled in the art of computer systems will understand that the present invention is not limited to a particular configuration or operating system.

Storage devices 3016 may illustratively include one is or more floppy or hard disk drives, CD-ROMs, DVDs, or tapes. Input device 3018 comprises a keyboard, mouse, microphone, or other similar device. Output device 3020 is a computer monitor or any other known computer output device. Communication interface 3022 may be a modem, a network interface, or other connection to external electronic devices, such as a serial or parallel port While the above invention has been described with reference to certain preferred embodiments, the scope of the present invention is not limited to these embodiments. One skill in the art may find variations of these preferred embodiments which, nevertheless, fall within the spirit of the present invention, whose scope is defined by the claims set forth below.

The invention claimed is:
1. A method for optimizing a set of portfolios of assets comprising the steps of:
   providing a computer having a computer-readable media and an electrical output device, wherein the computer-readable media has an application stored thereon;
   storing data pertaining to the portfolio of assets on the computer-readable media;
   identifying a set of economic models;
   executing the set of economic models;
   determining a fitness landscape representation with respect to the set of portfolios of assets by extracting a set of observables from said execution of the set of economic models;
   optimizing the set of portfolios by determining at least one optimal searching distance in the fitness landscape representation;
   searching for ones of the set of portfolios of assets at the at least one optimal searching distance, wherein portfolios at the optimal searching distance comprise optimal ones of the set of portfolios of assets; and
   presenting results from said searching step for the optimal ones of the portfolios of assets on the electrical output device.

2. A method as in claim 1 wherein each portfolio in the set of portfolios of assets comprises a vector corresponding to the assets of each corresponding portfolio wherein each element of the vector identifies a number of units of each of the corresponding assets in each portfolio of the set of portfolios.

3. A method as in claim 2 further comprising:
identifying a first portfolio of the portfolio of assets and a second portfolio of the portfolio of assets;
determining a difference between the vector of the first portfolio and the vector of second portfolio; and
wherein the at least one searching distance between the first portfolio of the set of portfolios of assets and the second portfolio of the set of portfolios of assets is defined as the difference between the vector of the first portfolio and the vector of the second portfolio.

4. A method as in claim 1 wherein the fitness of the landscape representation comprises a value of risk.

5. A method as in claim 1 wherein said determining a fitness landscape representation step comprises inferring the fitness landscape representation from historical data.

6. Computer executable software code stored on a computer readable medium, the code for optimizing a set of portfolios of assets, the code comprising:
code to execute a set of economic models;
code to determine a fitness landscape representation with respect to the set of portfolios of assets by extracting a set of observables from the execution of the set of economic models;
code to optimize the set of portfolios by determining at least one optimal searching distance in said fitness landscape representation;
code to search for ones of said set of portfolios of assets at said at least one optimal searching distance, wherein portfolios of assets at the optimal searching distance range comprise optimal ones of said set of portfolios of assets; and
code to present results from the searching for said optimal ones of said set of portfolios of assets on an electrical output device.

7. A programmed computer system for optimizing a set of portfolios of assets comprising at least one memory having at least one region storing computer executable program code and at least one processor for executing the program code stored in said memory, wherein the program code comprises:
code to execute a set of economic models;
code to determine a fitness landscape representation with respect to the set of portfolios of assets by extracting a set of observables from said execution of the set of economic models;
code to optimize the set of portfolios by determining at least one optimal searching distance in said fitness landscape representation;
code to search for ones of said set of portfolios of assets at said at least one optimal searching distance, wherein portfolios of assets at the optimal searching distance range comprise optimal ones of said set of portfolios of assets; and
code to present results from the searching for said optimal ones of said set of portfolios of assets on an electrical output device.

* * * * *